United States Patent
Yang et al.

(10) Patent No.: US 12,401,287 B2
(45) Date of Patent: *Aug. 26, 2025

(54) SYSTEMS AND METHODS FOR PROVIDING POWER TO PULSE-WIDTH-MODULATION CONTROLLERS OF POWER CONVERTERS DURING NORMAL OPERATION

(71) Applicant: ON-BRIGHT ELECTRONICS (SHANGHAI) CO., LTD., Shanghai (CN)

(72) Inventors: Penglin Yang, Shanghai (CN); Xiaomin Huang, Shanghai (CN); Yuan Lin, Shanghai (CN); Yun Sun, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/741,576

(22) Filed: Jun. 12, 2024

(65) Prior Publication Data

US 2025/0007411 A1    Jan. 2, 2025

Related U.S. Application Data

(63) Continuation of application No. 18/131,788, filed on Apr. 6, 2023, now Pat. No. 12,184,182, which is a
(Continued)

(30) Foreign Application Priority Data

Sep. 4, 2020    (CN) .......................... 202010919275.0

(51) Int. Cl.
H02M 3/335    (2006.01)
H02M 1/08    (2006.01)
(Continued)

(52) U.S. Cl.
CPC ......... *H02M 3/33523* (2013.01); *H02M 1/08* (2013.01); *H02M 1/36* (2013.01); *H02M 1/44* (2013.01)

(58) Field of Classification Search
CPC ............ H02M 3/22; H02M 1/08; H02M 1/36; H02M 3/24; H02M 3/325; H02M 3/335;
(Continued)

(56) References Cited

U.S. PATENT DOCUMENTS 7,313,004 B1 * 12/2007 Yang .................... H02M 3/3376
363/21.02
9,331,583 B2 * 5/2016 Zhang ............... H02M 3/33507
(Continued)

FOREIGN PATENT DOCUMENTS

CN    201438266 U    4/2010
CN    102255489 A    11/2011
(Continued)

OTHER PUBLICATIONS

China Intellectual Property Office, Office Action mailed Jun. 2, 2021, for Application No. 202010919275.0.
(Continued)

*Primary Examiner* — Jeffrey A Gblende
(74) *Attorney, Agent, or Firm* — Faegre Drinker Biddle & Reath LLP

(57) ABSTRACT

Controller and method for a power converter. For example, the controller includes: a first terminal configured to receive a first voltage; a second terminal connected to a capacitor and biased to a second voltage; a voltage detector configured to receive the second voltage from the second terminal and generate a detection signal based at least in part on the second voltage; a charging controller configured to receive the detection signal and generate a first control signal based at least in part on the detection signal; and a charging current
(Continued)

generator configured to receive the first voltage from the first terminal and receive the first control signal from the charging controller; wherein the voltage detector is further configured to: detect that the second voltage has decreased to a first predetermined threshold; and generate the detection signal indicating that the second voltage has decreased to the first predetermined threshold.

28 Claims, 17 Drawing Sheets

Related U.S. Application Data continuation of application No. 17/465,678, filed on Sep. 2, 2021, now Pat. No. 11,671,021.

(51) Int. Cl.
   *H02M 1/36*  (2007.01)
   *H02M 1/44*  (2007.01)

(58) Field of Classification Search
   CPC ...... H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; Y02B 70/1491

See application file for complete search history.

(56) References Cited

U.S. PATENT DOCUMENTS

| | | | |
|---|---|---|---|
| 9,712,045 B2* | 7/2017 | Mao | H02M 1/36 |
| 9,887,618 B2 | 2/2018 | Cui et al. | |
| 10,469,006 B2* | 11/2019 | Pant | H02J 7/007182 |
| 10,644,607 B2 | 5/2020 | Li et al. | |
| 10,978,945 B2* | 4/2021 | Matsuda | H02M 1/08 |
| 11,671,021 B2 | 6/2023 | Yang et al. | |
| 12,184,182 B2 | 12/2024 | Yang et al. | |
| 2012/0008343 A1 | 1/2012 | Chen et al. | |
| 2014/0098579 A1 | 4/2014 | Kleinpenning | |
| 2014/0362612 A1 | 12/2014 | Shi et al. | |
| 2014/0376277 A1 | 12/2014 | Tsui | |
| 2015/0003118 A1 | 1/2015 | Shin et al. | |
| 2015/0162841 A1 | 6/2015 | Masuda et al. | |
| 2019/0044449 A1 | 2/2019 | Li et al. | |
| 2022/0077786 A1 | 3/2022 | Yang et al. | |
| 2023/0396170 A1 | 12/2023 | Yang et al. | |

FOREIGN PATENT DOCUMENTS

| | | |
|---|---|---|
| CN | 103023298 A | 4/2013 |
| CN | 103023337 A | 4/2013 |
| CN | 206135707 U | 4/2017 |
| CN | 107231092 A | 10/2017 |
| CN | 110518790 A | 11/2019 |
| JP | 2016-146696 A | 8/2016 |
| TW | 200934130 | 8/2009 |

OTHER PUBLICATIONS

Taiwan Intellectual Property Office, Office Action mailed Oct. 4, 2021, for Application No. 109135760.

\* cited by examiner

SYSTEMS AND METHODS FOR PROVIDING POWER TO PULSE-WIDTH-MODULATION CONTROLLERS OF POWER CONVERTERS DURING NORMAL OPERATION

1. CROSS-REFERENCES TO RELATED APPLICATIONS

This application is a continuation of U.S. patent application Ser. No. 18/131,788, filed Apr. 6, 2023, which is a continuation of U.S. patent application Ser. No. 17/465,678, filed Sep. 2, 2021, which claims priority to Chinese Patent Application No. 202010919275.0, filed Sep. 4, 2020, all of the above applications being incorporated by reference herein for all purposes.

2. BACKGROUND OF THE INVENTION

Certain embodiments of the present invention are directed to circuits. More particularly, some embodiments of the invention provide systems and methods for providing power to pulse-width-modulation controllers of power converters. Merely by way of example, some embodiments of the invention have been applied to power converters during normal operation. But it would be recognized that the invention has a much broader range of applicability.

A conventional power converter often includes a semiconductor chip. For the semiconductor chip, a high-voltage pin (e.g., an HV pin) is generally connected to one or more AC terminals of the power converter through one or more components such as one or more diodes and/or is connected to one or more capacitors (e.g., a bulk capacitor) of the power converter. During the startup process of the semiconductor chip, the high-voltage pin (e.g., an HV pin) charges an external capacitor (e.g., a VDD capacitor) through an internal charging circuit of the chip.

After the voltage (e.g., a VDD voltage) provided by the external capacitor rises to a chip startup threshold, the internal charging circuit is disconnected and the startup process of the semiconductor chip ends. Upon completion of the startup process, the semiconductor chip starts normal operation for the power converter. As the output voltage of the power converter rises, an auxiliary winding of the power converter starts providing power to the semiconductor chip. Often, such start-up process that uses the high-voltage pin (e.g., an HV pin) can speed up the startup and also reduce power consumption of the semiconductor chip after the startup.

FIG. 1 is a simplified diagram showing a conventional power converter. The power converter 100 (e.g., an AC-DC power supply) includes a primary winding 102, a secondary winding 104, an auxiliary winding 106, a transistor 110 (e.g., a transistor M1), a rectifier 120 (e.g., a bridge rectifier), a filter 122 for electromagnetic interference (EMI), diodes 124, 126, 162, 170 and 176, an optocoupler 128, a pulse-width-modulation (PWM) controller 130 (e.g., an IC chip), resistors 152, 154, 160, 164, 166, 172, 174, 184, 186, 188 and 196, capacitors 156, 158, 168, 178 and 194, and an error amplifier 198 (e.g., TL431). The pulse-width-modulation (PWM) controller 130 (e.g., an IC chip) includes a terminal 132 (e.g., a PRT pin), a terminal 134 (e.g., an FB pin), a terminal 136 (e.g., a CS pin), a terminal 138 (e.g., a GND pin), a terminal 140 (e.g., a HV pin), a terminal 142 (e.g., an NC pin), a terminal 144 (e.g., a VDD pin), and a terminal 146 (e.g., a GATE pin). Additionally, the optocoupler 128 includes a light emitting diode 192 and a photosensitive detector 190. Moreover, the terminal 134 (e.g., an FB pin) is used to receive a feedback signal 135 that represents an output voltage 181 (e.g., $V_{out}$) of the power converter 100, and the terminal 140 (e.g., a HV pin) is used to receive a voltage 141.

As shown in FIG. 1, the EMI filter 122 receives an alternating current (AC) voltage 150. One output terminal of the EMI filter 122 is connected to an anode of the diode 124 (e.g., a diode D1), and another output terminal of the EMI filter 122 is connected to an anode of the diode 126 (e.g., a diode D2). A cathode of the diode 124 (e.g., a diode D1) and a cathode of the diode 126 (e.g., a diode D2) both are connected to one terminal of the resistor 152 (e.g., a resistor R2), which includes another terminal that is connected to one terminal of the resistor 154 (e.g., a resistor R3). Another terminal of the resistor 154 (e.g., a resistor R3) is connected to the terminal 140 (e.g., a HV pin) of the PWM controller 130.

The anode of the diode 124 (e.g., a diode D1) is connected to an input terminal of the rectifier 120 (e.g., a bridge rectifier), and the anode of the diode 126 (e.g., a diode D2) is connected to another input terminal of the rectifier 120 (e.g., a bridge rectifier). The rectifier 120 (e.g., a bridge rectifier) includes four diodes (e.g., diodes D3, D4, D5, and D6). One output terminal of the rectifier 120 (e.g., a bridge rectifier) is connected to one plate of the capacitor 156 (e.g., a capacitor C2) that is biased to a ground voltage on the primary side, and another output terminal of the rectifier 120 (e.g., a bridge rectifier) is connected to another plate of the capacitor 156 (e.g., a capacitor C2) that is connected to one terminal of the resistor 160 (e.g. a resistor R1), one terminal of the capacitor 158 (e.g., a capacitor C3), and one terminal of the primary winding 102. Another terminal of the resistor 160 (e.g. a resistor R1) and another terminal of the capacitor 158 (e.g., a capacitor C3) both are connected to a cathode of the diode 162 (e.g., a diode D7). An anode of the diode 162 (e.g., a diode D7) is connected to a drain terminal of the transistor 110 (e.g., a transistor M1) and another terminal of the primary winding 102.

A gate terminal of the transistor 110 (e.g., a transistor M1) receives a drive signal 147 from the terminal 146 (e.g., a GATE pin) of the PWM controller 130 (e.g., an IC chip), and a source terminal of the transistor 110 (e.g., a transistor M1) is connected to the terminal 136 (e.g., a CS pin) of the PWM controller 130 (e.g., an IC chip) and also connected to one terminal of the resistor 164 (e.g., a resistor R7). Another terminal of the resistor 164 (e.g., a resistor R7) is biased to the ground voltage on the primary side. The terminal 144 (e.g., a VDD pin) of the pulse-width-modulation (PWM) controller 130 (e.g., an IC chip) is connected to one terminal of the resistor 166 (e.g., a resistor R6), and another terminal of the resistor 166 (e.g., a resistor R6) is connected to one plate of the capacitor 168 (e.g., a capacitor C1) and a cathode of the diode 170 (e.g., a diode D8). Another plate of the capacitor 168 (e.g., a capacitor C1) is biased to the ground voltage on the primary side. An anode of the diode 170 (e.g., a diode D8) is connected to one terminal of the auxiliary winding 106, and another terminal of the auxiliary winding 106 is biased to the ground voltage on the primary side.

The anode of the diode 170 (e.g., a diode D8) is connected to one terminal of the resistor 172 (e.g., a resistor R4), and another terminal of the resistor 172 (e.g., a resistor R4) is connected to the terminal 132 (e.g., a PRT pin) of the PWM controller 130 (e.g., an IC chip) and also connected to one terminal of the resistor 174 (e.g., a resistor R5). Another terminal of the resistor 174 (e.g., a resistor R5) is biased to the ground voltage on the primary side. One terminal of the secondary winding 104 is connected to an anode of the diode 176 (e.g., a diode D9), and a cathode of the diode 176 (e.g., a diode D9) is connected to an output terminal 180 and one terminal of the capacitor 178 (e.g., a capacitor C4). Another terminal of the secondary winding 104 is connected to an output terminal 182 and another terminal of the capacitor 178 (e.g., a capacitor C4). The output terminal 180 provides the output voltage 181 (e.g., $V_{out}$) and an output current 183 (e.g., $I_{out}$), and the output terminal 182 is biased to a ground voltage on the secondary side.

The output terminal 180 is connected to one terminal of the resistor 184 (e.g., a resistor R10), and another terminal of the resistor 184 (e.g., a resistor R10) is connected to one terminal of the resistor 196 (e.g., a resistor R9), one terminal of the resistor 186 (e.g., a resistor R11), and an input terminal of the error amplifier 198. Another terminal of the resistor 196 (e.g., a resistor R9) is connected to one terminal of the capacitor 194 (e.g., a capacitor C5), which includes another terminal connected to a cathode of the light emitting diode 192 (e.g., a light emitting diode D10) and connected to an output terminal of the error amplifier 198. Another terminal of the resistor 186 (e.g., R11) is biased to the ground voltage on the secondary side, and another input terminal of the error amplifier 198 is biased to a reference voltage 197. An anode of the light emitting diode 192 (e.g., a light emitting diode D10) is connected to one terminal of the resistor 188 (e.g., a resistor R8), and another terminal of the resistor 188 (e.g., a resistor R8) is connected to the output terminal 180. The terminal 138 (e.g., a GND pin) of the PWM controller 130 (e.g., an IC chip) is biased to the ground voltage on the primary side.

As shown in FIG. 1, after the EMI filter 122 receives the alternating current (AC) voltage 150, the voltage 141 (e.g., an AC voltage) is provided to the terminal 140 (e.g., a HV pin) of the PWM controller 130 (e.g., an IC chip) so that the capacitor 168 (e.g., a capacitor C1) is charged through the terminal 144 (e.g., a VDD pin). If a voltage 145 at the terminal 144 (e.g., a VDD pin) rises above a startup threshold, the PWM controller 130 (e.g., an IC chip) disconnects the charging circuit inside the controller 130 and starts normal operation for the power converter 100. Under the normal operation, the output voltage 181 (e.g., $V_{out}$) rises so that the auxiliary winding 106, together with the diode 170 (e.g., a diode D8), the capacitor 168 (e.g., a capacitor C1) and the resistor 166 (e.g., a resistor R6), provides power supply to the terminal 144 (e.g., a VDD pin). The voltage 145 at the terminal 144 (e.g., a VDD pin) of the PWM controller 130 (e.g., an IC chip) is determined as follows:

$$V_{DD} \approx \frac{N_{aux}}{N_s} \times V_{out} \quad \text{(Equation 1)}$$

where $V_{DD}$ represents the voltage 145 at the terminal 144 (e.g., a VDD pin), and $V_{out}$ represents the output voltage 181 at the output terminal 180. Additionally, $N_{aux}$ represents the number of turns of the auxiliary winding 106, and $N_s$ represents the number of turns of the secondary winding 104.

FIG. 2 is a simplified diagram showing certain conventional components of the PWM controller 130 of the power converter 100 as shown in FIG. 1. The PWM controller 130 (e.g., an IC chip) includes a charging controller 210, a circuit 220 for undervoltage-lockout (UVLO), an internal control circuit 230, a transistor 240 (e.g., a transistor M1), and a diode 250 (e.g., a diode D1).

The circuit 220 for undervoltage-lockout (UVLO) is used to perform the power-up detection and/or the power-down detection for the PWM controller 130 (e.g., an IC chip). If the circuit 220 for undervoltage-lockout (UVLO) detects that the voltage 145 at the terminal 144 (e.g., a VDD pin) rises above the startup threshold, the circuit 220 for undervoltage-lockout (UVLO) outputs a signal 221 (e.g., AVDD) to the internal control circuit 230 in order to power on other components of the PWM controller 130 (e.g., an IC chip), where the signal 221 (e.g., AVDD) indicates the end of the startup process. If the circuit 220 for undervoltage-lockout (UVLO) detects that the voltage 145 at the terminal 144 (e.g., a VDD pin) falls below an undervoltage threshold, the circuit 220 for undervoltage-lockout (UVLO) outputs the signal 221 (e.g., AVDD) to the internal control circuit 230 in order to power off other components of the PWM controller 130 (e.g., an IC chip). As an example, the internal control circuit 230 includes various control circuits, and the internal control circuit 230 does not include the charging controller 210. For example, the internal control circuit 230 includes one or more control circuits for one or more oscillators, one or more control circuits for one or more timers, one or more drivers, one or more logic control circuits, and/or one or more protection circuits.

A drain terminal of the transistor 240 (e.g., a transistor M1) is connected to the terminal 140 (e.g., a HV pin) of the PWM controller 130 (e.g., an IC chip), a gate terminal of the transistor 240 (e.g., a transistor M1) is connected to an output terminal of the charging controller 210, and a source terminal of the transistor 240 (e.g., a transistor M1) is connected to an anode of the diode 250. A cathode of the diode 250 is connected to the terminal 144 (e.g., a VDD pin) of the PWM controller 130 (e.g., an IC chip) and also connected to an input terminal of the circuit 220 for undervoltage-lockout (UVLO). At an output terminal of the circuit 220 for undervoltage-lockout (UVLO), the signal 221 (e.g., AVDD) is sent to an input terminal of the internal control circuit 230.

As shown in FIG. 1 and FIG. 2, after the EMI filter 122 receives the AC voltage 150, the PWM controller 130 (e.g., an IC chip) undergoes a startup process. During the startup process, if the circuit 220 for undervoltage-lockout (UVLO) detects that the voltage 145 at the terminal 144 (e.g., a VDD pin) has not reached the startup threshold, the circuit 220 for undervoltage-lockout (UVLO) outputs a signal 223 to an input terminal of the charging controller 210, and in response, the charging controller 210 generates a signal 211 at the output terminal to turn on the transistor 240 (e.g., a transistor M1) and to raise the voltage 145 at the terminal 144 (e.g., a VDD pin). If the circuit 220 for undervoltage-lockout (UVLO) detects that the voltage 145 at the terminal 144 (e.g., a VDD pin) has risen above the startup threshold, the circuit 220 for undervoltage-lockout (UVLO) outputs the signal 223 to the input terminal of the charging controller 210, and in response, the charging controller 210 generates the signal 211 at the output terminal to turn off the transistor 240 (e.g., a transistor M1) in order to disconnect the charging circuit inside the controller 130 and starts normal operation for the power converter 100.

FIG. 3 is a simplified diagram showing another conventional power converter. The power converter 300 (e.g., an AC-DC power supply) includes a primary winding 302, a secondary winding 304, an auxiliary winding 306, a transistor 310 (e.g., a transistor M1), a rectifier 320 (e.g., a bridge rectifier), a filter 322 for electromagnetic interference (EMI), an optocoupler 328, a pulse-width-modulation (PWM) controller 330 (e.g., an IC chip), resistors 312, 314, 360, 364, 384, 386, 388 and 396, capacitors 318, 356, 358, 368, 378 and 394, diodes 362, 370 and 376, an error amplifier 398 (e.g., TL431), and an inductor 316. The pulse-width-modulation (PWM) controller 330 (e.g., an IC chip) includes a terminal 332 (e.g., a SW pin), a terminal 334 (e.g., a V10 pin), a terminal 336 (e.g., an FB pin), a terminal 338 (e.g., a GND pin), a terminal 340 (e.g., a HV pin), a terminal 342 (e.g., a DEM pin), a terminal 344 (e.g., a GATE pin), a terminal 346 (e.g., a CS pin), and a terminal 348 (e.g., a VDD pin). Additionally, the optocoupler 328 includes a light emitting diode 392 and a photosensitive detector 390. Moreover, the terminal 336 (e.g., an FB pin) is used to receive a feedback signal 337 that represents an output voltage 381 (e.g., $V_{out}$) of the power converter 300, and the terminal 340 (e.g., a HV pin) is used to receive a voltage 341.

As shown in FIG. 3, the EMI filter 322 receives an alternating current (AC) voltage 350. Two output terminals of the EMI filter 322 are connected to two input terminals of the rectifier 320 (e.g., a bridge rectifier) respectively. The rectifier 320 (e.g., a bridge rectifier) includes four diodes (e.g., diodes D1, D2, D3, and D4). One output terminal of the rectifier 320 (e.g., a bridge rectifier) is connected to one plate of the capacitor 356 (e.g., a capacitor C1) that is biased to a ground voltage on the primary side, and another output terminal of the rectifier 320 (e.g., a bridge rectifier) is connected to another plate of the capacitor 356 (e.g., a capacitor C1) that is connected to one terminal of the resistor 360 (e.g. a resistor R1), one terminal of the capacitor 358 (e.g., a capacitor C2), and one terminal of the primary winding 302. Another terminal of the resistor 360 (e.g. a resistor R1) and another terminal of the capacitor 358 (e.g., a capacitor C2) both are connected to a cathode of the diode 362 (e.g., a diode D5). An anode of the diode 362 (e.g., a diode D5) is connected to a drain terminal of the transistor 310 (e.g., a transistor M1) and another terminal of the primary winding 302.

A gate terminal of the transistor 310 (e.g., a transistor M1) receives a drive signal 345 from the terminal 344 (e.g., a GATE pin) of the PWM controller 330 (e.g., an IC chip), and a source terminal of the transistor 310 (e.g., a transistor M1) is connected to the terminal 346 (e.g., a CS pin) of the PWM controller 330 (e.g., an IC chip) and also connected to one terminal of the resistor 364 (e.g., a resistor R4). Another terminal of the resistor 364 (e.g., a resistor R4) is biased to the ground voltage on the primary side. The terminal 348 (e.g., a VDD pin) of the pulse-width-modulation (PWM) controller 330 (e.g., an IC chip) is connected to one terminal of the inductor 316 (e.g., an inductor L), one plate of the capacitor 368 (e.g., a capacitor C3) and a cathode of the diode 370 (e.g., a diode D7). Another terminal of the inductor 316 (e.g., an inductor L) is connected to the terminal 332 (e.g., a SW pin) of the PWM controller 330 (e.g., an IC chip). Another plate of the capacitor 368 (e.g., a capacitor C3) is biased to the ground voltage on the primary side. An anode of the diode 370 (e.g., a diode D7) is connected to one terminal of the resistor 312 (e.g., a resistor R2) and one terminal of the auxiliary winding 306 that corresponds to a voltage 307. Another terminal of the auxiliary winding 306 is biased to the ground voltage on the primary side. Another terminal of the resistor 312 (e.g., a resistor R2) is connected to the terminal 342 (e.g., a DEM pin) of the PWM controller 330 (e.g., an IC chip) and one terminal of the resistor 314 (e.g., a resistor R3). Another terminal of the resistor 314 (e.g., a resistor R3) is biased to the ground voltage on the primary side. The terminal 334 (e.g., a V10 pin) of the PWM controller 330 (e.g., an IC chip) is connected to one terminal of the capacitor 318 (e.g., a capacitor C5), and another terminal of the capacitor 318 (e.g., a capacitor C5) is biased to the ground voltage on the primary side.

One terminal of the secondary winding 304 is connected to an anode of the diode 376 (e.g., a diode D6), and a cathode of the diode 376 (e.g., a diode D6) is connected to an output terminal 380 and one terminal of the capacitor 378 (e.g., a capacitor C4). Another terminal of the secondary winding 304 is connected to an output terminal 382 and another terminal of the capacitor 378 (e.g., a capacitor C4). The output terminal 380 provides the output voltage 381 (e.g., $V_{out}$) and an output current 383 (e.g., $I_{out}$), and the output terminal 382 is biased to a ground voltage on the secondary side.

The output terminal 380 is connected to one terminal of the resistor 384 (e.g., a resistor R5), and another terminal of the resistor 384 (e.g., a resistor R5) is connected to one terminal of the resistor 396 (e.g., a resistor R6), one terminal of the resistor 386 (e.g., a resistor R7), and an input terminal of the error amplifier 398. Another terminal of the resistor 396 (e.g., a resistor R6) is connected to one terminal of the capacitor 394 (e.g., a capacitor C5), which includes another terminal connected to a cathode of the light emitting diode 392 (e.g., a light emitting diode D8) and connected to an output terminal of the error amplifier 398. Another terminal of the resistor 386 (e.g., R7) is biased to the ground voltage on the secondary side, and another input terminal of the error amplifier 398 is biased to a reference voltage 397. An anode of the light emitting diode 392 (e.g., a light emitting diode D8) is connected to one terminal of the resistor 388 (e.g., a resistor R4), and another terminal of the resistor 388 (e.g., a resistor R4) is connected to the output terminal 380. The terminal 338 (e.g., a GND pin) of the PWM controller 330 (e.g., an IC chip) is biased to the ground voltage on the primary side.

As shown in FIG. 3, after the EMI filter 322 receives the alternating current (AC) voltage 350, the voltage 341 is provided to the terminal 340 (e.g., a HV pin) of the PWM controller 330 (e.g., an IC chip) so that the capacitor 368 (e.g., a capacitor C3) is charged through the terminal 348 (e.g., a VDD pin). When an internal DC-DC converter of the PWM controller 330 (e.g., an IC chip) does not operate, the terminal 348 (e.g., a VDD pin) is used to raise a voltage 335 at the terminal 334 (e.g., a V10 pin) of the PWM controller 330 (e.g., an IC chip) by charging the capacitor 318 (e.g., a capacitor C5) through the external inductor 316 (e.g., an inductor L), the terminal 332 (e.g., a SW pin) and an internal Schottky diode of the PWM controller 330 (e.g., an IC chip). If the voltage 335 at the terminal 334 (e.g., a V10 pin) rises above a startup threshold, the PWM controller 330 (e.g., an IC chip) disconnects the charging circuit inside the controller 330 that is used to charge the capacitor 368 (e.g., a capacitor C3) by the voltage 341 at the terminal 340 (e.g., a HV pin), and the PWM controller 330 (e.g., an IC chip) also starts normal operation for the power converter 300.

Under the normal operation, the output voltage 381 (e.g., $V_{out}$) rises so that the voltage 307 at one terminal of the auxiliary winding 306 also rises. The auxiliary winding 306, together with the diode 370 (e.g., a diode D7) and the capacitor 368 (e.g., a capacitor C3), provides power supply, to the terminal 348 (e.g., a VDD pin). A voltage 349 at the terminal 348 (e.g., a VDD pin) of the PWM controller 330 (e.g., an IC chip) is determined as follows:

$$V_{DD} \approx \frac{N_{aux}}{N_s} \times V_{out} \qquad \text{(Equation 2)}$$

where $V_{DD}$ represents the voltage 349 at the terminal 348 (e.g., a VDD pin), and $V_{out}$ represents the output voltage 381 at the output terminal 380. Additionally, $N_{aux}$ represents the number of turns of the auxiliary winding 306, and $N_s$ represents the number of turns of the secondary winding 304.

As shown by Equation 2, the higher the output voltage 381 (e.g., $V_{out}$), the higher the voltage 349 (e.g., $V_{DD}$), and the lower the output voltage 381 (e.g., $V_{out}$), the lower the voltage 349 (e.g., $V_{DD}$). When the output voltage 381 (e.g., $V_{out}$) is low, the internal DC-DC converter of the PWM controller 330 (e.g., an IC chip) uses the voltage 349 (e.g., $V_{DD}$) to generate the voltage 335 at the terminal 334 (e.g., a V10 pin), where the voltage 335 is stable and higher than the voltage 349 (e.g., $V_{DD}$). The voltage 335 at the terminal 334 (e.g., a V10 pin) is used to provide stable power supply to the PWM controller 330 (e.g., an IC chip), even though the output voltage 381 (e.g., $V_{out}$) varies widely.

If the voltage 349 (e.g., $V_{DD}$) is lower than the reference voltage (e.g., $V_{reg}$), the voltage 335 at the terminal 334 (e.g., a V10 pin) is generated by the internal DC-DC converter of the PWM controller 330 (e.g., an IC chip) using the voltage 349 (e.g., $V_{DD}$), and the generated voltage 335 is larger than the voltage 349 (e.g., $V_{DD}$) and is equal to the reference voltage (e.g., $V_{reg}$). If the voltage 349 (e.g., $V_{DD}$) is higher than the reference voltage (e.g., $V_{reg}$), the internal DC-DC converter of the PWM controller 330 (e.g., an IC chip) is idle, and the voltage 335 at the terminal 334 (e.g., a V10 pin) is approximately equal to the voltage 349 (e.g., $V_{DD}$).

Hence it is highly desirable to improve the techniques related to pulse-width-modulation (PWM) controllers.

3. BRIEF SUMMARY OF THE INVENTION

Certain embodiments of the present invention are directed to circuits. More particularly, some embodiments of the invention provide systems and methods for providing power to pulse-width-modulation controllers of power converters. Merely by way of example, some embodiments of the invention have been applied to power converters during normal operation. But it would be recognized that the invention has a much broader range of applicability.

According to some embodiments, a controller for a power converter includes: a first terminal configured to receive a first voltage; a second terminal connected to a capacitor and biased to a second voltage; a voltage detector configured to receive the second voltage from the second terminal and generate a detection signal based at least in part on the second voltage; a charging controller configured to receive the detection signal and generate a first control signal based at least in part on the detection signal; and a charging current generator configured to receive the first voltage from the first terminal and receive the first control signal from the charging controller; wherein the voltage detector is further configured to: detect that the second voltage has decreased to a first predetermined threshold; and generate the detection signal indicating that the second voltage has decreased to the first predetermined threshold; wherein the charging controller is further configured to: in response to the detection signal indicating that the second voltage has decreased to the first predetermined threshold, generate the first control signal indicating that a charging current is to be generated; wherein the charging current generator is further configured to: in response to the first control signal indicating that the charging current is to be generated, generate the charging current that flows through the second terminal to charge the capacitor associated with the second voltage.

According to certain embodiments, a controller for a power converter includes: a first terminal configured to receive a first voltage; a second terminal connected to a first capacitor and biased to a second voltage; a third terminal connected to a second capacitor and biased to a third voltage; a first voltage detector configured to receive the second voltage from the second terminal and generate a first detection signal based at least in part on the second voltage; a first charging controller configured to receive the first detection signal and generate a first control signal based at least in part on the first detection signal; and a charging current generator configured to receive the first voltage from the first terminal, the charging current generator including a first current generator and a second current generator, the first current generator being configured to receive the first control signal from the first charging controller; wherein the first voltage detector is further configured to: detect that the second voltage has decreased to a first predetermined threshold; and generate the first detection signal indicating that the second voltage has decreased to the first predetermined threshold; wherein the first charging controller is further configured to: in response to the first detection signal indicating that the second voltage has decreased to the first predetermined threshold, generate the first control signal indicating that a first charging current is to be generated; wherein the first current generator is further configured to: in response to the first control signal indicating that the first charging current is to be generated, generate the first charging current that flows through the third terminal to charge the second capacitor associated with the third voltage.

According to some embodiments, a controller for a power converter includes: a first terminal configured to receive a first voltage; a second terminal connected to a first capacitor and biased to a second voltage; a third terminal connected to a second capacitor and biased to a third voltage; a first voltage detector configured to receive the second voltage from the second terminal and generate a first detection signal based at least in part on the second voltage; a charging controller configured to receive the first detection signal and generate a first control signal based at least in part on the first detection signal; and a charging current generator configured to receive the first voltage from the first terminal and configured to receive the first control signal from the charging controller; wherein the first voltage detector is further configured to: detect that the second voltage has decreased to a first predetermined threshold; and generate the first detection signal indicating that the second voltage has decreased to the first predetermined threshold; wherein the charging controller is further configured to: in response to the first detection signal indicating that the second voltage has decreased to the first predetermined threshold, generate the first control signal indicating that a charging current is to be generated; wherein the current generator is further configured to: in response to the first control signal indicating that the charging current is to be generated, generate the charging current that flows through the third terminal to charge the second capacitor associated with the third voltage.

According to certain embodiments, a method for a power converter includes: receiving a first voltage; receiving a second voltage associated with a capacitor; generating a detection signal based at least in part on the second voltage;

receiving the detection signal; generating a first control signal based at least in part on the detection signal; receiving the first control signal; and processing the first control signal; wherein the generating a detection signal based at least in part on the second voltage includes: detecting that the second voltage has decreased to a first predetermined threshold; and generating the detection signal indicating that the second voltage has decreased to the first predetermined threshold; wherein the generating a first control signal based at least in part on the detection signal includes: in response to the detection signal indicating that the second voltage has decreased to the first predetermined threshold, generating the first control signal indicating that a charging current is to be generated; wherein the processing the first control signal includes: in response to the first control signal indicating that the charging current is to be generated, generating the charging current to charge the capacitor associated with the second voltage.

According to some embodiments, a method for a power converter includes: receiving a first voltage; receiving a second voltage associated with a first capacitor; receiving a third voltage associated with a second capacitor; generating a first detection signal based at least in part on the second voltage; receiving the first detection signal; generating a first control signal based at least in part on the first detection signal; receiving the first control signal; and processing the first control signal; wherein the generating a first detection signal based at least in part on the second voltage includes: detecting that the second voltage has decreased to a first predetermined threshold; and generating the first detection signal indicating that the second voltage has decreased to the first predetermined threshold; wherein the generating a first control signal based at least in part on the first detection signal includes: in response to the first detection signal indicating that the second voltage has decreased to the first predetermined threshold, generating the first control signal indicating that a first charging current is to be generated; wherein the processing the first control signal includes: in response to the first control signal indicating that the first charging current is to be generated, generating the first charging current to charge the second capacitor associated with the third voltage.

According to certain embodiments, a method for a power converter includes: receiving a first voltage; receiving a second voltage associated with a first capacitor; receiving a third voltage associated with a second capacitor; generating a first detection signal based at least in part on the second voltage; receiving the first detection signal; generating a first control signal based at least in part on the first detection signal; receiving the first control signal; and processing the first control signal; wherein the generating a first detection signal based at least in part on the second voltage includes: detecting that the second voltage has decreased to a first predetermined threshold; and generating the first detection signal indicating that the second voltage has decreased to the first predetermined threshold; wherein the generating a first control signal based at least in part on the first detection signal includes: in response to the first detection signal indicating that the second voltage has decreased to the first predetermined threshold, generating the first control signal indicating that a charging current is to be generated; wherein the processing the first control signal includes: in response to the first control signal indicating that the charging current is to be generated, generating the charging current to charge the second capacitor associated with the third voltage.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide systems and methods for providing power to pulse-width-modulation controllers of power converters. Merely by way of example, some embodiments of the invention have been applied to power converters during normal operation. But it would be recognized that the invention has a much broader range of applicability.

Figure 1:
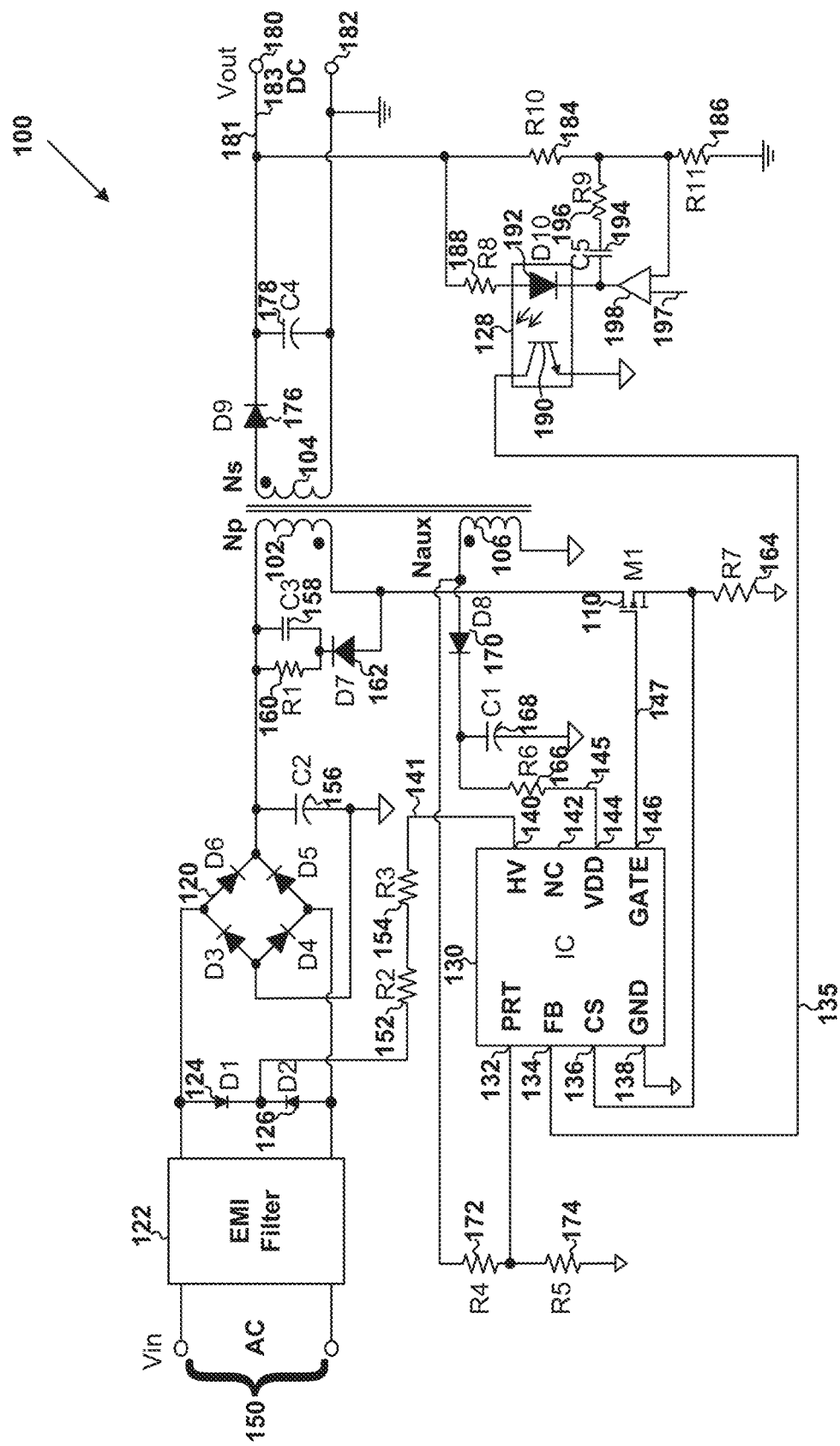
FIG. 1 is a simplified diagram showing a conventional power converter.
Figure 2:
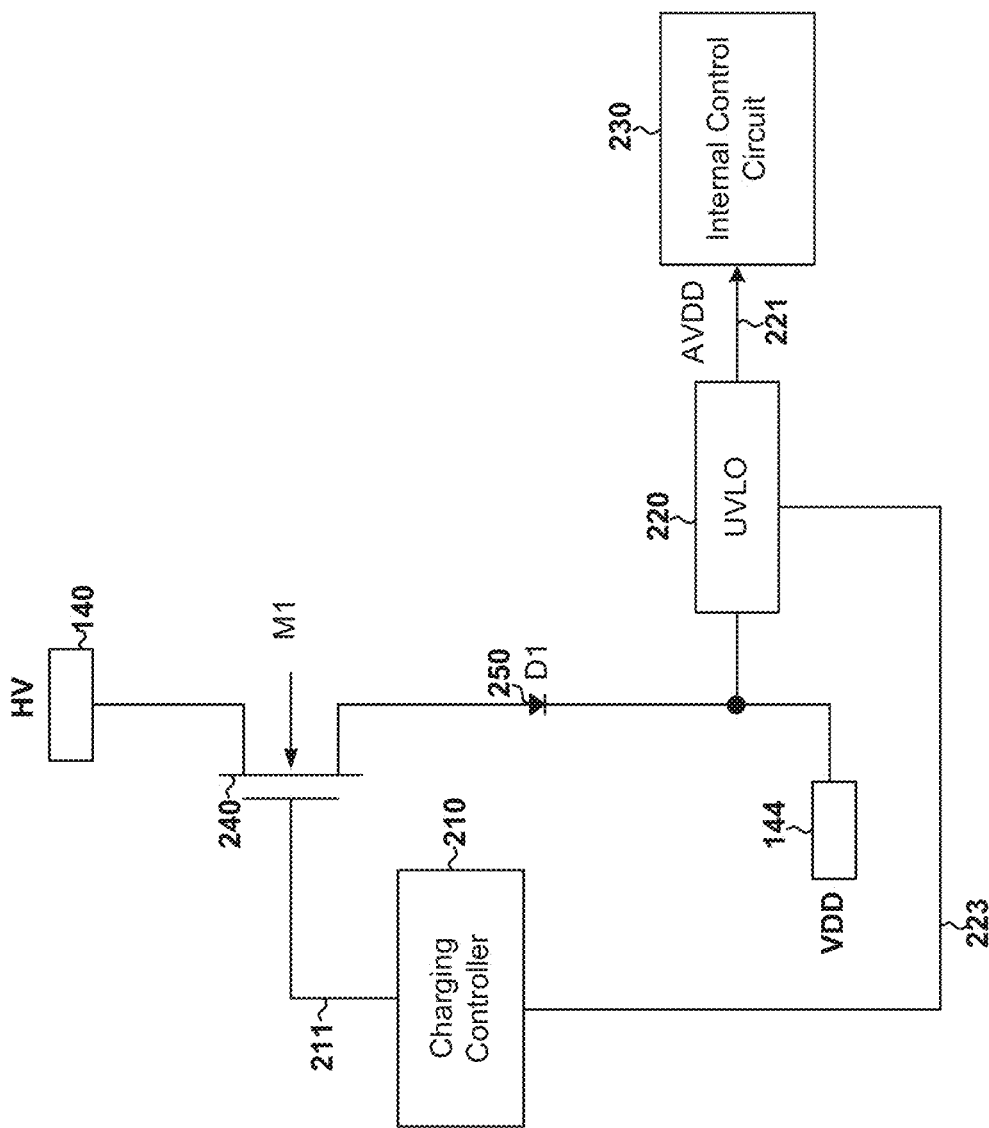
FIG. 2 is a simplified diagram showing certain conventional components of the PWM controller of the power converter as shown in FIG. 1.

As shown in FIG. 1 and FIG. 2, after the power converter 100 starts the normal operation, the auxiliary winding 106 is used to supply power to the terminal 144 (e.g., a VDD pin) of the PWM controller 130 (e.g., an IC chip) according to some embodiments. For example, under certain dynamic-load and/or no-load conditions, the PWM controller 130 (e.g., an IC chip) keeps the gate signal 147 at a logic low level for multiple clock cycles due to the adjustment of the feedback signal 135. As an example, during these multiple clock cycles, the auxiliary winding 106 does not provide additional power, and the voltage 145 at the terminal 144 (e.g., a VDD pin) is supported by the capacitor 168 (e.g., a capacitor C1). According to certain embodiments, with the discharge of the capacitor 168 (e.g., a capacitor C1), the voltage 145 at the terminal 144 (e.g., a VDD pin) decreases with time. For example, if the voltage 145 at the terminal 144 (e.g., a VDD pin) drops below a predetermined threshold, the output voltage 181 (e.g., $V_{out}$) drifts up. As an example, under the low temperature and/or a harsh working condition, with the discharge of the capacitor 168 (e.g., a capacitor C1), the voltage 145 at the terminal 144 (e.g., a VDD pin) decreases more quickly due to the decrease in capacitance of the capacitor 168 (e.g., a capacitor C1), causing insufficient power supply for the PWM controller 130 (e.g., an IC chip) and also triggering undervoltage protection.

Figure 4:
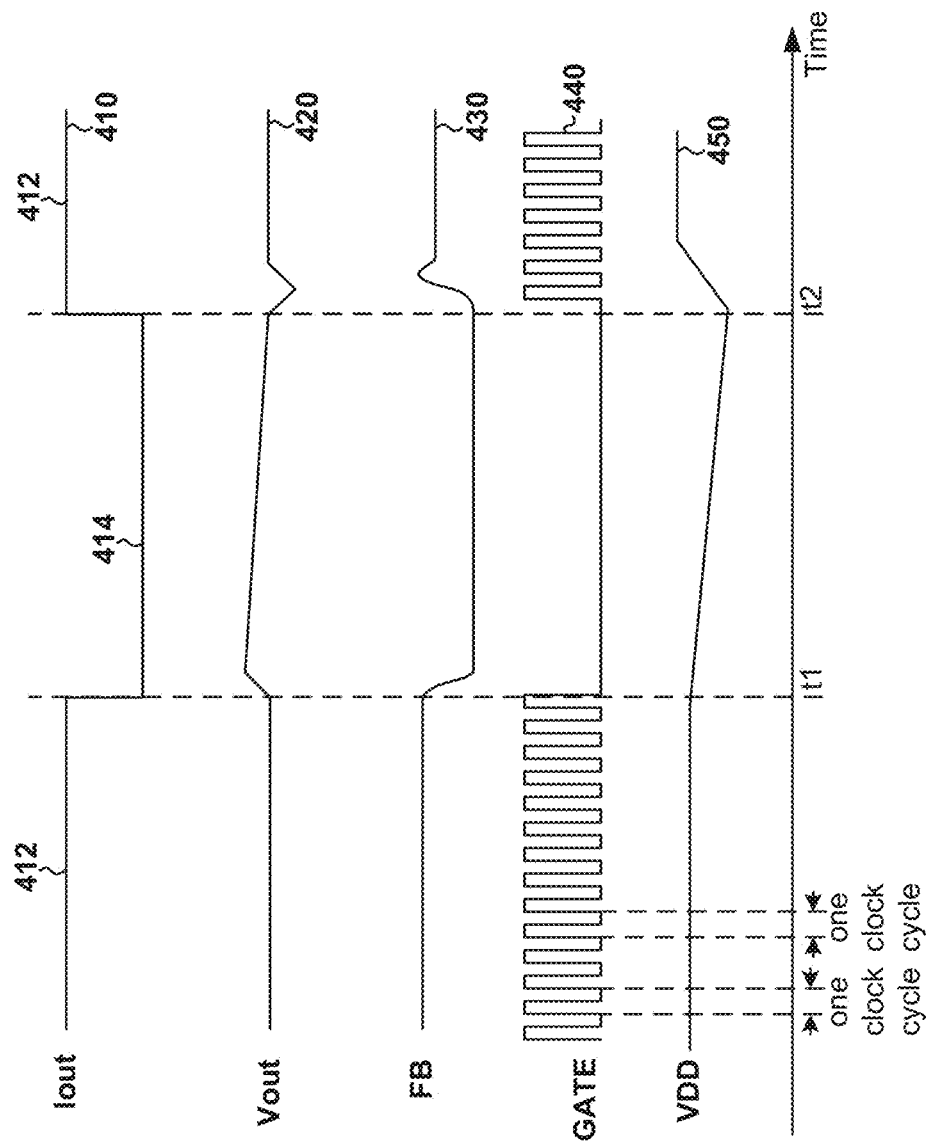
FIG. 4 shows simplified timing diagrams under certain dynamic-load conditions for the power converter as shown in FIG. 1 according to certain embodiments.

FIG. 4 shows simplified timing diagrams under certain dynamic-load conditions for the power converter 100 as shown in FIG. 1 according to certain embodiments. The waveform 410 represents the output current 183 (e.g., $I_{out}$) as a function of time, the waveform 420 represents the output voltage 181 (e.g., $V_{out}$) as a function of time, the waveform 430 represents the feedback signal 135 as a function of time, the waveform 440 represents the drive signal 147 as a function of time, and the waveform 450 represents the voltage 145 (e.g., $V_{DD}$) as a function of time.

In some embodiments, before time $t_1$, the output current 183 (e.g., $I_{out}$) is at a current level 412, and within each clock cycle, the drive signal 147 changes between a logic high level and a logic low level. For example, at time $t_1$, the output current 183 (e.g., $I_{out}$) decreases from the current level 412 to a current level 414. As an example, from time $t_1$ to time $t_2$, the output current 183 (e.g., $I_{out}$) remains at the current level 414. For example, at time $t_2$, the output current 183 (e.g., $I_{out}$) increases from the current level 414 to the current level 412. As an example, after time $t_2$, the output current 183 (e.g., $I_{out}$) remains at the current level 412. In some examples, the current level 412 is higher than the current level 414. For example, if the output current 183 (e.g., $I_{out}$) is at the current level 412, the power converter 100 is under a high-load condition. As an example, if the output current 183 (e.g., $I_{out}$) is at the current level 414, the power converter 100 is under a light-load condition. In certain embodiments, from time $t_1$ to time $t_2$, the power converter 100 is under the light-load condition. For example, under the light-load condition, the output voltage 181 (e.g., $V_{out}$) overshoots as shown by the waveform 420, the feedback signal 135 drops as shown by the waveform 430, the drive signal 147 remains at the logic low level during multiple clock cycles as shown by the waveform 440, and the voltage 145 (e.g., $V_{DD}$) decreases gradually from time $t_1$ to time $t_2$ as shown by the waveform 450.

Figure 5:
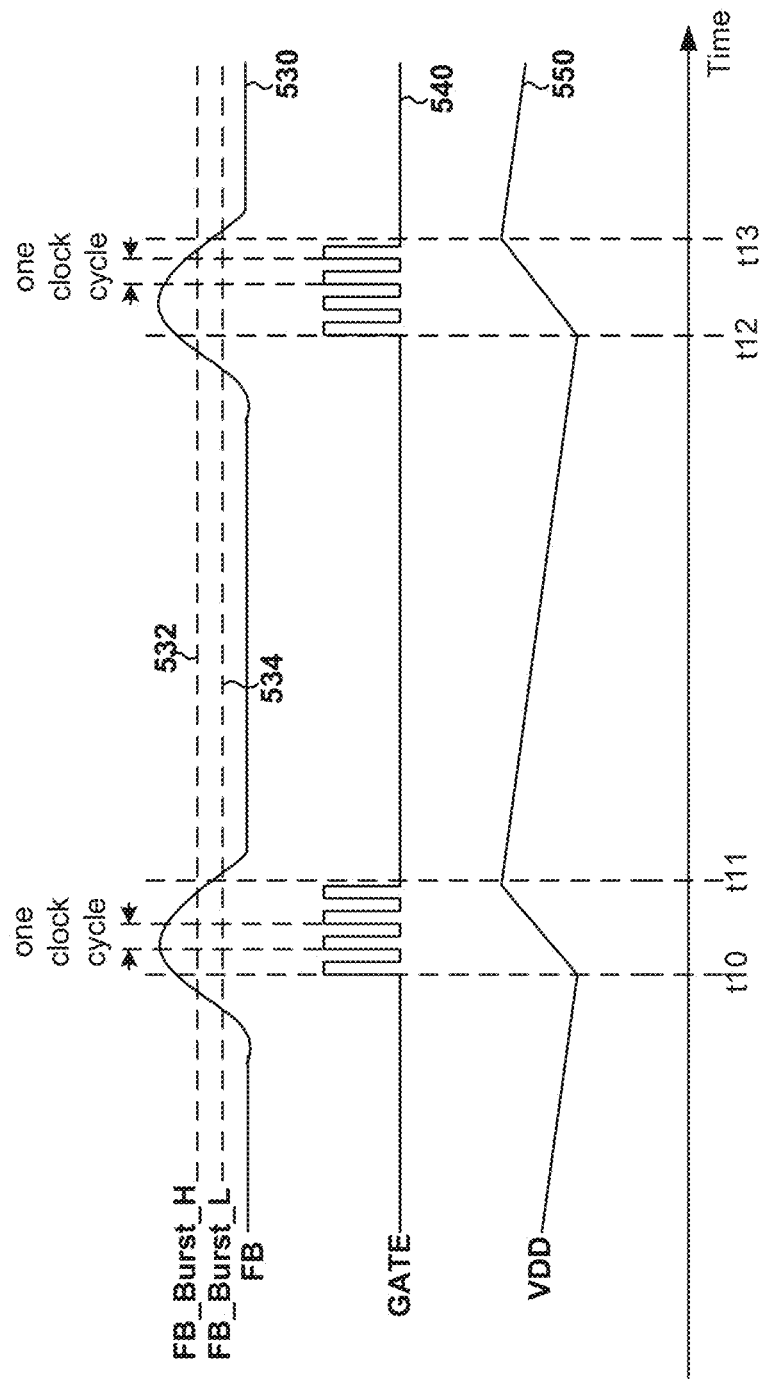
FIG. 5 shows simplified timing diagrams under no-load condition for the power converter as shown in FIG. 1 according to some embodiments.

FIG. 5 shows simplified timing diagrams under no-load condition for the power converter 100 as shown in FIG. 1 according to some embodiments. The waveform 530 represents the feedback signal 135 as a function of time, the waveform 540 represents the drive signal 147 as a function of time, and the waveform 550 represents the voltage 145 (e.g., VDD) as a function of time.

According to certain embodiments, under no-load condition, the output current 183 (e.g., $I_{out}$) is equal to zero in magnitude. For example, at time $t_{10}$, the feedback signal 135 becomes larger than a signal threshold 532 (e.g., FB_Burst_H), and at time $t_{11}$, the feedback signal 135 becomes smaller than a signal threshold 534 (e.g., FB_Burst_L) as shown by the waveform 530. As an example, at time $t_{12}$, the feedback signal 135 becomes larger than the signal threshold 532 (e.g., FB_Burst_H), and at time $t_{13}$, the feedback signal 135 becomes smaller than the signal threshold 534 (e.g., FB_Burst_L) as shown by the waveform 530. For example, the signal threshold 532 (e.g., FB_Burst_H) is larger than the signal threshold 534 (e.g., FB_Burst_L) in magnitude.

In some embodiments, from time $t_{10}$ to time $t_{11}$, the drive signal 147 changes between a logic high level and a logic low level within each clock cycle as shown by the waveform 540, and the voltage 145 (e.g., $V_{DD}$) increases as shown by the waveform 550. In certain embodiments, time $t_{11}$ to time $t_{12}$, the drive signal 147 remains at the logic low level during multiple clock cycles as shown by the waveform 540, and the voltage 145 (e.g., $V_{DD}$) decreases gradually as shown by the waveform 550. In some embodiments, from time $t_{12}$ to time $t_{13}$, the drive signal 147 changes between the logic high level and the logic low level within each clock cycle as shown by the waveform 540, and the voltage 145 (e.g., $V_{DD}$) increases as shown by the waveform 550.

As shown in FIG. 4 and FIG. 5, under certain dynamic-load and/or no-load conditions, when the drive signal 147 remains at the logic low level during multiple clock cycles, the voltage 145 (e.g., $V_{DD}$) decreases gradually according to certain embodiments. For example, if the voltage 145 (e.g., $V_{DD}$) becomes too small in magnitude, the undervoltage protection is triggered for the PWM controller 130 (e.g., an IC chip) because of insufficient power supply.

Figure 6:
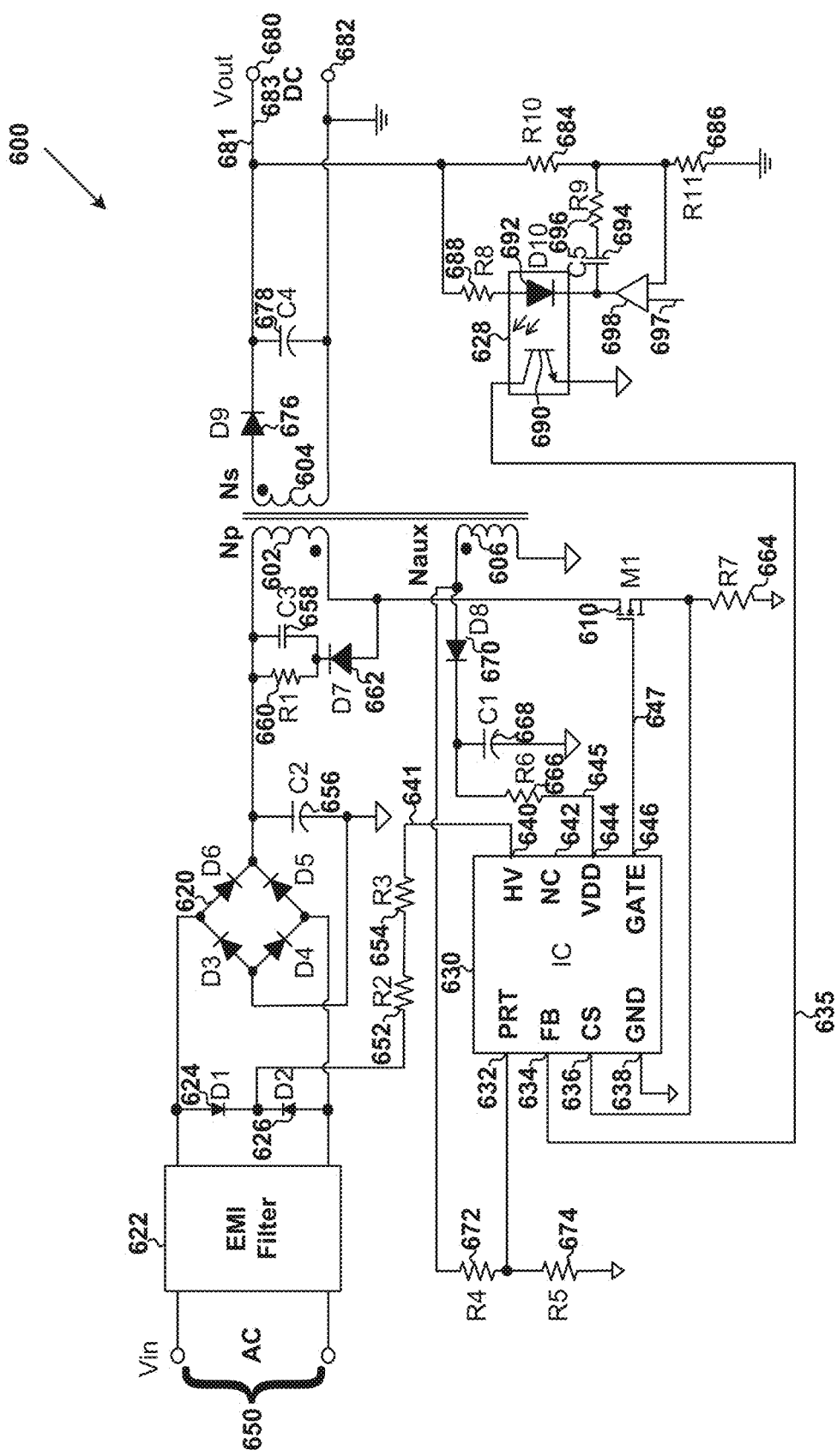
FIG. 6 is a simplified diagram showing a power converter according to certain embodiments of the present invention.
Figure 8:
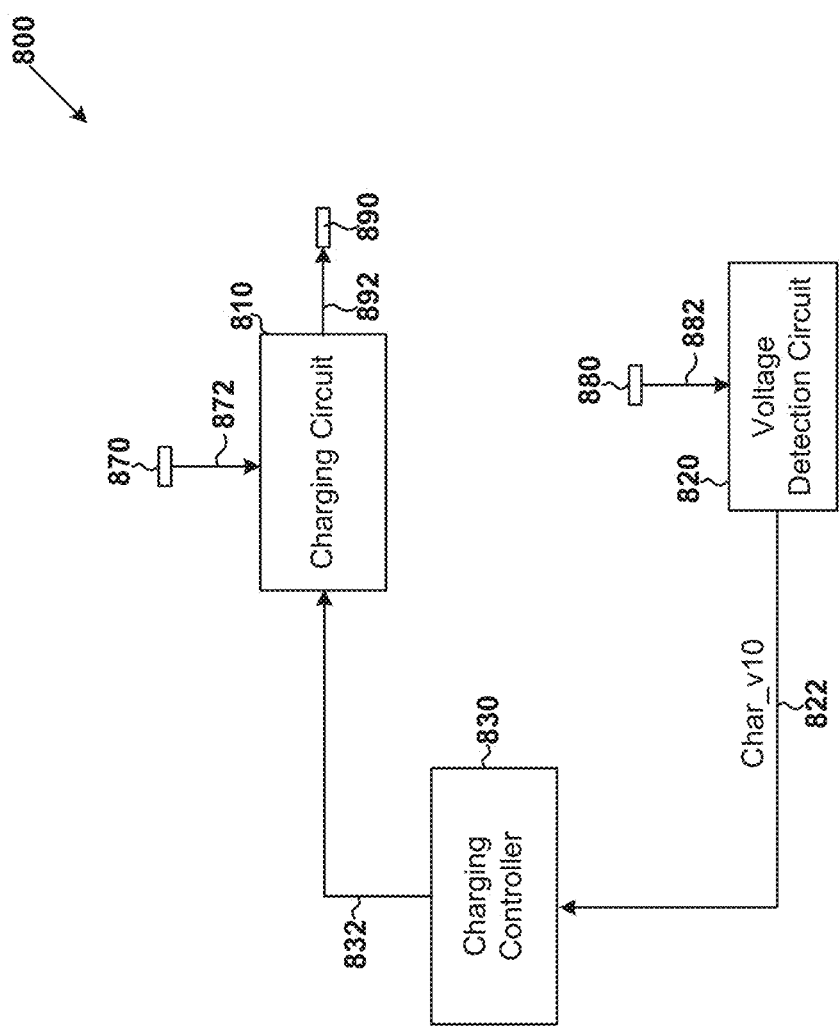
FIG. 8 is a simplified diagram showing certain components of the PWM controller of the power converter as shown in FIG. 6 and/or certain components of the PWM controller of the power converter as shown in FIG. 7 according to some embodiments of the present invention.
Figure 9:
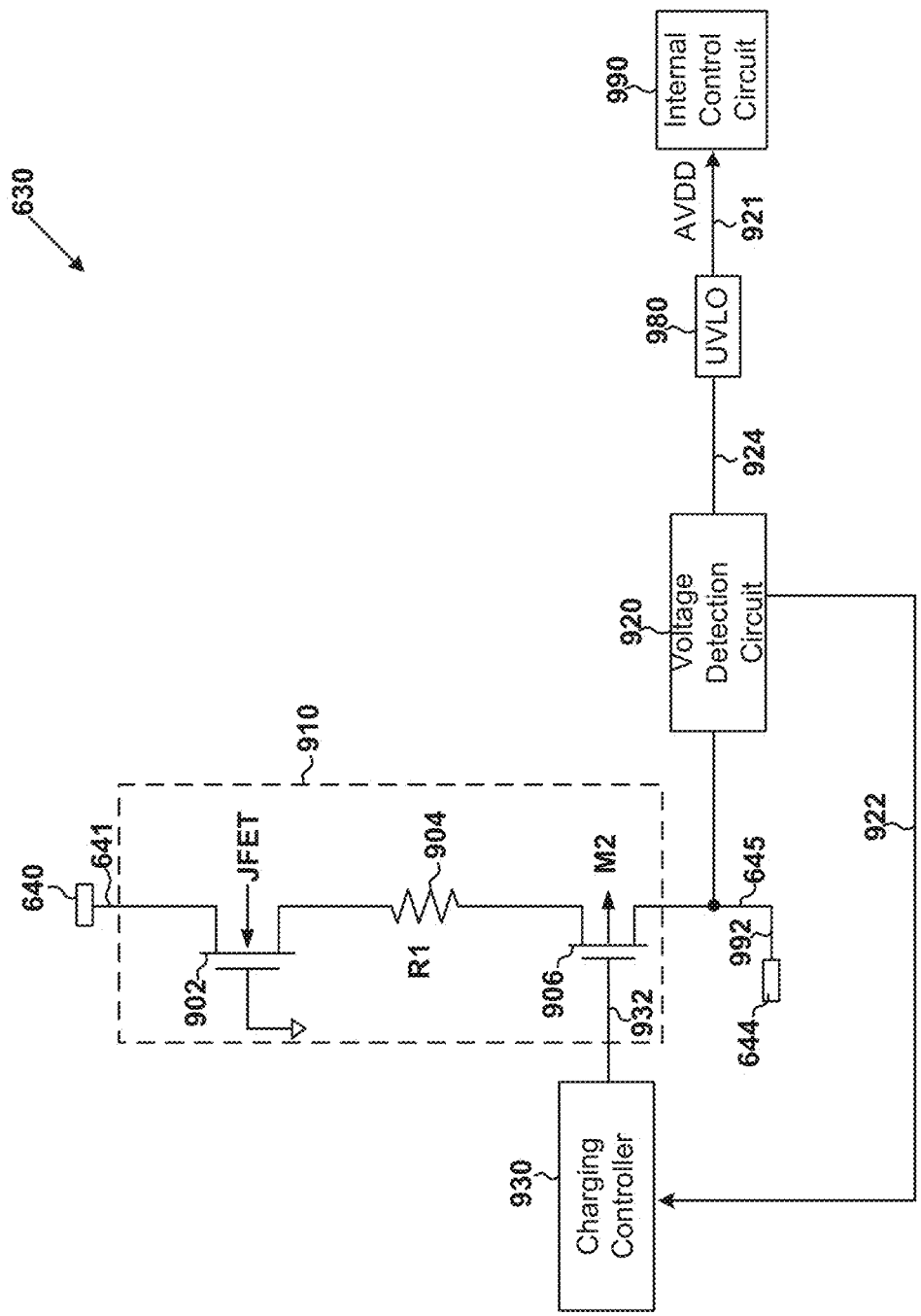
FIG. 9 is a simplified diagram showing certain components of the PWM controller of the power converter as shown in FIG. 6 according to some embodiments of the present invention.

FIG. 6 is a simplified diagram showing a power converter according to certain embodiments of the present invention. This diagram is merely an example, which should not unduly limit the scope of the claims. One of ordinary skill in the art would recognize many variations, alternatives, and modifications. The power converter 600 (e.g., an AC-DC power supply) includes a primary winding 602, a secondary winding 604, an auxiliary winding 606, a transistor 610 (e.g., a transistor M1), a rectifier 620 (e.g., a bridge rectifier), a filter 622 for electromagnetic interference (EMI), diodes 624, 626, 662, 670 and 676, an optocoupler 628, a pulse-width-modulation (PWM) controller 630 (e.g., an IC chip), resistors 652, 654, 660, 664, 666, 672, 674, 684, 686, 688 and 696, capacitors 656, 658, 668, 678 and 694, and an error amplifier 698, where the pulse-width-modulation (PWM) controller 630 (e.g., an IC chip) includes the PWM controller 800 as shown in FIG. 8 and/or the PWM controller 630 as shown in FIG. 9. For example, the pulse-width-modulation (PWM) controller 630 (e.g., an IC chip) includes a terminal 632 (e.g., a PRT pin), a terminal 634 (e.g., an FB pin), a terminal 636 (e.g., a CS pin), a terminal 638 (e.g., a GND pin), a terminal 640 (e.g., a HV pin), a terminal 642 (e.g., an NC pin), a terminal 644 (e.g., a VDD pin), and a terminal 646 (e.g., a GATE pin). As an example, the optocoupler 628 includes a light emitting diode 692 and a photosensitive detector 690. For example, the terminal 634 (e.g., an FB pin) is used to receive a feedback signal 635 that represents an output voltage 681 (e.g., $V_{out}$) of the power converter 600, and the terminal 640 (e.g., a HV pin) is used to receive a voltage 641. As an example, the error amplifier 698 includes TL431.

As shown in FIG. 6, the EMI filter 622 receives an alternating current (AC) voltage 650 according to some embodiments. For example, one output terminal of the EMI filter 622 is connected to an anode of the diode 624 (e.g., a diode D1), and another output terminal of the EMI filter 622 is connected to an anode of the diode 626 (e.g., a diode D2). As an example, a cathode of the diode 624 (e.g., a diode D1) and a cathode of the diode 626 (e.g., a diode D2) both are connected to one terminal of the resistor 652 (e.g., a resistor R2), which includes another terminal that is connected to one terminal of the resistor 654 (e.g., a resistor R3). For example, another terminal of the resistor 654 (e.g., a resistor R3) is connected to the terminal 640 (e.g., a HV pin) of the PWM controller 630.

According to certain embodiments, the anode of the diode 624 (e.g., a diode D1) is connected to an input terminal of the rectifier 620 (e.g., a bridge rectifier), and the anode of the diode 626 (e.g., a diode D2) is connected to another input terminal of the rectifier 620 (e.g., a bridge rectifier). For example, the rectifier 620 (e.g., a bridge rectifier) includes four diodes (e.g., diodes D3, D4, D5, and D6). As an example, one output terminal of the rectifier 620 (e.g., a bridge rectifier) is connected to one plate of the capacitor 656 (e.g., a capacitor C2) that is biased to a ground voltage on the primary side, and another output terminal of the rectifier 620 (e.g., a bridge rectifier) is connected to another plate of the capacitor 656 (e.g., a capacitor C2) that is connected to one terminal of the resistor 660 (e.g. a resistor R1), one terminal of the capacitor 658 (e.g., a capacitor C3), and one terminal of the primary winding 602. For example, another terminal of the resistor 660 (e.g. a resistor R1) and another terminal of the capacitor 658 (e.g., a capacitor C3) both are connected to a cathode of the diode 662 (e.g., a diode D7). As an example, an anode of the diode 662 (e.g., a diode D7) is connected to a drain terminal of the transistor 610 (e.g., a transistor M1) and another terminal of the primary winding 602.

In some embodiments, a gate terminal of the transistor 610 (e.g., a transistor M1) receives a drive signal 647 from the terminal 646 (e.g., a GATE pin) of the PWM controller 630 (e.g., an IC chip), and a source terminal of the transistor 610 (e.g., a transistor M1) is connected to the terminal 636 (e.g., a CS pin) of the PWM controller 630 (e.g., an IC chip) and also connected to one terminal of the resistor 664 (e.g., a resistor R7). For example, another terminal of the resistor 664 (e.g., a resistor R7) is biased to the ground voltage on the primary side. As an example, the terminal 644 (e.g., a VDD pin) of the pulse-width-modulation (PWM) controller 630 (e.g., an IC chip) is connected to one terminal of the resistor 666 (e.g., a resistor R6), and another terminal of the resistor 666 (e.g., a resistor R6) is connected to one plate of the capacitor 668 (e.g., a capacitor C1) and a cathode of the diode 670 (e.g., a diode D8). For example, the terminal 644 (e.g., a VDD pin) is at a voltage 645. As an example, another plate of the capacitor 668 (e.g., a capacitor C1) is biased to the ground voltage on the primary side. For example, an anode of the diode 670 (e.g., a diode D8) is connected to one terminal of the auxiliary winding 606, and another terminal of the auxiliary winding 606 is biased to the ground voltage on the primary side.

In certain embodiments, the anode of the diode 670 (e.g., a diode D8) is connected to one terminal of the resistor 672 (e.g., a resistor R4), and another terminal of the resistor 672 (e.g., a resistor R4) is connected to the terminal 632 (e.g., a PRT pin) of the PWM controller 630 (e.g., an IC chip) and also connected to one terminal of the resistor 674 (e.g., a resistor R5). For example, another terminal of the resistor 674 (e.g., a resistor R5) is biased to the ground voltage on the primary side. As an example, one terminal of the secondary winding 604 is connected to an anode of the diode 676 (e.g., a diode D9), and a cathode of the diode 676 (e.g., a diode D9) is connected to an output terminal 680 and one terminal of the capacitor 678 (e.g., a capacitor C4). For example, another terminal of the secondary winding 604 is connected to an output terminal 682 and another terminal of the capacitor 678 (e.g., a capacitor C4). As an example, the output terminal 680 provides the output voltage 681 (e.g., $V_{out}$) and an output current 683 (e.g., $I_{out}$), and the output terminal 682 is biased to a ground voltage on the secondary side.

According to some embodiments, the output terminal 680 is connected to one terminal of the resistor 684 (e.g., a resistor R10), and another terminal of the resistor 684 (e.g., a resistor R10) is connected to one terminal of the resistor 696 (e.g., a resistor R9), one terminal of the resistor 686 (e.g., a resistor R11), and an input terminal of the error amplifier 698. For example, another terminal of the resistor 696 (e.g., a resistor R9) is connected to one terminal of the capacitor 694 (e.g., a capacitor C5), which includes another terminal connected to a cathode of the light emitting diode 692 (e.g., a light emitting diode D10) and connected to an output terminal of the error amplifier 698. As an example, another terminal of the resistor 686 (e.g., R11) is biased to the ground voltage on the secondary side, and another input terminal of the error amplifier 698 is biased to a reference voltage 697. For example, an anode of the light emitting diode 692 (e.g., a light emitting diode D10) is connected to one terminal of the resistor 688 (e.g., a resistor R8), and another terminal of the resistor 688 (e.g., a resistor R8) is connected to the output terminal 680. As an example, the terminal 638 (e.g., a GND pin) of the PWM controller 630 (e.g., an IC chip) is biased to the ground voltage on the primary side. According to certain embodiments, under the normal operation, when the output voltage 681 (e.g., $V_{out}$) rises, the auxiliary winding 606, together with the diode 670 (e.g., a diode D8), the capacitor 668 (e.g., a capacitor C1) and the resistor 666 (e.g., a resistor R6), raise the voltage 645 at the terminal 644 (e.g., a VDD pin).

Figure 7:
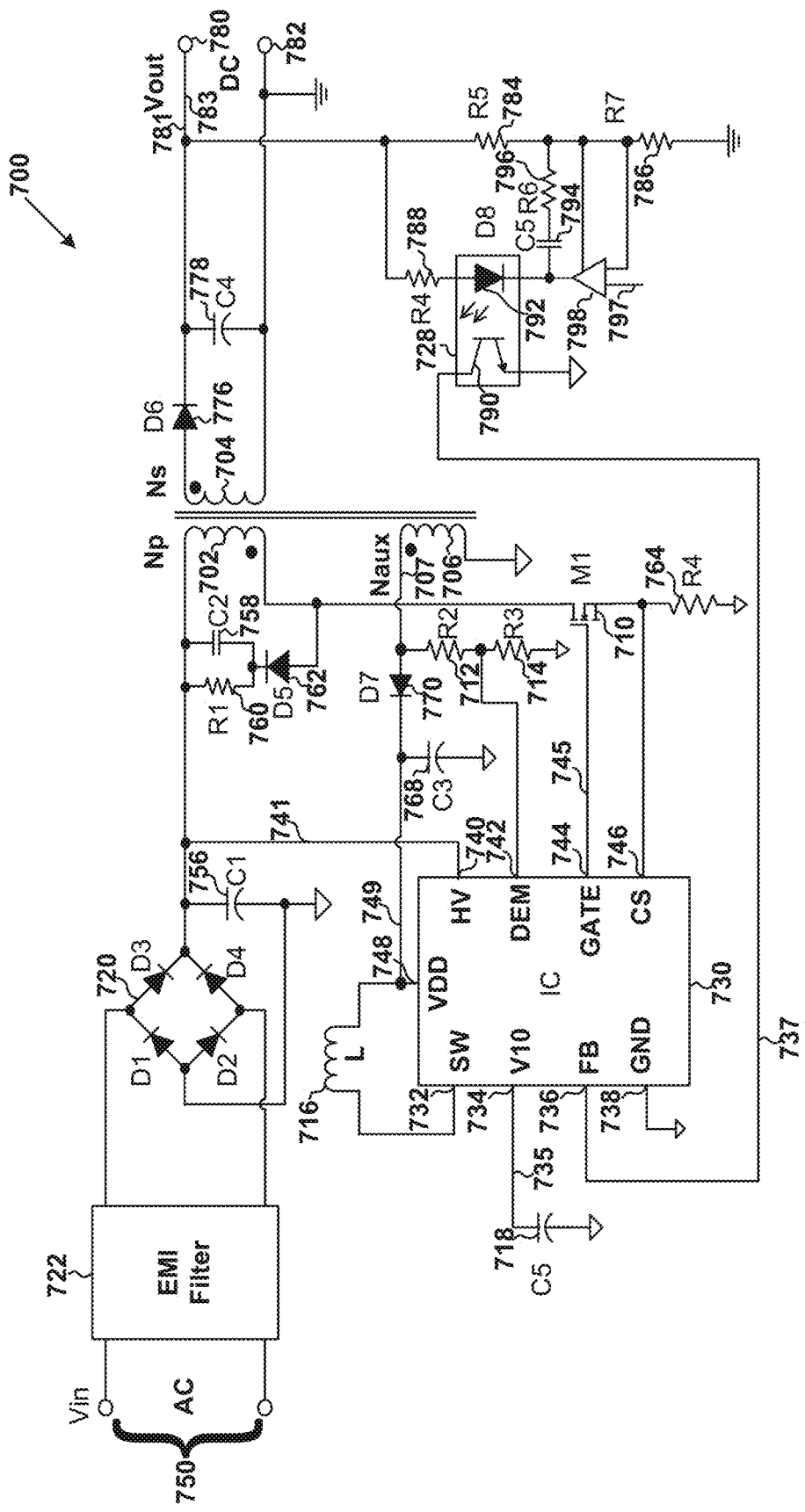
FIG. 7 is a simplified diagram showing a power converter according to some embodiments of the present invention.
Figure 13:
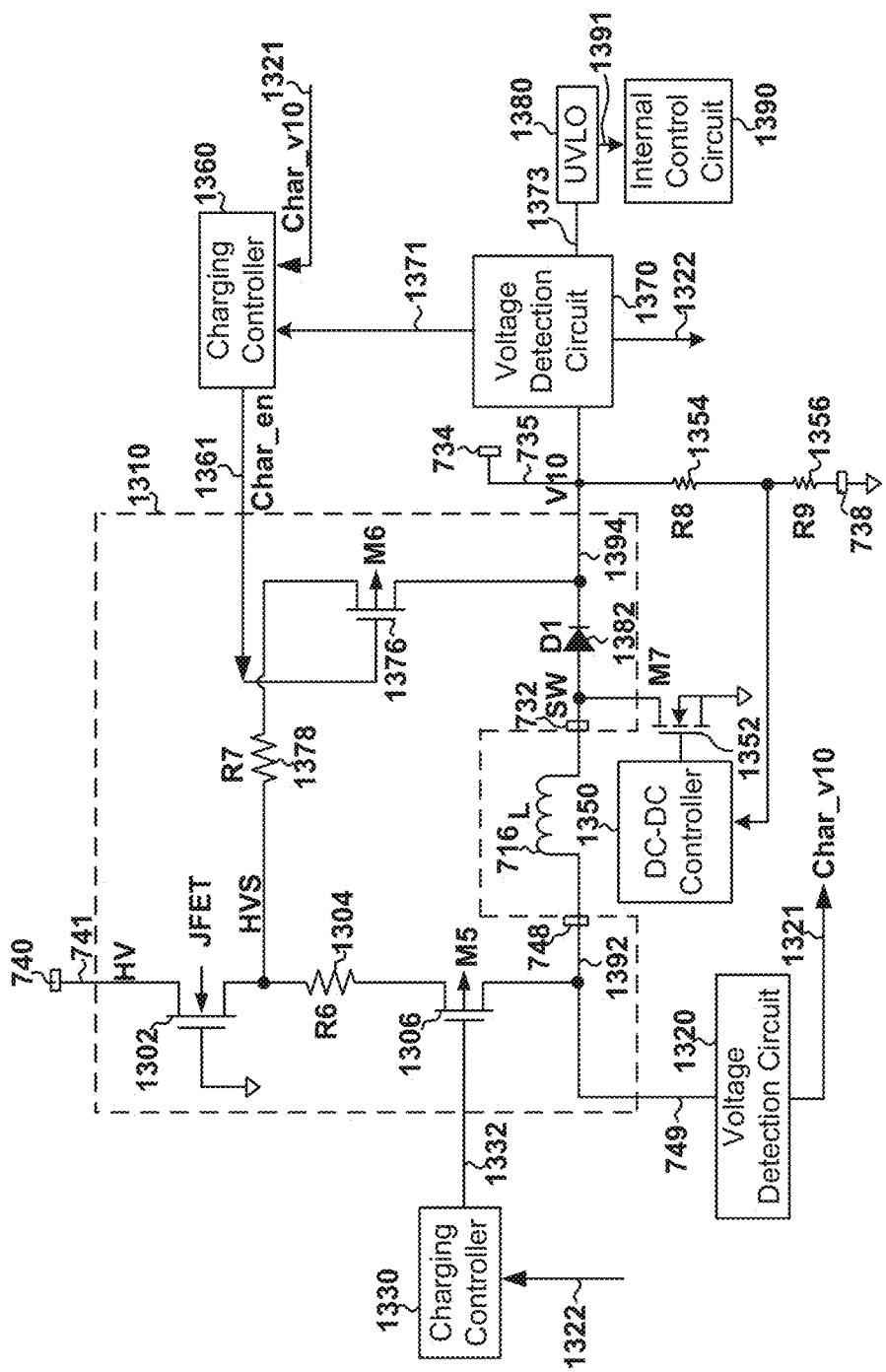
FIG. 13 is a simplified diagram showing certain components of the PWM controller of the power converter as shown in FIG. 7 according to some embodiments of the present invention.
Figure 15:
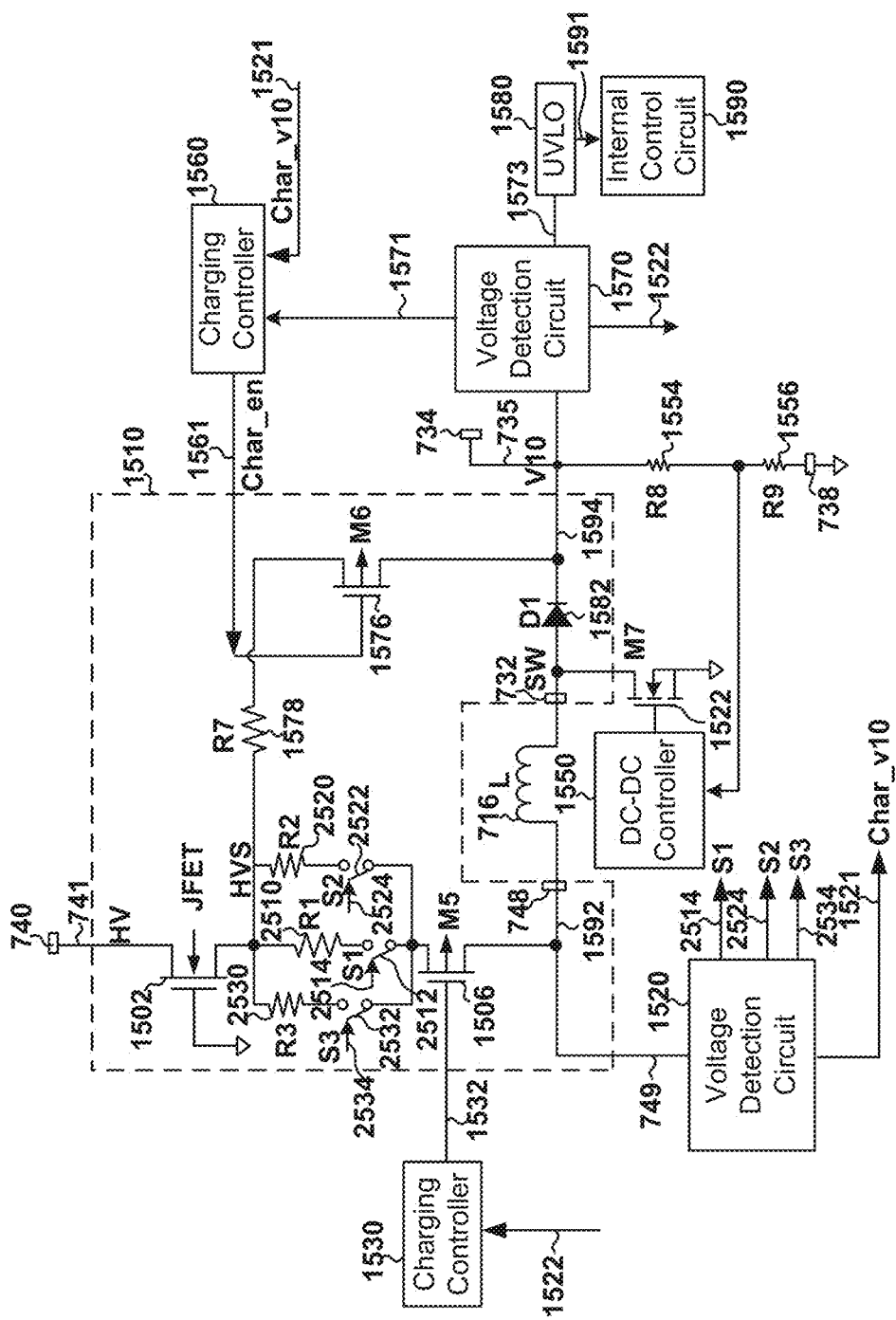
FIG. 15 is a simplified diagram showing certain components of the PWM controller of the power converter as shown in FIG. 7 according to some embodiments of the present invention.
Figure 17:
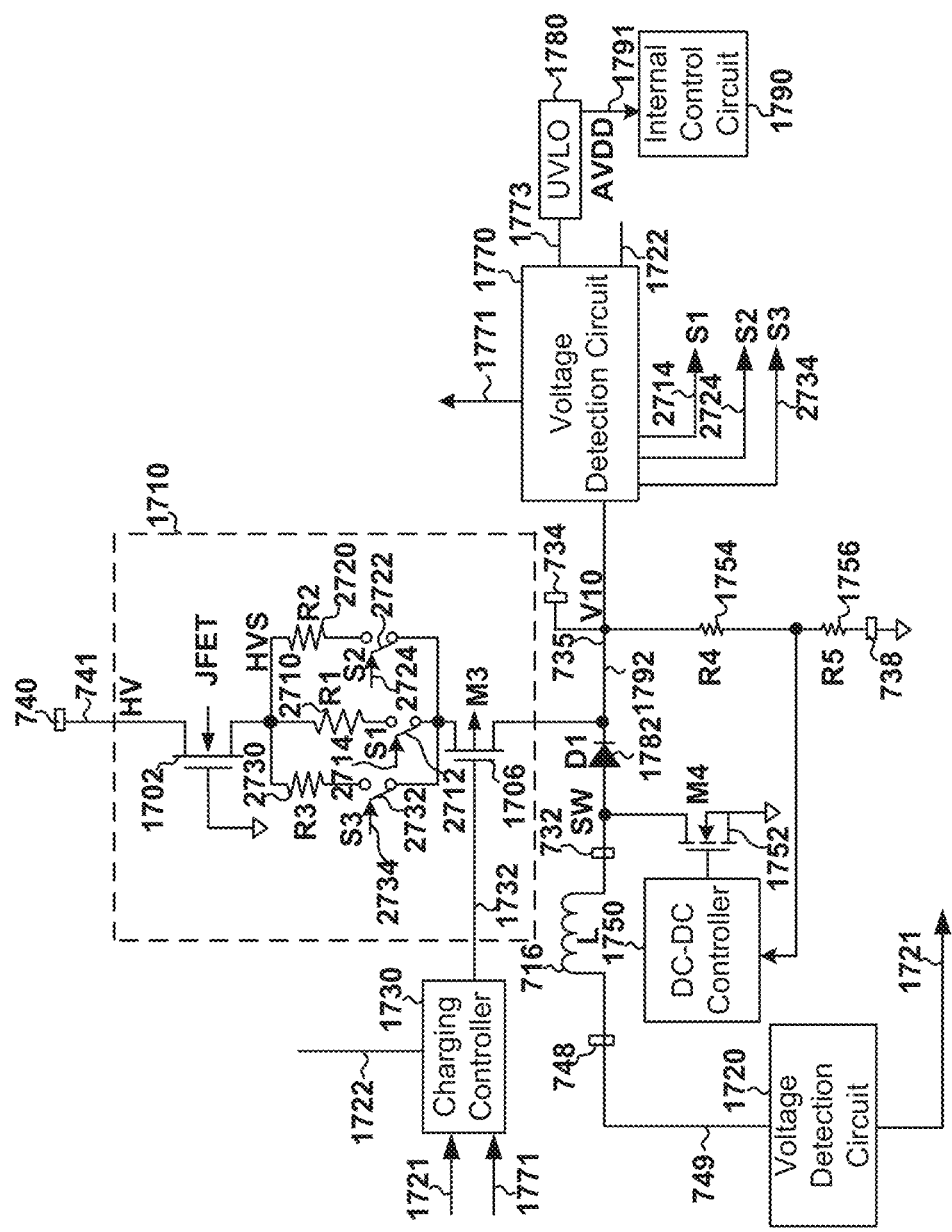
FIG. 17 is a simplified diagram showing certain components of the PWM controller of the power converter as shown in FIG. 7 according to some embodiments of the present invention.

FIG. 7 is a simplified diagram showing a power converter according to some embodiments of the present invention. This diagram is merely an example, which should not unduly limit the scope of the claims. One of ordinary skill in the art would recognize many variations, alternatives, and modifications. The power converter 700 (e.g., an AC-DC power supply) includes a primary winding 702, a secondary winding 704, an auxiliary winding 706, a transistor 710 (e.g., a transistor M1), a rectifier 720 (e.g., a bridge rectifier), a filter 722 for electromagnetic interference (EMI), an optocoupler 728, a pulse-width-modulation (PWM) controller 730 (e.g., an IC chip), resistors 712, 714, 760, 764, 784, 786, 788 and 796, capacitors 718, 756, 758, 768, 778 and 794, diodes 762, 770 and 776, an error amplifier 798, and an inductor 716, where the pulse-width-modulation (PWM) controller 730 (e.g., an IC chip) includes the PWM controller 800 as shown in FIG. 8, the PWM controller 730 as shown in FIG. 13, the PWM controller 730 as shown in FIG. 15, and/or the PWM controller 730 as shown in FIG. 17. For example, the pulse-width-modulation (PWM) controller 730 (e.g., an IC chip) includes a terminal 732 (e.g., a SW pin), a terminal 734 (e.g., a V10 pin), a terminal 736 (e.g., an FB pin), a terminal 738 (e.g., a GND pin), a terminal 740 (e.g., a HV pin), a terminal 742 (e.g., a DEM pin), a terminal 744 (e.g., a GATE pin), a terminal 746 (e.g., a CS pin), and a terminal 748 (e.g., a VDD pin). As an example, the optocoupler 728 includes a light emitting diode 792 and a photosensitive detector 790. For example, the terminal 736 (e.g., an FB pin) is used to receive a feedback signal 737 that represents an output voltage 781 (e.g., $V_{out}$) of the power converter 700, and the terminal 740 (e.g., a HV pin) is used to receive to receive a voltage 741. As an example, the error amplifier 798 includes TL431.

As shown in FIG. 7, the EMI filter 722 receives an alternating current (AC) voltage 750 according to some embodiments. For example, two output terminals of the EMI filter 722 are connected to two input terminals of the rectifier 720 (e.g., a bridge rectifier) respectively. As an example, the rectifier 720 (e.g., a bridge rectifier) includes four diodes (e.g., diodes D1, D2, D3, and D4). For example, one output terminal of the rectifier 720 (e.g., a bridge rectifier) is connected to one plate of the capacitor 756 (e.g., a capacitor C1) that is biased to a ground voltage on the primary side, and another output terminal of the rectifier 720 (e.g., a bridge rectifier) is connected to another plate of the capacitor 756 (e.g., a capacitor C1) that is connected to one terminal of the resistor 760 (e.g. a resistor R1), one terminal of the capacitor 758 (e.g., a capacitor C2), and one terminal of the primary winding 702. As an example, another terminal of the resistor 760 (e.g. a resistor R1) and another terminal of the capacitor 758 (e.g., a capacitor C2) both are connected to a cathode of the diode 762 (e.g., a diode D5). For example, an anode of the diode 762 (e.g., a diode D5) is connected to a drain terminal of the transistor 710 (e.g., a transistor M1) and another terminal of the primary winding 702.

According to certain embodiments, a gate terminal of the transistor 710 (e.g., a transistor M1) receives a drive signal 745 from the terminal 744 (e.g., a GATE pin) of the PWM controller 730 (e.g., an IC chip), and a source terminal of the transistor 710 (e.g., a transistor M1) is connected to the terminal 746 (e.g., a CS pin) of the PWM controller 730 (e.g., an IC chip) and also connected to one terminal of the resistor 764 (e.g., a resistor R4). For example, another terminal of the resistor 764 (e.g., a resistor R4) is biased to the ground voltage on the primary side. As an example, the terminal 748 (e.g., a VDD pin) of the pulse-width-modulation (PWM) controller 730 (e.g., an IC chip) is connected to one terminal of the inductor 716 (e.g., an inductor L), one plate of the capacitor 768 (e.g., a capacitor C3) and a cathode of the diode 770 (e.g., a diode D7). For example, the terminal 748 (e.g., a VDD pin) is at a voltage 749. As an example, another terminal of the inductor 716 (e.g., an inductor L) is connected to the terminal 732 (e.g., a SW pin) of the PWM controller 730 (e.g., an IC chip). For example, another plate of the capacitor 768 (e.g., a capacitor C3) is biased to the ground voltage on the primary side. As an example, an anode of the diode 770 (e.g., a diode D7) is connected to one terminal of the resistor 712 (e.g., a resistor R2) and one terminal of the auxiliary winding 706 that corresponds to a voltage 707. For example, another terminal of the auxiliary winding 706 is biased to the ground voltage on the primary side. As an example, another terminal of the resistor 712 (e.g., a resistor R2) is connected to the terminal 742 (e.g., a DEM pin) of the PWM controller 730 (e.g., an IC chip) and one terminal of the resistor 714 (e.g., a resistor R3). For example, another terminal of the resistor 714 (e.g., a resistor R3) is biased to the ground voltage on the primary side. As an example, the terminal 734 (e.g., a V10 pin) of the PWM controller 730 (e.g., an IC chip) is connected to one terminal of the capacitor 718 (e.g., a capacitor C5), and another terminal of the capacitor 718 (e.g., a capacitor C5) is biased to the ground voltage on the primary side. For example, the terminal 734 (e.g., a V10 pin) is at a voltage 735.

In some embodiments, one terminal of the secondary winding 704 is connected to an anode of the diode 776 (e.g., a diode D6), and a cathode of the diode 776 (e.g., a diode D6) is connected to an output terminal 780 and one terminal of the capacitor 778 (e.g., a capacitor C4). For example, another terminal of the secondary winding 704 is connected to an output terminal 782 and another terminal of the capacitor 778 (e.g., a capacitor C4). As an example, the output terminal 780 provides the output voltage 781 (e.g., $V_{out}$) and an output current 783 (e.g., $I_{out}$), and the output terminal 782 is biased to a ground voltage on the secondary side.

According to certain embodiments, the output terminal 780 is connected to one terminal of the resistor 784 (e.g., a resistor R5), and another terminal of the resistor 784 (e.g., a resistor R5) is connected to one terminal of the resistor 796 (e.g., a resistor R6), one terminal of the resistor 786 (e.g., a resistor R7), and an input terminal of the error amplifier 798. For example, another terminal of the resistor 796 (e.g., a resistor R6) is connected to one terminal of the capacitor 794 (e.g., a capacitor C5), which includes another terminal connected to a cathode of the light emitting diode 792 (e.g., a light emitting diode D8) and connected to an output terminal of the error amplifier 798. As an example, another terminal of the resistor 786 (e.g., R7) is biased to the ground voltage on the secondary side, and another input terminal of the error amplifier 798 is biased to a reference voltage 797. For example, an anode of the light emitting diode 792 (e.g., a light emitting diode D8) is connected to one terminal of the resistor 788 (e.g., a resistor R4), and another terminal of the resistor 788 (e.g., a resistor R4) is connected to the output terminal 780. As an example, the terminal 738 (e.g., a GND pin) of the PWM controller 730 (e.g., an IC chip) is biased to the ground voltage on the primary side. According to certain embodiments, under the normal operation, when the output voltage 781 (e.g., $V_{out}$) rises, the auxiliary winding 706, together with the diode 770 (e.g., a diode D7) and the capacitor 768 (e.g., a capacitor C3), raises the voltage 749 at the terminal 748 (e.g., a VDD pin).

FIG. 8 is a simplified diagram showing certain components of the PWM controller 630 of the power converter 600 as shown in FIG. 6 and/or certain components of the PWM controller 730 of the power converter 700 as shown in FIG. 7 according to some embodiments of the present invention. This diagram is merely an example, which should not unduly limit the scope of the claims. One of ordinary skill in the art would recognize many variations, alternatives, and modifications. The PWM controller 800 (e.g., the PWM controller 630 and/or the PWM controller 730) includes a charging circuit 810, a voltage detection circuit 820, and a charging controller 830. Additionally, the PWM controller 800 (e.g., an IC chip) includes a terminal 870 (e.g., a pin), a terminal 880 (e.g., a pin) and a terminal 890 (e.g., a pin). In some examples, the PWM controller 800 (e.g., an IC chip) is the PWM controller 630 (e.g., an IC chip), the terminal

870 (e.g., a pin) is the terminal 640 (e.g., a HV pin), the terminal 880 (e.g., a pin) is the terminal 644 (e.g., a VDD pin), and the terminal 890 (e.g., a pin) is also the terminal 644 (e.g., a VDD pin), where the terminal 880 (e.g., a pin) and the terminal 890 (e.g., a pin) are the same terminal. In certain examples, the PWM controller 800 (e.g., an IC chip) is the PWM controller 730 (e.g., an IC chip), the terminal 870 (e.g., a pin) is the terminal 740 (e.g., a HV pin), the terminal 880 (e.g., a pin) is the terminal 748 (e.g., a VDD pin), and the terminal 890 (e.g., a pin) is the terminal 734 (e.g., a V10 pin).

According to certain embodiments, the voltage detection circuit 820 receives a signal 882 from the terminal 880 (e.g., terminal 644 and/or the terminal 748) and generates a signal 822 based at least in part on the signal 882. In some examples, the charging controller 830 receives the signal 822 and generates a signal 832 based in part on the signal 822. For example, the signal 832 is used to connect (e.g., turn on) the charging circuit 810 so that the charging circuit 810 is allowed to use a signal 872 from the terminal 870 (e.g., the terminal 640 and/or the terminal 740) to charge the terminal 890 (e.g., the terminal 644 and/or the terminal 734). As an example, the signal 832 is used to disconnect (e.g., turn off) the charging circuit 810 so that the charging circuit 810 is not allowed to use the signal 872 from the terminal 870 (e.g., the terminal 640 and/or the terminal 740) to charge the terminal 890 (e.g., the terminal 644 and/or the terminal 734). In certain examples, the charging circuit 810 receives the signal 832 from the charging controller 830 and the signal 872 from the terminal 870 (e.g., the terminal 640 and/or the terminal 740) and generates a signal 892 based at least in part on the signals 832 and 872. For example, the signal 892 is received by the terminal 890 (e.g., the terminal 644 and/or the terminal 734).

According to some embodiments, the voltage detection circuit 820 detects whether the signal 882 (e.g., the voltage 645 and/or the voltage 749) drops to a lower predetermined threshold (e.g., VDD_HV_ON) and whether the signal 882 (e.g., the voltage 645 and/or the voltage 749) rises to a higher predetermined threshold (e.g., VDD_HV_OFF). For example, the higher predetermined threshold (e.g., VDD_HV_OFF) is larger than the lower predetermined threshold (e.g., VDD_HV_ON). As an example, the voltage detection circuit 820 detects whether the signal 882 (e.g., the voltage 645 and/or the voltage 749) drops to the lower predetermined threshold (e.g., VDD_HV_ON) and whether the signal 882 (e.g., the voltage 645 and/or the voltage 749) rises to the higher predetermined threshold (e.g., VDD_HV_OFF) under certain dynamic-load and/or no-load conditions of the power converter 600 and/or the power converter 700.

In certain examples, if the voltage detection circuit 820 determines that the signal 882 (e.g., the voltage 645 and/or the voltage 749) drops to the lower predetermined threshold (e.g., VDD_HV_ON), the voltage detection circuit 820 generates the signal 822 (e.g., Char_v10), and in response to receiving the signal 822 (e.g., Char_v10), the charging controller 830 generates the signal 832 in order to connect (e.g., turn on) the charging circuit 810. As an example, if the charging circuit 810 is connected (e.g., turned on), the charging circuit 810 uses the signal 872 (e.g., the voltage 641 and/or the voltage 741) to generate the signal 892 and charge the terminal 890 (e.g., the terminal 644 and/or the terminal 734). For example, when the terminal 890 (e.g., the terminal 644 and/or the terminal 734) is being charged by the charging circuit 810, the voltage 645 and/or the voltage 735 at the terminal 890 (e.g., the terminal 644 and/or the terminal 734) is supported by the signal 892 from the charging circuit 810, in addition to being supported by charges on the capacitor 668 and/or the capacitor 718, in order to avoid triggering undervoltage protection in response to insufficient voltage 645 and/or the voltage 735 under certain dynamic-load and/or no-load conditions of the power converter 600 and/or the power converter 700 respectively.

In some examples, if the voltage detection circuit 820 determines that the signal 882 (e.g., the voltage 645 and/or the voltage 749) rises to the higher predetermined threshold (e.g., VDD_HV_OFF), the voltage detection circuit 820 generates the signal 822 (e.g., Char_v10), and in response to receiving the signal 822 (e.g., Char_v10), the charging controller 830 generates the signal 832 in order to disconnect (e.g., turn off) the charging circuit 810. As an example, if the charging circuit 810 is disconnected (e.g., turned off), the charging circuit 810 does not charge the terminal 890 (e.g., the terminal 644 and/or the terminal 734), in order to avoid extra power consumption by the charging circuit 810 and to improve power efficiency of the power converter 600 and/or the power converter 700 respectively.

FIG. 9 is a simplified diagram showing certain components of the PWM controller 630 of the power converter 600 as shown in FIG. 6 according to some embodiments of the present invention. This diagram is merely an example, which should not unduly limit the scope of the claims. One of ordinary skill in the art would recognize many variations, alternatives, and modifications. The PWM controller 630 includes a charging circuit 910, a voltage detection circuit 920, a charging controller 930, a circuit 980 for undervoltage-lockout (UVLO), and an internal control circuit 990. Additionally, the PWM controller 630 (e.g., an IC chip) includes the terminal 640 (e.g., a HV pin) and the terminal 644 (e.g., a VDD pin). In certain examples, the charging circuit 810 includes a transistor 902 (e.g., a junction field-effect transistor), a resistor 904 (e.g., a resistor R1), and a transistor 906 (e.g., a metal-oxide-semiconductor field-effect transistor). In some examples, the charging circuit 910 is an example of the charging circuit 810, the voltage detection circuit 920 is an example of the voltage detection circuit 820, and the charging controller 930 is an example of the charging controller 830.

In certain embodiments, a drain terminal of the transistor 902 (e.g., JFET) is connected to the terminal 640 (e.g., a HV pin), the gate terminal of the transistor 902 (e.g., JFET) is biased to the ground voltage on the primary side of the power converter 600, and a source terminal of the transistor 902 (e.g., JFET) is connected to one terminal of the resistor 904 (e.g., a resistor R1). For example, another terminal of the resistor 904 (e.g., a resistor R1) is connected to a source terminal of the transistor 906 (e.g., a transistor M2). As an example, a gate terminal of the transistor 906 (e.g., a transistor M2) receives a signal 932 (e.g., the signal 832) from the charging controller 930 (e.g., the charging controller 830). For example, a drain terminal of the transistor 906 (e.g., a transistor M2) is connected to the terminal 644 (e.g., a VDD pin).

In some embodiments, an input terminal of the voltage detection circuit 920 (e.g., the voltage detection circuit 820) receives the voltage 645 from the terminal 644 (e.g., a VDD pin). For example, the voltage detection circuit 920 (e.g., the voltage detection circuit 820) generates a signal 922 (e.g., the signal 822) and sends the signal 922 (e.g., the signal 822) to the charging controller 930 (e.g., the charging controller 830). As an example, the voltage detection circuit 920 (e.g., the voltage detection circuit 820) generates a signal 924 and sends the signal 924 to the circuit 980 for undervoltage-lockout (UVLO). In certain examples, an output terminal of the circuit 980 for undervoltage-lockout (UVLO) is connected to an input terminal of the internal control circuit 990. As an example, the internal control circuit 990 includes various control circuits, and the internal control circuit 990 does not include the charging controller 930. For example, the internal control circuit 990 includes one or more control circuits for one or more oscillators, one or more control circuits for one or more timers, one or more drivers, one or more logic control circuits, and/or one or more protection circuits.

As shown in FIG. 6, after the EMI filter 622 receives the AC voltage 650, the PWM controller 630 (e.g., an IC chip) undergoes a startup process according to certain embodiments. In some examples, during the startup process, if the voltage detection circuit 920 (e.g., the voltage detection circuit 820) determines that the voltage 645 has not reached a startup threshold (e.g., VDD_UVLO), the voltage detection circuit 920 (e.g., the voltage detection circuit 820) generates the signal 922 (e.g., the signal 822), so that the charging controller 930 generates the signal 932 (e.g., the signal 832) to turn on the transistor 906 (e.g., a transistor M2) and the charging circuit 910 (e.g., the charging circuit 810) generates a charging current 992 (e.g., the signal 892) to charge the capacitor 668 (e.g., a capacitor C1) and raise the voltage 645, until the voltage 645 reaches the startup threshold (e.g., VDD_UVLO). In certain examples, before the voltage 645 reaches the startup threshold (e.g., VDD_UVLO), the voltage detection circuit 920 (e.g., the voltage detection circuit 820) generates the signal 924, so that the circuit 980 for undervoltage-lockout (UVLO) does not generate the signal 921 that indicates the end of the startup process and causes the internal control circuit 990 to power on other components of the PWM controller 630 (e.g., an IC chip). For example, during the startup process, other components of the PWM controller 630 (e.g., an IC chip) remain powered off.

According to some embodiments, if the voltage detection circuit 920 (e.g., the voltage detection circuit 820) determines that the voltage 645 has risen above the startup threshold (e.g., VDD_UVLO), the voltage detection circuit 920 (e.g., the voltage detection circuit 820) generates the signal 922 (e.g., the signal 822), so that the charging controller 930 generates the signal 932 (e.g., the signal 832) to turn off the transistor 906 (e.g., a transistor M2) and the charging circuit 910 (e.g., the charging circuit 810) does not charge the capacitor 668 (e.g., a capacitor C1). In some examples, after the voltage detection circuit 920 (e.g., the voltage detection circuit 820) determines that the voltage 645 has risen above the startup threshold (e.g., VDD_UVLO), the startup process of the PWM controller 630 (e.g., an IC chip) ends and the normal operation for the power converter 600 starts. For example, at the beginning of the normal operation, the voltage detection circuit 920 (e.g., the voltage detection circuit 820) generates the signal 924, so that the circuit 980 for undervoltage-lockout (UVLO) generates the signal 921 that indicates the end of the startup process and causes the internal control circuit 990 to power on other components of the PWM controller 630 (e.g., an IC chip). As an example, during the normal operation, other components of the PWM controller 630 (e.g., an IC chip) remain powered on.

According to certain embodiments, the voltage detection circuit 920 (e.g., the voltage detection circuit 820) also determines whether the voltage 645 drops to a lower predetermined threshold (e.g., VDD_HV_ON) and whether the voltage 645 rises to a higher predetermined threshold (e.g., VDD_HV_OFF). For example, the higher predetermined threshold (e.g., VDD_HV_OFF) is larger than the lower predetermined threshold (e.g., VDD_HV_ON), and the lower predetermined threshold (e.g., VDD_HV_ON) is larger than the startup threshold (e.g., VDD_UVLO).

In certain embodiments, during the normal operation, if the voltage detection circuit 920 (e.g., the voltage detection circuit 820) determines that the voltage 645 drops to a lower predetermined threshold (e.g., VDD_HV_ON), the voltage detection circuit 920 (e.g., the voltage detection circuit 820) generates the signal 922 (e.g., the signal 822), so that the charging controller 930 generates the signal 932 (e.g., the signal 832) to turn on the transistor 906 (e.g., a transistor M2). For example, if the transistor 906 (e.g., a transistor M2) is turned on, the charging circuit 910 (e.g., the charging circuit 810) generates a charging current 992 (e.g., the signal 892) to flow through the terminal 644 (e.g., a VDD pin) and to charge the capacitor 668 (e.g., a capacitor C1) and raise the voltage 645. As an example, during the normal operation, under certain dynamic-load and/or no-load conditions, the charging circuit 910 (e.g., the charging circuit 810) generates the charging current 992 (e.g., the signal 892) to flow through the terminal 644 (e.g., a VDD pin) and to charge the capacitor 668 (e.g., a capacitor C1) and raise the voltage 645, in order to prevent insufficient power supply to the PWM controller 630 (e.g., an IC chip).

In some embodiments, during the normal operation, if the voltage detection circuit 920 (e.g., the voltage detection circuit 820) determines that the voltage 645 rises to a higher predetermined threshold (e.g., VDD_HV_OFF), the voltage detection circuit 920 (e.g., the voltage detection circuit 820) generates the signal 922 (e.g., the signal 822), so that the charging controller 930 generates the signal 932 (e.g., the signal 832) to turn off the transistor 906 (e.g., a transistor M2). For example, if the transistor 906 (e.g., a transistor M2) is turned off, the charging circuit 910 (e.g., the charging circuit 810) does not charge the capacitor 668 (e.g., a capacitor C1). As an example, during the normal operation, under certain dynamic-load and/or no-load conditions, the charging circuit 910 (e.g., the charging circuit 810) does not charge the capacitor 668 (e.g., a capacitor C1) in order to reduce power consumption of the PWM controller 630 (e.g., an IC chip).

As discussed above and further emphasized here, FIG. 9 is merely an example, which should not unduly limit the scope of the claims. One of ordinary skill in the art would recognize many variations, alternatives, and modifications. For example, the voltage detection circuit 920 is part of the circuit 980 for undervoltage-lockout (UVLO), and the signal 924 is internal to the circuit 980 for undervoltage-lockout (UVLO).

Figure 10:
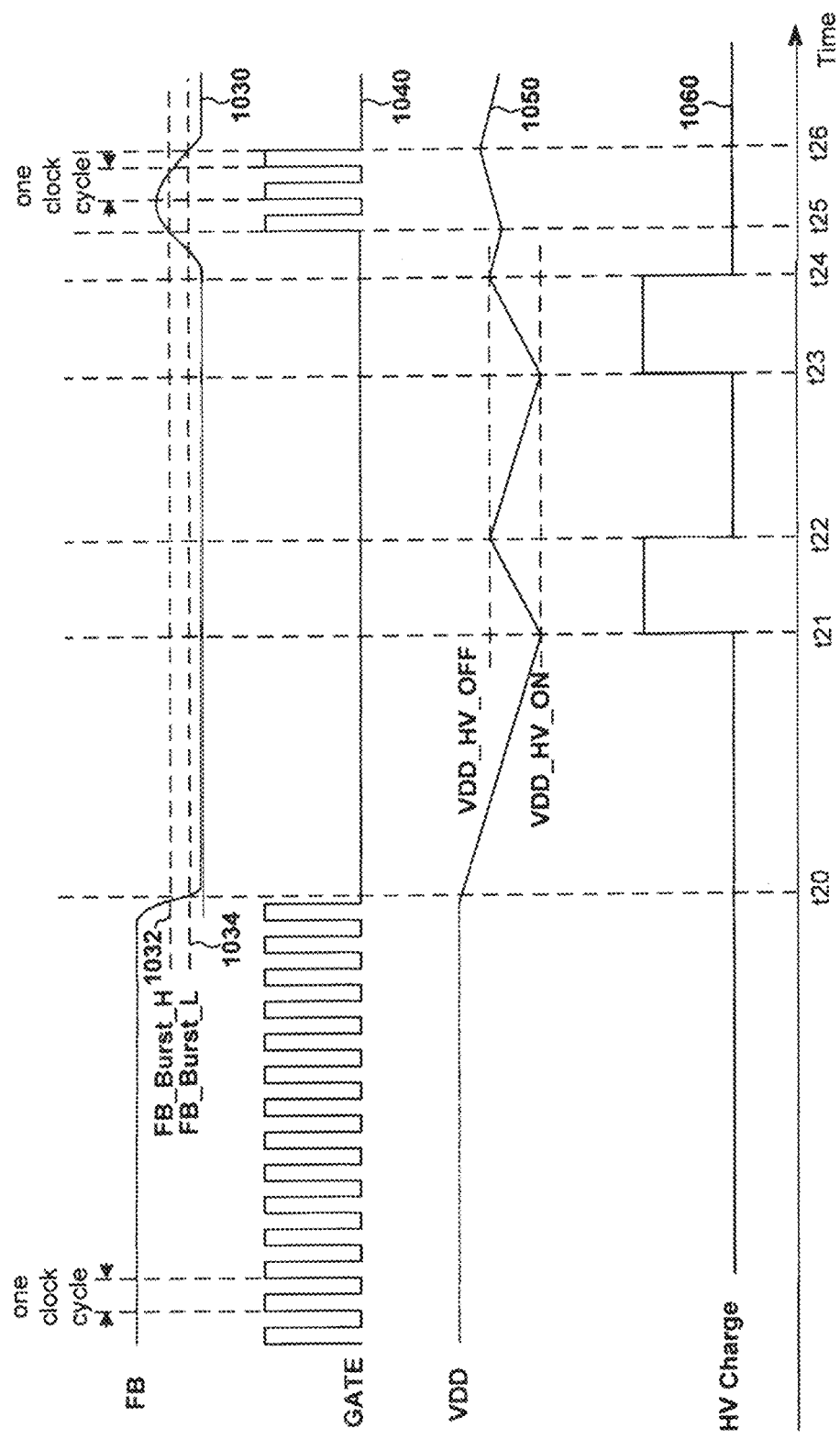
FIG. 10 shows simplified timing diagrams under certain dynamic-load and/or no-load conditions for the power converter that includes the PWM controller as shown in FIG. 6 and FIG. 9 according to some embodiments.

FIG. 10 shows simplified timing diagrams under certain dynamic-load and/or no-load conditions for the power converter 600 that includes the PWM controller 630 as shown in FIG. 6 and FIG. 9 according to some embodiments. These diagrams are merely examples, which should not unduly limit the scope of the claims. One of ordinary skill in the art would recognize many variations, alternatives, and modifications. The waveform 1030 represents the feedback signal 635 as a function of time, the waveform 1040 represents the drive signal 647 as a function of time, the waveform 1050 represents the voltage 645 (e.g., $V_{DD}$) as a function of time, and the waveform 1060 represents the signal 932 as a function of time.

According to some embodiments, the waveforms 1030, 1040, 1050, and 1060 are timing diagrams when the power converter 600 is under the normal operation after the voltage 645 has risen above the startup threshold (e.g., VDD_UVLO). For example, at the beginning of the normal operation, the voltage detection circuit 920 generates the signal 924, so that the circuit 980 for undervoltage-lockout (UVLO) generates the signal 921 that indicates the end of the startup process and causes the internal control circuit 990 to power on other components of the PWM controller 630 (e.g., an IC chip). As an example, during the normal operation, other components of the PWM controller 630 (e.g., an IC chip) remains powered on. For example, the higher predetermined threshold (e.g., VDD_HV_OFF) is larger than the lower predetermined threshold (e.g., VDD_HV_ON), and the lower predetermined threshold (e.g., VDD_HV_ON) is larger than the startup threshold (e.g., VDD_UVLO).

As shown in FIG. 10, at time $t_{20}$, the feedback signal 635 becomes smaller than a signal threshold 1034 (e.g., FB_Burst_L), and at time $t_{25}$, the feedback signal 635 becomes larger than a signal threshold 1032 (e.g., FB_Burst_H) as shown by the waveform 1030 according to certain embodiments. For example, at time $t_{26}$, the feedback signal 635 again becomes smaller than the signal threshold 1034 (e.g., FB_Burst_L) as shown by the waveform 1030. As an example, the signal threshold 1032 (e.g., FB_Burst_H) is larger than the signal threshold 1034 (e.g., FB_Burst_L) in magnitude.

In some embodiments, before time $t_{20}$, the drive signal 647 changes between a logic high level and a logic low level within each clock cycle, and from time $t_{25}$ to time $t_{26}$, the drive signal 647 changes between the logic high level and the logic low level within each clock cycle as shown by the waveform 1040. In certain embodiments, from time $t_{20}$ to time $t_{25}$, the drive signal 647 remains at the logic low level during multiple clock cycles, and after time $t_{26}$, the drive signal 647 remains at the logic low level during multiple clock cycles as shown by the waveform 1040.

As shown by the waveform 1050, from time $t_{20}$ to time $t_{21}$, the voltage 645 (e.g., VDD) decreases with time, and at time $t_{21}$, the voltage 645 (e.g., $V_{DD}$) decreases to the lower predetermined threshold (e.g., VDD_HV_ON) according to some embodiments. For example, at time $t_{21}$, in response to the voltage 645 (e.g., $V_{DD}$) decreasing to the lower predetermined threshold (e.g., VDD_HV_ON), the signal 932 changes from the logic low level to the logic high level in order to turn on the transistor 906 (e.g., a transistor M2) as shown by the waveform 1060.

According to certain embodiments, from time $t_{21}$ to time $t_{22}$, the signal 932 remains at the logic high level as shown by the waveform 1060, the transistor 906 (e.g., a transistor M2) remains turned on, and the voltage 645 (e.g., $V_{DD}$) increases with time as shown by the waveform 1050. For example, at time $t_{22}$, the voltage 645 (e.g., $V_{DD}$) increases to the higher predetermined threshold (e.g., VDD_HV_OFF) as shown by the waveform 1050. As an example, at time $t_{22}$, in response to the voltage 645 (e.g., $V_{DD}$) increasing to the higher predetermined threshold (e.g., VDD_HV_OFF), the signal 932 changes from the logic high level to the logic low level in order to turn off the transistor 906 (e.g., a transistor M2) as shown by the waveform 1060.

As shown by the waveform 1050, from time $t_{22}$ to time $t_{23}$, the voltage 645 (e.g., VDD) decreases with time, and at time $t_{23}$, the voltage 645 (e.g., $V_{DD}$) decreases to the lower predetermined threshold (e.g., VDD_HV_ON) according to some embodiments. For example, at time $t_{23}$, in response to the voltage 645 (e.g., $V_{DD}$) decreasing to the lower predetermined threshold (e.g., VDD_HV_ON), the signal 932 changes from the logic low level to the logic high level in order to turn on the transistor 906 (e.g., a transistor M2) as shown by the waveform 1060.

According to certain embodiments, from time $t_{23}$ to time $t_{24}$, the signal 932 remains at the logic high level as shown by the waveform 1060, the transistor 906 (e.g., a transistor M2) remains turned on, and the voltage 645 (e.g., $V_{DD}$) increases with time as shown by the waveform 1050. For example, at time $t_{24}$, the voltage 645 (e.g., $V_{DD}$) increases to the higher predetermined threshold (e.g., VDD_HV_OFF) as shown by the waveform 1050. As an example, at time $t_{24}$, in response to the voltage 645 (e.g., $V_{DD}$) increasing to the higher predetermined threshold (e.g., VDD_HV_OFF), the signal 932 changes from the logic high level to the logic low level in order to turn off the transistor 906 (e.g., a transistor M2) as shown by the waveform 1060.

In some embodiments, as shown by the waveform 1060, the signal 932 remains at the logic low level before time $t_{21}$, change from the logic low level to the logic high level at time $t_{21}$, remains at the logic high level from time $t_{21}$ to time $t_{22}$, changes from the logic high level to the logic low level at time $t_{22}$, remains at the logic low level from time $t_{22}$ to time $t_{23}$, changes from the logic low level to the logic high level at time $t_{23}$, remains at the logic high level from time $t_{23}$ to time $t_{24}$, changes from the logic high level to the logic low level at time $t_{24}$, and remains at the logic low level after time $t_{24}$.

Figure 3:
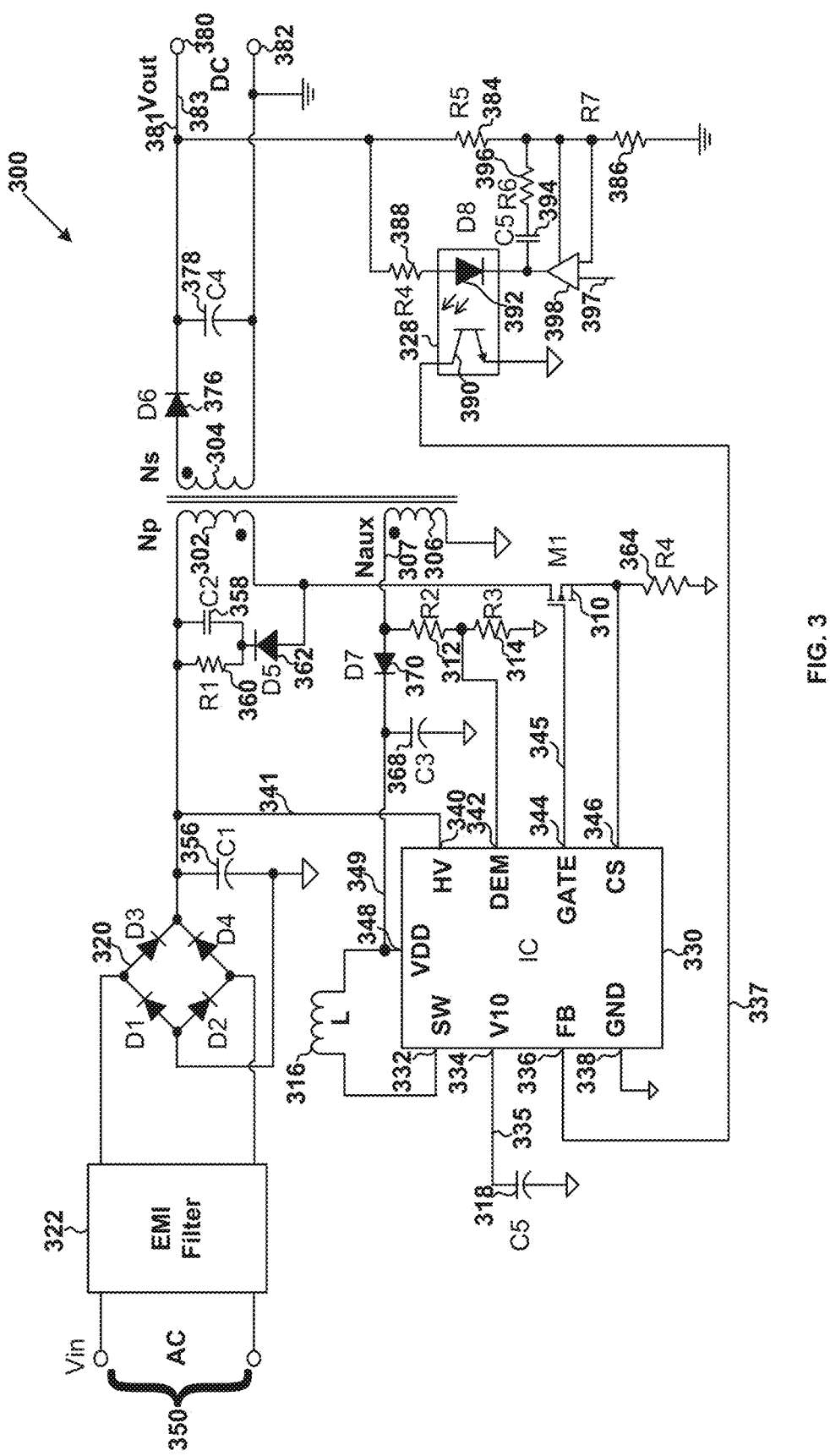
FIG. 3 is a simplified diagram showing another conventional power converter.
Figure 11:
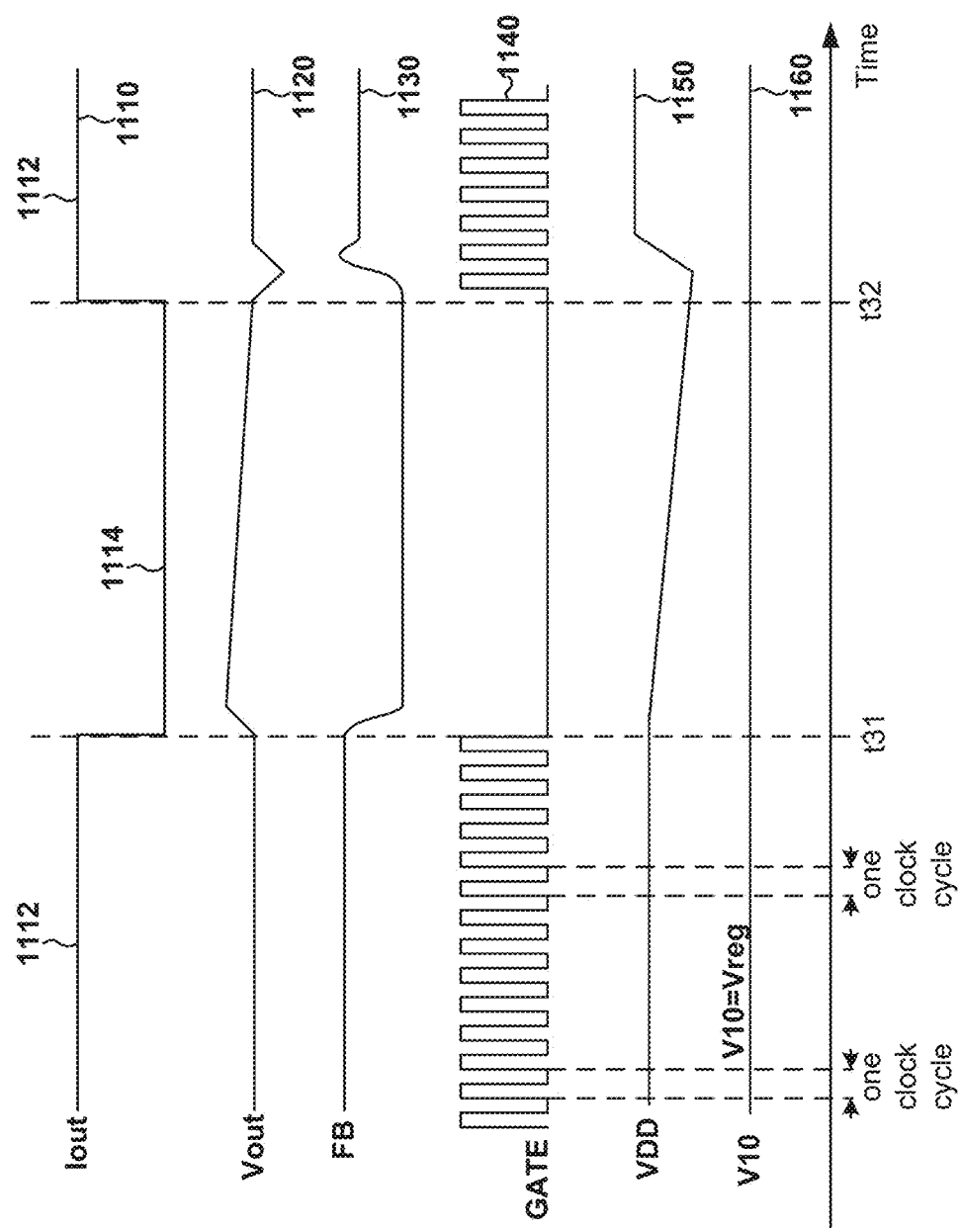
FIG. 11 shows simplified timing diagrams under certain dynamic-load conditions for the power converter as shown in FIG. 3 according to certain embodiments.

FIG. 11 shows simplified timing diagrams under certain dynamic-load conditions for the power converter 300 as shown in FIG. 3 according to certain embodiments. The waveform 1110 represents the output current 383 (e.g., $I_{out}$) as a function of time, the waveform 1120 represents the output voltage 381 (e.g., $V_{out}$) as a function of time, the waveform 1130 represents the feedback signal 337 as a function of time, the waveform 1140 represents the drive signal 345 as a function of time, the waveform 1150 represents the voltage 349 (e.g., $V_{DD}$) as a function of time, and the waveform 1160 represents the voltage 335 (e.g., V1o) as a function of time.

In some embodiments, before time $t_{31}$, the output current 383 (e.g., $I_{out}$) is at a current level 1112, and within each clock cycle, the drive signal 345 changes between a logic high level and a logic low level. For example, at time $t_{31}$, the output current 383 (e.g., $I_{out}$) decreases from the current level 1112 to a current level 1114. As an example, from time $t_{31}$ to time $t_{32}$, the output current 383 (e.g., $I_{out}$) remains at the current level 1114. For example, at time $t_{32}$, the output current 383 (e.g., $I_{out}$) increases from the current level 1114 to the current level 1112. As an example, after time $t_{32}$, the output current 383 (e.g., $I_{out}$) remains at the current level 1112. In some examples, the current level 1112 is higher than the current level 1114. For example, if the output current 383 (e.g., $I_{out}$) is at the current level 1112, the power converter 300 is under a high-load condition. As an example, if the output current 383 (e.g., $I_{out}$) is at the current level 1114, the power converter 300 is under a light-load condition. In certain embodiments, from time $t_{31}$ to time $t_{32}$, the power converter 300 is under the light-load condition. For example, under the light-load condition, after time $t_{31}$ but before time $t_{32}$, the output voltage 381 (e.g., $V_{out}$) overshoots as shown by the waveform 1120, the feedback signal 337 drops as shown by the waveform 1130, the drive signal 345 remains at the logic low level during multiple clock cycles as shown by the waveform 1140, and the voltage 349 (e.g., $V_{DD}$) decreases gradually as shown by the waveform 1150. In certain embodiments, from time $t_{31}$ to time $t_{32}$, even though the voltage 349 (e.g., $V_{DD}$) decreases gradually as shown by the waveform 1150, the voltage 335 (e.g., $V_{1o}$) remains equal to the reference voltage (e.g., $V_{reg}$) as shown by the waveform 1160. For example, the voltage 335 (e.g., $V_{10}$) is generated by the internal DC-DC converter of the PWM controller 330 (e.g., an IC chip) based on the voltage 349 (e.g., $V_{DD}$). As an example, the generated voltage 335 (e.g., $V_{10}$) remains constant as shown by the waveform 1160.

According to some embodiments, under certain dynamic-load conditions, if the voltage 349 (e.g., $V_{DD}$) decreases too much, the internal DC-DC converter of the PWM controller 330 (e.g., an IC chip) cannot keep the voltage 335 (e.g., $V_{10}$) equal to the reference voltage (e.g., $V_{reg}$) and the generated voltage 335 (e.g., $V_{10}$) also decreases. For example, if the voltage 335 (e.g., $V_{10}$) becomes too small in magnitude, the undervoltage protection is triggered for the PWM controller 330 (e.g., an IC chip) because of insufficient power supply.

Figure 12:
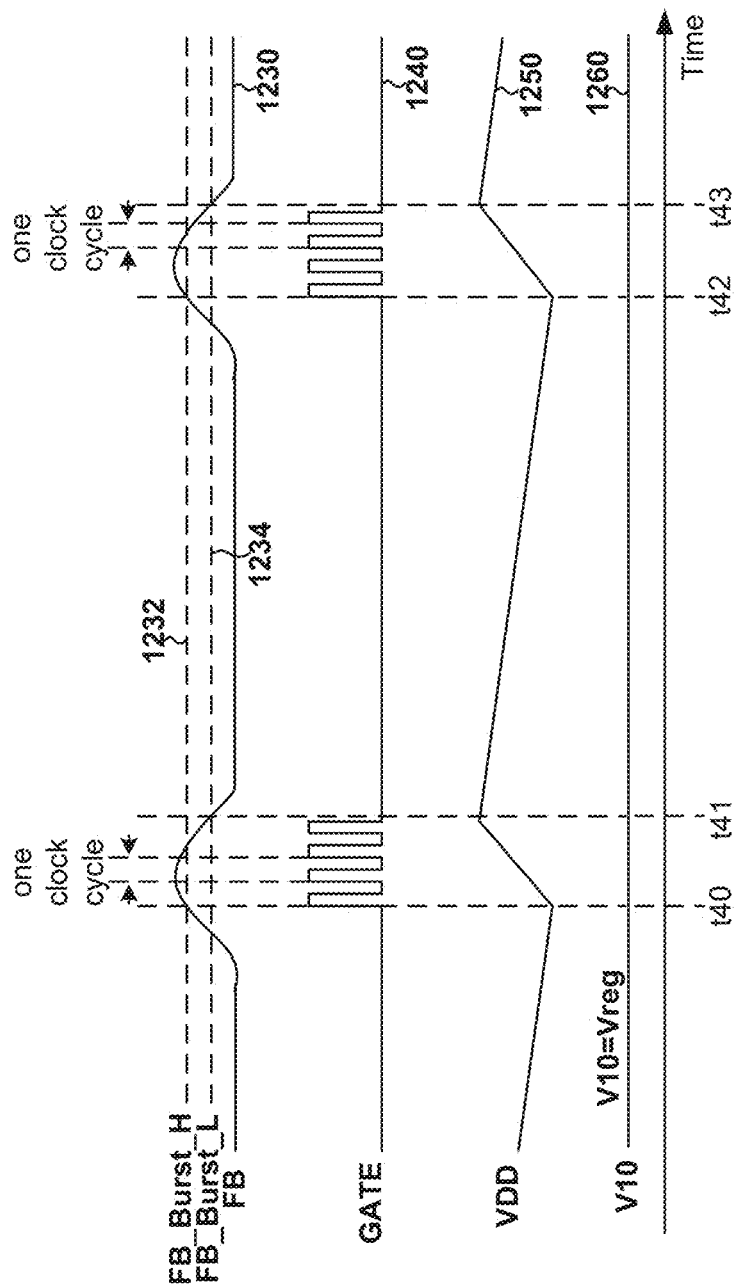
FIG. 12 shows simplified timing diagrams under no-load condition for the power converter as shown in FIG. 3 according to certain embodiments.

FIG. 12 shows simplified timing diagrams under no-load condition for the power converter 300 as shown in FIG. 3 according to certain embodiments. The waveform 1230 represents the feedback signal 337 as a function of time, the waveform 1240 represents the drive signal 345 as a function of time, the waveform 1250 represents the voltage 349 (e.g., VDD) as a function of time, and the waveform 1260 represents the voltage 335 (e.g., $V_{10}$) as a function of time.

According to some embodiments, under no-load condition, the output current 383 (e.g., $I_{out}$) is equal to zero in magnitude. For example, at time $t_{40}$, the feedback signal 337 becomes larger than a signal threshold 1232 (e.g., FB_Burst_H), and at time $t_{41}$, the feedback signal 337 becomes smaller than a signal threshold 1234 (e.g., FB_Burst_L) as shown by the waveform 1230. As an example, at time $t_{42}$, the feedback signal 337 becomes larger than the signal threshold 1232 (e.g., FB_Burst_H), and at time $t_{43}$, the feedback signal 337 becomes smaller than the signal threshold 1234 (e.g., FB_Burst_L) as shown by the waveform 1230. For example, the signal threshold 1232 (e.g., FB_Burst_H) is larger than the signal threshold 1234 (e.g., FB_Burst_L) in magnitude.

In some embodiments, from time $t_{40}$ to time $t_{41}$, the drive signal 345 changes between a logic high level and a logic low level within each clock cycle as shown by the waveform 1240, and the voltage 349 (e.g., $V_{DD}$) increases as shown by the waveform 1250. In certain embodiments, time $t_{41}$ to time $t_{42}$, the drive signal 345 remains at the logic low level during multiple clock cycles as shown by the waveform 1240, and the voltage 349 (e.g., VDD) decreases gradually as shown by the waveform 1250. In some embodiments, from time $t_{42}$ to time $t_{43}$, the drive signal 345 changes between the logic high level and the logic low level within each clock cycle as shown by the waveform 1240, and the voltage 349 (e.g., $V_{DD}$) increases as shown by the waveform 1250.

In certain embodiments, from time $t_{41}$ to time $t_{42}$, even though the voltage 349 (e.g., $V_{DD}$) decreases gradually as shown by the waveform 1250, the voltage 335 (e.g., $V_{10}$) remains equal to the reference voltage (e.g., $V_{reg}$) as shown by the waveform 1260. For example, the voltage 335 (e.g., $V_{10}$) is generated by the internal DC-DC converter of the PWM controller 330 (e.g., an IC chip) based on the voltage 349 (e.g., $V_{DD}$). As an example, the generated voltage 335 (e.g., $V_{10}$) remains constant as shown by the waveform 1260.

According to some embodiments, under no-load condition, if the voltage 349 (e.g., VDD) decreases too much, the internal DC-DC converter of the PWM controller 330 (e.g., an IC chip) cannot keep the voltage 335 (e.g., $V_{10}$) equal to the reference voltage (e.g., $V_{reg}$) and the generated voltage 335 (e.g., $V_{10}$) also decreases. For example, if the voltage 335 (e.g., $V_{10}$) becomes too small in magnitude, the undervoltage protection is triggered for the PWM controller 330 (e.g., an IC chip) because of insufficient power supply.

FIG. 13 is a simplified diagram showing certain components of the PWM controller 730 of the power converter 700 as shown in FIG. 7 according to some embodiments of the present invention. This diagram is merely an example, which should not unduly limit the scope of the claims. One of ordinary skill in the art would recognize many variations, alternatives, and modifications. The PWM controller 730 includes a charging circuit 1310, voltage detection circuits 1320 and 1370, charging controllers 1330 and 1360, a circuit 1380 for undervoltage-lockout (UVLO), an internal control circuit 1390, a DC-DC controller 1350, a transistor 1352, resistors 1354 and 1356. Additionally, the PWM controller 730 (e.g., an IC chip) includes the terminal 732 (e.g., a SW pin), the terminal 734 (e.g., a V10 pin), the terminal 738 (e.g., a GND pin), the terminal 740 (e.g., a HV pin), and the terminal 748 (e.g., a VDD pin). In certain examples, the charging circuit 1310 includes a transistor 1302 (e.g., a junction field-effect transistor), a resistor 1304 (e.g., a resistor R6), a resistor 1378 (e.g., a resistor R7), a transistor 1306 (e.g., a metal-oxide-semiconductor field-effect transistor), a transistor 1376 (e.g., a metal-oxide-semiconductor field-effect transistor), and a diode 1382 (e.g., a Schottky diode). In some examples, the charging circuit 1310 includes two current generators. For example, one current generator of the charging circuit 1310 includes the transistor 1302 (e.g., a junction field-effect transistor), the resistor 1304 (e.g., a resistor R6), and the transistor 1306 (e.g., a metal-oxide-semiconductor field-effect transistor). As an example, another current generator of the charging circuit 1310 includes the transistor 1302 (e.g., a junction field-effect transistor), the resistor 1378 (e.g., a resistor R7), and the transistor 1376 (e.g., a metal-oxide-semiconductor field-effect transistor). In certain examples, the inductor 716 of the power converter 700 (e.g., an AC-DC power supply) is not part of the PWM controller 730 (e.g., an IC chip). For example, a DC-DC converter includes the inductor 716, the capacitor 768 (e.g., the capacitor C3), the capacitor 718 (e.g., a capacitor C5), the DC-DC controller 1350, the transistor 1352 (e.g., a transistor M7), the resistor 1354 (e.g., a resistor R8), the resistor 1356 (e.g., a resistor R9), and the diode 1382.

According to certain embodiments, a drain terminal of the transistor 1302 (e.g., JFET) is connected to the terminal 740 (e.g., a HV pin), the gate terminal of the transistor 1302 (e.g., JFET) is biased to the ground voltage on the primary side of the power converter 700, and a source terminal of the transistor 1302 (e.g., JFET) is connected to one terminal of the resistor 1304 (e.g., a resistor R6). For example, another terminal of the resistor 1304 (e.g., a resistor R6) is connected to a source terminal of the transistor 1306 (e.g., a transistor M5). As an example, a gate terminal of the transistor 1306 (e.g., a transistor M5) receives a signal 1332 from the charging controller 1330. For example, a drain terminal of the transistor 1306 (e.g., a transistor M5) is connected to the terminal 748 (e.g., a VDD pin) and is also connected to one terminal of the inductor 716 through the terminal 748 (e.g., a VDD pin). As an example, the transistor 1306 (e.g., a transistor M5) is a PMOS transistor (e.g., a high-voltage PMOS transistor).

In some examples, another terminal of the inductor 716 is connected to the terminal 732 (e.g., a SW pin) and is also connected to an anode of the diode 1382 (e.g., a diode D1) through the terminal 732 (e.g., a SW pin). For example, a cathode of the diode 1382 (e.g., a diode D1) is connected to the terminal 734 (e.g., a V10 pin), a drain terminal of the transistor 1376 (e.g., a transistor M6), and one terminal of the resistor 1354 (e.g., a resistor R8). As an example, another terminal of the resistor 1354 (e.g., a resistor R8) is connected to an input terminal of the DC-DC controller 1350 and one terminal of the resistor 1356 (e.g., a resistor R9). For example, another terminal of the resistor 1356 (e.g., a resistor R9) is connected to the terminal 738 (e.g., a GND pin), which is biased to the ground voltage on the primary side of the power converter 700. As an example, the transistor 1376 (e.g., a transistor M6) is a PMOS transistor.

In certain examples, an output terminal of the DC-DC controller 1350 is connected to a gate terminal of the transistor 1352 (e.g., a transistor M7). For example, a source terminal of the transistor 1352 (e.g., a transistor M7) is biased to the ground voltage on the primary side of the power converter 700. As an example, a drain terminal of the transistor 1352 (e.g., a transistor M7) is connected to the anode of the diode 1382 and the terminal 732 (e.g., a SW pin). For example, the transistor 1352 (e.g., a transistor M7) is an NMOS transistor.

According to some embodiments, the source terminal of the transistor 1302 (e.g., JFET) is connected to one terminal of the resistor 1378 (e.g., a resistor R7). For example, another terminal of the resistor 1378 (e.g., a resistor R7) is connected to a source terminal of the transistor 1376 (e.g., a transistor M6). As an example, the gate terminal of the transistor 1376 (e.g., a transistor M6) is connected to an output terminal of the charging controller 1360. For example, a drain terminal of the transistor 1376 (e.g., a transistor M6) is connected to the cathode of the diode 1382 (e.g., a diode D1) and the terminal 734 (e.g., a V10 pin). In certain examples, an input terminal of the charging controller 1360 receives a signal 1321 (e.g., Char_v10) from the voltage detection circuit 1320, and another input terminal of the charging controller 1360 receives a signal 1371 from the voltage detection circuit 1370.

According to certain embodiments, an input terminal of the voltage detection circuit 1320 is connected to the drain terminal of the transistor 1306 (e.g., a transistor M5) and the terminal 748 (e.g., a VDD pin). For example, the output terminal of the voltage detection circuit 1320 sends the signal 1321 to the charging controller 1360. In some examples, an input terminal of the voltage detection circuit 1370 is connected to the terminal 734 (e.g., a V10 pin). For example, the voltage detection circuit 1370 generates signals 1322, 1371, and 1373. As an example, the voltage detection circuit 1370 sends the signal 1322 to the charging controller 1330, sends the signal 1371 to the charging controller 1360, and sends the signal 1373 to the circuit 1380 for undervoltage-lockout (UVLO). In certain examples, an output terminal of the circuit 1380 for undervoltage-lockout (UVLO) is connected to an input terminal of the internal control circuit 1390. As an example, the internal control circuit 1390 includes various control circuits, and the internal control circuit 1390 does not include the charging controller 1330 and does not include the charging controller 1360. For example, the internal control circuit 1390 includes one or more control circuits for one or more oscillators, one or more control circuits for one or more timers, one or more drivers, one or more logic control circuits, and/or one or more protection circuits.

As shown in FIG. 7, after the EMI filter 722 receives the AC voltage 750, the PWM controller 730 (e.g., an IC chip) undergoes a startup process according to certain embodiments. In some examples, during the startup process, if the voltage detection circuit 1370 determines that the voltage 735 has not reached a startup threshold (e.g., V10_UVLO), the voltage detection circuit 1370 generates the signal 1322, so that the charging controller 1330 generates the signal 1332 to turn on the transistor 1306 (e.g., a transistor M5) and the charging circuit 1310 generates a charging current 1392. For example, the charging current 1392 flows through the transistor 1302 (e.g., JFET), the resistor 1304 (e.g., a resistor R6), and the transistor 1306 (e.g., a transistor M5) to charge the capacitor 768 (e.g., the capacitor C3) and raise the voltage 749 at the terminal 748 (e.g., a VDD pin). As an example, the voltage 749 is used, through the inductor 716 and the diode 1382, to charge the capacitor 718 (e.g., a capacitor C5) and raise the voltage 735, until the voltage 735 reaches the startup threshold (e.g., V10_UVLO). In certain examples, before the voltage 735 reaches the startup threshold (e.g., V10_UVLO), the voltage detection circuit 1370 generates the signal 1373, so that the circuit 1380 for undervoltage-lockout (UVLO) does not generate the signal 1391 that indicates the end of the startup process and causes the internal control circuit 1390 to power on other components of the PWM controller 730 (e.g., an IC chip). For example, during the startup process, other components of the PWM controller 730 (e.g., an IC chip) remain powered off. As an example, during the startup process, the transistor 1376 (e.g., a transistor M6) remains turned off, and the DC-DC converter does not operate.

According to some embodiments, during the startup process, the charging current 1392 flows through the transistor 1302 (e.g., JFET), the resistor 1304 (e.g., a resistor R6), and the transistor 1306 (e.g., a transistor M5) to raise the voltage 749, and the voltage 749 is used, through the inductor 716 and the diode 1382, to raise the voltage 735. As an example, the charging current 1392 is determined as follows:

$$I_{hv\_vdd} = \frac{V_{HVS} - V_{DD}}{R_6} \quad \text{(Equation 3)}$$

where $I_{hv\_vdd}$ represents the charging current 1392. Additionally, $V_{HVS}$ represents the voltage 741, and $V_{DD}$ represents the voltage 749. Also, $R_6$ represents the resistance of the resistor 1304. For example, according to Equation 3, the charging current 1392 (e.g., $I_{hv\_vdd}$) decreases with the increasing voltage 749 (e.g., $V_{DD}$).

In certain embodiments, if the voltage detection circuit 1370 determines that the voltage 735 has risen above the startup threshold (e.g., V10_UVLO), the voltage detection circuit 1370 generates the signal 1322, so that the charging controller 1330 generates the signal 1332 to turn off the transistor 1306 (e.g., a transistor M5) and the charging circuit 1310 does not charge the capacitor 718 (e.g., a capacitor C5). In some examples, after the voltage detection circuit 1370 determines that the voltage 735 has risen above the startup threshold (e.g., V10_UVLO), the startup process of the PWM controller 730 (e.g., an IC chip) ends and the normal operation for the power converter 700 starts. For example, at the beginning of the normal operation, the voltage detection circuit 1370 generates the signal 1373, so that the circuit 1380 for undervoltage-lockout (UVLO) generates the signal 1391 that indicates the end of the startup process and causes the internal control circuit 1390 to power on other components of the PWM controller 730 (e.g., an IC chip). As an example, during the normal operation, other components of the PWM controller 730 (e.g., an IC chip) remain powered on. In certain examples, under normal operation, the transistor 1306 (e.g., a transistor M5) remains turned off. In some examples, the voltage detection circuit 1370 determines whether the voltage 735 has risen to the startup threshold (e.g., V10_UVLO) during the startup process, and also determines whether the voltage 735 rises to a predetermined threshold (e.g., V10_HV_OFF) during the normal operation.

In some embodiments, during the normal operation, when the voltage 749 (e.g., VDD) is higher than a reference voltage (e.g., $V_{reg}$), the DC-DC converter is idle, and the auxiliary winding 706 charges the capacitor 768 (e.g., a capacitor C3) to support the voltage 749 (e.g., $V_{DD}$), which is used to charge the capacitor 718 (e.g., a capacitor C5) and support the voltage 735 so that the voltage 735 at the terminal 734 (e.g., a V10 pin) is equal to the voltage 749 (e.g., $V_{DD}$) minus the forward bias voltage of the diode 1382. In some examples, during the normal operation, when the voltage 749 (e.g., $V_{DD}$) is smaller than the reference voltage (e.g., $V_{reg}$) but is not smaller than a lower predetermined threshold (e.g., VDD_HV_ON), the voltage 735 at the terminal 734 (e.g., a V10 pin) is generated by the DC-DC converter using the voltage 749 (e.g., $V_{DD}$), and the generated voltage 735 is larger than the voltage 749 (e.g., $V_{DD}$) and is equal to the reference voltage (e.g., $V_{reg}$).

According to certain embodiments, during the normal operation, if the voltage detection circuit 1320 determines that the voltage 749 drops to the lower predetermined threshold (e.g., VDD_HV_ON), the voltage detection circuit 1320 generates the signal 1321 (e.g., Char_v10), so that the charging controller 1360 generates a signal 1361 (e.g., Char_en) to turn on the transistor 1376 (e.g., a transistor M6). In some examples, if the transistor 1376 (e.g., a transistor M6) is turned on, the charging circuit 1310 generates a charging current 1394 to charge the capacitor 718 (e.g., a capacitor C5) and raise the voltage 735. For example, during the normal operation, under certain dynamic-load and/or no-load conditions, the charging circuit 1310 generates the charging current 1394 to flow through the terminal 734 (e.g., a V10 pin) and to charge the capacitor 718 (e.g., a capacitor C5) and raise the voltage 735, in order to prevent insufficient power supply to the PWM controller 730 (e.g., an IC chip). In certain examples, the charging current 1394 is determined as follows:

$$I_{hv\_v10} = \frac{V_{HVS} - V_{10}}{R_7} \quad \text{(Equation 4)}$$

where $I_{hv\_v10}$ represents the charging current 1394. Additionally, $V_{HVS}$ represents the voltage 741, and $V_{10}$ represents the voltage 735. Also, $R_7$ represents the resistance of the resistor 1378.

In some embodiments, during the normal operation, if the voltage detection circuit 1320 determines that the voltage 749 rises to a higher predetermined threshold (e.g., VDD_HV_OFF), the voltage detection circuit 1320 generates the signal 1321, so that the charging controller 1360 generates the signal 1361 (e.g., Char_en) to turn off the transistor 1376 (e.g., a transistor M6). For example, if the transistor 1376 (e.g., a transistor M6) is turned off, the charging circuit 1310 does not charge the capacitor 718 (e.g., a capacitor C5). As an example, during the normal operation, under certain dynamic-load and/or no-load conditions, the charging circuit 1310 does not charge the capacitor 718 (e.g., a capacitor C5) in order to reduce power consumption of the PWM controller 730 (e.g., an IC chip).

In certain embodiments, during the normal operation, the voltage detection circuit 1370 determines whether the voltage 735 rises to the predetermined threshold (e.g., V10_HV_OFF) and generates the signal 1371. For example, if the voltage 735 has not risen to the predetermined threshold (e.g., V10_HV_OFF), the signal 1371 is at a first logic level (e.g., a logic low level). As an example, if the voltage 735 has risen to the predetermined threshold (e.g., V10_HV_OFF), the signal 1371 is at a second logic level (e.g., a logic high level). In certain examples, if the signal 1371 indicates that the voltage 735 has risen to the predetermined threshold (e.g., V10_HV_OFF), the charging controller 1360 generates the signal 1361 (e.g., Char_en) to turn off the transistor 1376 (e.g., a transistor M6). For example, if the transistor 1376 (e.g., a transistor M6) is turned off, the charging circuit 1310 does not charge the capacitor 718 (e.g., a capacitor C5). As an example, during the normal operation, under certain dynamic-load and/or no-load conditions, the charging circuit 1310 does not charge the capacitor 718 (e.g., a capacitor C5) in order to reduce power consumption of the PWM controller 730 (e.g., an IC chip).

As shown in FIG. 13, the charging controller 1360 receives the signal 1321 and the signal 1371 and generates the signal 1361 (e.g., Char_en) to turn on or turn off the transistor 1376 (e.g., a transistor M6) according to some embodiments. For example, if the signal 1321 indicates that the voltage 749 drops to the lower predetermined threshold (e.g., VDD_HV_ON), the charging controller 1360 generates the signal 1361 (e.g., Char_en) to turn on the transistor 1376 (e.g., a transistor M6) for generating the charging current 1394 to charge the capacitor 718 (e.g., a capacitor C5) and raise the voltage 735. As an example, if the signal 1321 indicates that the voltage 749 rises to the higher predetermined threshold (e.g., VDD_HV_OFF), the charging controller 1360 generates the signal 1361 (e.g., Char_en) to turn off the transistor 1376 (e.g., a transistor M6). For example, if the signal 1371 indicates that the voltage 735 has risen to the predetermined threshold (e.g., V10_HV_OFF), the charging controller 1360 generates the signal 1361 (e.g., Char_en) to turn off the transistor 1376 (e.g., a transistor M6).

As discussed above and further emphasized here, FIG. 13 is merely an example, which should not unduly limit the scope of the claims. One of ordinary skill in the art would recognize many variations, alternatives, and modifications. In some examples, the PWM controller 730 also includes a reference-current and reference-voltage generator that receives a signal from the voltage detection circuit 1370 and is connected to the internal control circuit 1390. In certain examples, the voltage detection circuit 1370 outputs a signal for overvoltage protection. In certain examples, the diode 1382 (e.g., a Schottky diode) is replaced by a parasitic body diode of a PMOS transistor and/or by a PMOS switch. In some examples, the PWM controller 730 also includes a timer that, after being triggered, during a predetermined duration, prevents the signal 1371 from causing the charging controller 1360 to turn off the transistor 1376 (e.g., a transistor M6).

Figure 14:
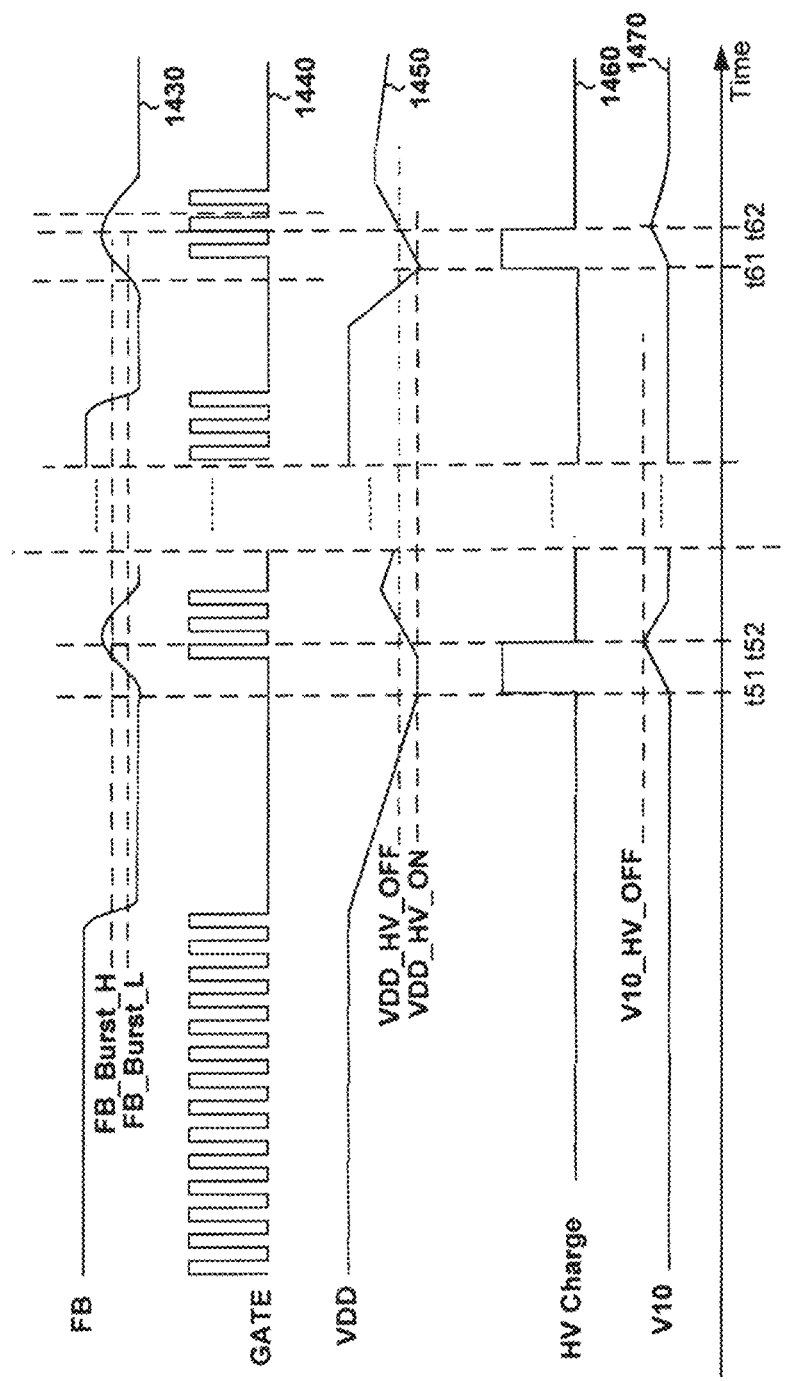
FIG. 14 shows simplified timing diagrams under certain dynamic-load and/or no-load conditions for the power converter that includes the PWM controller as shown in FIG. 7 and FIG. 13 according to some embodiments of the present invention.

FIG. 14 shows simplified timing diagrams under certain dynamic-load and/or no-load conditions for the power converter 700 that includes the PWM controller 730 as shown in FIG. 7 and FIG. 13 according to some embodiments of the present invention. These diagrams are merely examples, which should not unduly limit the scope of the claims. One of ordinary skill in the art would recognize many variations, alternatives, and modifications. The waveform 1430 represents the feedback signal 737 as a function of time, the waveform 1440 represents the drive signal 745 as a function of time, the waveform 1450 represents the voltage 749 (e.g., $V_{DD}$) as a function of time, the waveform 1460 represents the signal 1361 (e.g., Char_en) as a function of time, and the waveform 1470 represents the voltage 735 (e.g., V10) as a function of time.

According to some embodiments, the waveforms 1430, 1440, 1450, 1460 and 1470 are timing diagrams when the power converter 700 is under the normal operation after the voltage 735 has risen above the startup threshold (e.g., V10_UVLO). For example, at the beginning of the normal operation, the voltage detection circuit 1370 generates the signal 1373, so that the circuit 1380 for undervoltage-lockout (UVLO) generates the signal 1391 that indicates the end of the startup process and causes the internal control circuit 1390 to power on other components of the PWM controller 730 (e.g., an IC chip). As an example, during the normal operation, other components of the PWM controller 730 (e.g., an IC chip) remains powered on.

As shown in FIG. 10, at time $t_{51}$, the voltage 749 (e.g., $V_{DD}$) drops to the lower predetermined threshold (e.g., VDD_HV_ON) as shown by the waveform 1450, and in response, the transistor 1306 (e.g., the transistor M8) is turned on in order to charge the capacitor 718 (e.g., a capacitor C5) and raise the voltage 735 (e.g., $V_{10}$), according to certain embodiments. In some examples, from time $t_{51}$ to time $t_{52}$, the voltage 735 (e.g., $V_{10}$) increases with time as shown by the waveform 1470. In certain examples, at time $t_{52}$, the voltage 735 (e.g., $V_{10}$) rises to the predetermined threshold (e.g., V10_HV_OFF) and in response, the transistor 1306 (e.g., the transistor M8) is turned off.

According to some embodiments, at time $t_{61}$, the voltage 749 (e.g., $V_{DD}$) drops to the lower predetermined threshold (e.g., VDD_HV_ON) as shown by the waveform 1450, and in response, the transistor 1306 (e.g., the transistor M8) is turned on in order to charge the capacitor 718 (e.g., a capacitor C5) and raise the voltage 735 (e.g., $V_{10}$). In certain examples, from time $t_{61}$ to time $t_{62}$, the voltage 735 (e.g., $V_{10}$) increases with time as shown by the waveform 1470. In some examples, at time $t_{62}$, the voltage 749 (e.g., $V_{DD}$) rises to the higher predetermined threshold (e.g., VDD_HV_OFF) as shown by the waveform 1450 and in response, the transistor 1306 (e.g., the transistor M8) is turned off.

FIG. 15 is a simplified diagram showing certain components of the PWM controller 730 of the power converter 700 as shown in FIG. 7 according to some embodiments of the present invention. This diagram is merely an example, which should not unduly limit the scope of the claims. One of ordinary skill in the art would recognize many variations, alternatives, and modifications. The PWM controller 730 includes a charging circuit 1510, voltage detection circuits 1520 and 1570, charging controllers 1530 and 1560, a circuit 1580 for undervoltage-lockout (UVLO), an internal control circuit 1590, a DC-DC controller 1550, a transistor 1552, resistors 1554 and 1556. Additionally, the PWM controller 730 (e.g., an IC chip) includes the terminal 732 (e.g., a SW pin), the terminal 734 (e.g., a V10 pin), the terminal 738 (e.g., a GND pin), the terminal 740 (e.g., a HV pin), and the terminal 748 (e.g., a VDD pin). In certain examples, the charging circuit 1510 includes a transistor 1502 (e.g., a junction field-effect transistor), a resistor 1578 (e.g., a resistor R7), a transistor 1506 (e.g., a metal-oxide-semiconductor field-effect transistor), a transistor 1576 (e.g., a metal-oxide-semiconductor field-effect transistor), a diode 1582 (e.g., a Schottky diode), a resistor 2510 (e.g., a resistor R1), a resistor 2520 (e.g., a resistor R2), a resistor 2530 (e.g., a resistor R3), a switch 2512 (e.g., a switch S1), a switch 2522 (e.g., a switch S2), and a switch 2532 (e.g., a switch S3). In some examples, the charging circuit 1510 includes two current generators. For example, one current generator of the charging circuit 1510 includes the transistor 1502 (e.g., a junction field-effect transistor), the resistor 2510 (e.g., a resistor R1), the resistor 2520 (e.g., a resistor R2), the resistor 2530 (e.g., a resistor R3), the switch 2512 (e.g., a switch S1), the switch 2522 (e.g., a switch S2), the switch 2532 (e.g., a switch S3), and the transistor 1506 (e.g., a metal-oxide-semiconductor field-effect transistor). As an example, another current generator of the charging circuit 1510 includes the transistor 1502 (e.g., a junction field-effect transistor), the resistor 1578 (e.g., a resistor R7), and the transistor 1576 (e.g., a metal-oxide-semiconductor field-effect transistor). In certain examples, the inductor 716 of the power converter 700 (e.g., an AC-DC power supply) is not part of the PWM controller 730 (e.g., an IC chip). For example, a DC-DC converter includes the inductor 716, the capacitor 768 (e.g., the capacitor C3), the capacitor 718 (e.g., a capacitor C5), the DC-DC controller 1550, the transistor 1552 (e.g., a transistor M7), the resistor 1554 (e.g., a resistor R8), the resistor 1556 (e.g., a resistor R9), and the diode 1582.

According to certain embodiments, a drain terminal of the transistor 1502 (e.g., JFET) is connected to the terminal 740 (e.g., a HV pin), the gate terminal of the transistor 1502 (e.g., JFET) is biased to the ground voltage on the primary side of the power converter 700, and a source terminal of the transistor 1502 (e.g., JFET) is connected to one terminal of the resistor 2510 (e.g., a resistor R1), one terminal of the resistor 2520 (e.g., a resistor R2), and one terminal of the resistor 2530 (e.g., a resistor R3). For example, another terminal of the resistor 2510 (e.g., a resistor R1) is connected to one terminal of the switch 2512 (e.g., a switch S1), another terminal of the resistor 2520 (e.g., a resistor R2) is connected to one terminal of the switch 2522 (e.g., a switch S2), and another terminal of the resistor 2530 (e.g., a resistor R3) is connected to one terminal of the switch 2532 (e.g., a switch S3). As an example, another terminal of the switch 2512 (e.g., a switch S1), another terminal of the switch 2522 (e.g., a switch S2), and another terminal of the switch 2532 (e.g., a switch S3) are all connected to a source terminal of the transistor 1506 (e.g., a transistor M5). For example, the transistor 1506 (e.g., a transistor M5) is a PMOS transistor (e.g., a high-voltage PMOS transistor).

In some examples, the switch 2512 (e.g., a switch S1) receives a signal 2514 that is used to close (e.g., turn on) or open (e.g., turn off) the switch 2512 (e.g., a switch S1), the switch 2522 (e.g., a switch S2) receives a signal 2524 that is used to close (e.g., turn on) or open (e.g., turn off) the switch 2522 (e.g., a switch S1), and the switch 2532 (e.g., a switch S3) receives a signal 2534 that is used to close (e.g., turn on) or open (e.g., turn off) the switch 2532 (e.g., a switch S1). In certain examples, a gate terminal of the transistor 1506 (e.g., a transistor M5) receives a signal 1532 from the charging controller 1530. For example, a drain terminal of the transistor 1506 (e.g., a transistor M5) is connected to the terminal 748 (e.g., a VDD pin) and is also connected to one terminal of the inductor 716 through the terminal 748 (e.g., a VDD pin).

In some embodiments, another terminal of the inductor 716 is connected to the terminal 732 (e.g., a SW pin) and is also connected to an anode of the diode 1582 (e.g., a diode D1) through the terminal 732 (e.g., a SW pin). For example, a cathode of the diode 1582 (e.g., a diode D1) is connected to the terminal 734 (e.g., a V10 pin), a drain terminal of the transistor 1576 (e.g., a transistor M6), and one terminal of the resistor 1554 (e.g., a resistor R8). As an example, another terminal of the resistor 1554 (e.g., a resistor R8) is connected to an input terminal of the DC-DC controller 1550 and one terminal of the resistor 1556 (e.g., a resistor R9). For example, another terminal of the resistor 1556 (e.g., a resistor R9) is connected to the terminal 738 (e.g., a GND pin), which is biased to the ground voltage on the primary side of the power converter 700. As an example, the transistor 1576 (e.g., a transistor M6) is a PMOS transistor.

In certain examples, an output terminal of the DC-DC controller 1550 is connected to a gate terminal of the transistor 1552 (e.g., a transistor M7). For example, a source terminal of the transistor 1552 (e.g., a transistor M7) is biased to the ground voltage on the primary side of the power converter 700. As an example, a drain terminal of the transistor 1552 (e.g., a transistor M7) is connected to the anode of the diode 1582 and the terminal 732 (e.g., a SW pin). For example, the transistor 1552 (e.g., a transistor M7) is an NMOS transistor.

According to certain embodiments, the source terminal of the transistor 1502 (e.g., JFET) is connected to one terminal of the resistor 1578 (e.g., a resistor R7). For example, another terminal of the resistor 1578 (e.g., a resistor R7) is connected to a source terminal of the transistor 1576 (e.g., a transistor M6). As an example, a gate terminal of the transistor 1576 (e.g., a transistor M6) is connected to an output terminal of the charging controller 1560. For example, a drain terminal of the transistor 1576 (e.g., a transistor M6) is connected to the cathode of the diode 1582 (e.g., a diode D1) and the terminal 734 (e.g., a V10 pin). In certain examples, an input terminal of the charging controller 1560 receives a signal 1521 (e.g., Char_v10) from the voltage detection circuit 1520, and another input terminal of the charging controller 1560 receives a signal 1571 from the voltage detection circuit 1570.

According to some embodiments, an input terminal of the voltage detection circuit 1520 is connected to the drain terminal of the transistor 1506 (e.g., a transistor M5) and the terminal 748 (e.g., a VDD pin). For example, the output terminal of the voltage detection circuit 1520 sends the signal 1521 to the charging controller 1560. In some examples, an input terminal of the voltage detection circuit 1570 is connected to the terminal 734 (e.g., a V10 pin). For example, the voltage detection circuit 1570 generates signals 1522, 1571, and 1573. As an example, the voltage detection circuit 1570 sends the signal 1522 to the charging controller 1530, sends the signal 1571 to the charging controller 1560, and sends the signal 1573 to the circuit 1580 for undervoltage-lockout (UVLO). In certain examples, an output terminal of the circuit 1580 for undervoltage-lockout (UVLO) is connected to an input terminal of the internal control circuit 1590. As an example, the internal control circuit 1590 includes various control circuits, and the internal control circuit 1590 does not include the charging controller 1530 and does not include the charging controller 1560. For example, the internal control circuit 1590 includes one or more control circuits for one or more oscillators, one or more control circuits for one or more timers, one or more drivers, one or more logic control circuits, and/or one or more protection circuits.

As shown in FIG. 7, after the EMI filter 722 receives the AC voltage 750, the PWM controller 730 (e.g., an IC chip) undergoes a startup process according to certain embodiments. In some examples, during the startup process, if the voltage detection circuit 1570 determines that the voltage 735 has not reached a startup threshold (e.g., V10_UVLO), the voltage detection circuit 1570 generates the signal 1522, so that the charging controller 1530 generates the signal 1532 to turn on the transistor 1506 (e.g., a transistor M5). For example, if the voltage detection circuit 1520 determines that the voltage 749 is smaller than a first reference voltage (e.g., V1), the voltage detection circuit 1520 generates the signal 2514 to close (e.g., turn on) the switch 2512, generates the signal 2524 to open (e.g., turn off) the switch 2522, and generates the signal 2534 to open (e.g., turn off) the switch 2532. As an example, if the voltage detection circuit 1520 determines that the voltage 749 is larger than the first reference voltage (e.g., V1) but smaller than a second reference voltage (e.g., V2), the voltage detection circuit 1520 generates the signal 2514 to close (e.g., turn on) the switch 2512, generates the signal 2524 to close (e.g., turn on) the switch 2522, and generates the signal 2534 to open (e.g., turn off) the switch 2532, where the second reference voltage (e.g., V2) is larger than the first reference voltage (e.g., V1). For example, if the voltage detection circuit 1520 determines that the voltage 749 is larger than both the first reference voltage (e.g., V1) and the second reference voltage (e.g., V2), the voltage detection circuit 1520 generates the signal 2514 to close (e.g., turn on) the switch 2512, generates the signal 2524 to close (e.g., turn on) the switch 2522, and generates the signal 2534 to close (e.g., turn on) the switch 2532.

In certain examples, during the startup process, if the voltage 735 has not reached the startup threshold (e.g., V10_UVLO), the charging circuit 1510 generates a charging current 1592 to charge the capacitor 768 (e.g., the capacitor C3) and raise the voltage 749 at the terminal 748 (e.g., a VDD pin). For example, the charging current 1592 is determined as follows:

$$I_{hv\_vdd} = \begin{cases} \dfrac{V_{HVS} - V_{DD}}{R_1} & V_{DD} < V_1 \\ \dfrac{V_{HVS} - V_{DD}}{R_1//R_2} & V_1 < V_{DD} < V_2 \\ \dfrac{V_{HVS} - V_{DD}}{R_1//R_2//R_3} & V_{DD} > V_2 \end{cases} \quad \text{(Equation 5)}$$

where $I_{hv\_vdd}$ represents the charging current 1592. Additionally, $V_{HVS}$ represents the voltage 741, and VDD represents the voltage 749. Moreover, $R_1$ represents the resistance of the resistor 2510, $R_2$ represents the resistance of the resistor 2520, and $R_3$ represents the resistance of the resistor 2530. Also, $R_1/R_2$ represents the resistance of a combination of the resistors 2510 and 2520, which are connected in parallel, and $R_1/R_2/R_3$ represents the resistance of a combination of the resistors 2510, 2520 and 2530, which are connected in parallel. Additionally, $V_1$ represents the first reference voltage, and $V_2$ represents the second reference voltage.

In some examples, if the voltage 735 is smaller than the startup threshold (e.g., V10_UVLO) and the voltage 749 is smaller than the first reference voltage (e.g., V1), the charging current 1592 flows through the transistor 1502 (e.g., FET), the resistor 2510 (e.g., a resistor R1), and the transistor 1506 (e.g., a transistor M5). For example, if the voltage 735 is smaller than the startup threshold (e.g., V10_UVLO) and the voltage 749 is larger than the first reference voltage (e.g., V1) but smaller than the second reference voltage (e.g., V2), the charging current 1592 flows through the transistor 1502 (e.g., FET), the resistor 2510 (e.g., a resistor R1), the resistor 2520 (e.g., a resistor R2), and the transistor 1506 (e.g., a transistor M5). As an example, if the voltage 735 is smaller than the startup threshold (e.g., V10_UVLO) and the voltage 749 is larger than both the first reference voltage (e.g., V1) and the second reference voltage (e.g., V2), the charging current 1592 flows through the transistor 1502 (e.g., FET), the resistor 2510 (e.g., a resistor R1), the resistor 2520 (e.g., a resistor R2), the resistor 2530 (e.g., a resistor R3), and the transistor 1506 (e.g., a transistor M5).

According to some embodiments, before the voltage 735 reaches the startup threshold (e.g., V10_UVLO), the voltage detection circuit 1570 generates the signal 1573, so that the circuit 1580 for undervoltage-lockout (UVLO) does not generate the signal 1591 that indicates the end of the startup process and causes the internal control circuit 1590 to power on other components of the PWM controller 730 (e.g., an IC chip). For example, during the startup process, other components of the PWM controller 730 (e.g., an IC chip) remain powered off. As an example, during the startup process, the transistor 1576 (e.g., a transistor M6) remains turned off, and the DC-DC converter does not operate.

In certain embodiments, if the voltage detection circuit 1570 determines that the voltage 735 has risen above the startup threshold (e.g., V10_UVLO), the voltage detection circuit 1570 generates the signal 1522, so that the charging controller 1530 generates the signal 1532 to turn off the transistor 1506 (e.g., a transistor M5) and the charging circuit 1510 does not charge the capacitor 718 (e.g., a capacitor C5). In some examples, after the voltage detection circuit 1570 determines that the voltage 735 has risen above the startup threshold (e.g., V10_UVLO), the startup process of the PWM controller 730 (e.g., an IC chip) ends and the normal operation for the power converter 700 starts. For example, at the beginning of the normal operation, the voltage detection circuit 1570 generates the signal 1573, so that the circuit 1580 for undervoltage-lockout (UVLO) generates the signal 1591 that indicates the end of the startup process and causes the internal control circuit 1590 to power on other components of the PWM controller 730 (e.g., an IC chip). As an example, during the normal operation, other components of the PWM controller 730 (e.g., an IC chip) remain powered on. In certain examples, under normal operation, the transistor 1506 (e.g., a transistor M5) remains turned off. In some examples, the voltage detection circuit 1570 determines whether the voltage 735 has risen to the startup threshold (e.g., V10_UVLO) during the startup process, and also determines whether the voltage 735 rises to a predetermined threshold (e.g., V10_HV_OFF) during the normal operation.

According to certain embodiments, during the normal operation, when the voltage 749 (e.g., $V_{DD}$) is higher than a reference voltage (e.g., $V_{reg}$), the DC-DC converter is idle, and the auxiliary winding 706 charges the capacitor 768 (e.g., a capacitor C3) to support the voltage 749 (e.g., $V_{DD}$), which is used to charge the capacitor 718 (e.g., a capacitor C5) and support the voltage 735 so that the voltage 735 at the terminal 734 (e.g., a V10 pin) is equal to the voltage 749 (e.g., $V_{DD}$) minus the forward bias voltage of the diode 1582. In some examples, during the normal operation, when the voltage 749 (e.g., $V_{DD}$) is smaller than the reference voltage (e.g., $V_{reg}$) but is not smaller than a lower predetermined threshold (e.g., VDD_HV_ON), the voltage 735 at the terminal 734 (e.g., a V10 pin) is generated by the DC-DC converter using the voltage 749 (e.g., $V_{DD}$), and the generated voltage 735 is larger than the voltage 749 (e.g., $V_{DD}$) and is equal to the reference voltage (e.g., $V_{reg}$).

According to some embodiments, during the normal operation, if the voltage detection circuit 1520 determines that the voltage 749 drops to the lower predetermined threshold (e.g., VDD_HV_ON), the voltage detection circuit 1520 generates the signal 1521 (e.g., Char_v10), so that the charging controller 1560 generates a signal 1561 (e.g., Char_en) to turn on the transistor 1576 (e.g., a transistor M6). In some examples, if the transistor 1576 (e.g., a transistor M6) is turned on, the charging circuit 1510 generates a charging current 1594 to charge the capacitor 718 (e.g., a capacitor C5) and raise the voltage 735. For example, during the normal operation, under certain dynamic-load and/or no-load conditions, the charging circuit 1510 generates the charging current 1594 to flow through the terminal 734 (e.g., a V10 pin) and to charge the capacitor 718 (e.g., a capacitor C5) and raise the voltage 735, in order to prevent insufficient power supply to the PWM controller 730 (e.g., an IC chip). In certain examples, the charging current 1594 is determined as follows:

$$I_{hv\_v10} = \frac{V_{HVS} - V_{10}}{R_7} \qquad \text{(Equation 6)}$$

where $I_{hv\_v10}$ represents the charging current 1594. Additionally, $V_{HVS}$ represents the voltage 741, and $V_{10}$ represents the voltage 735. Also, $R_7$ represents the resistance of the resistor 1578.

In some embodiments, during the normal operation, if the voltage detection circuit 1520 determines that the voltage 749 rises to a higher predetermined threshold (e.g., VDD_HV_OFF), the voltage detection circuit 1520 generates the signal 1521, so that the charging controller 1560 generates the signal 1561 (e.g., Char_en) to turn off the transistor 1576 (e.g., a transistor M6). For example, if the transistor 1576 (e.g., a transistor M6) is turned off, the charging circuit 1510 does not charge the capacitor 718 (e.g., a capacitor C5). As an example, during the normal operation, under certain dynamic-load and/or no-load conditions, the charging circuit 1510 does not charge the capacitor 718 (e.g., a capacitor C5) in order to reduce power consumption of the PWM controller 730 (e.g., an IC chip).

In certain embodiments, during the normal operation, the voltage detection circuit 1570 determines whether the voltage 735 rises to the predetermined threshold (e.g., V10_HV_OFF) and generates the signal 1571. For example, if the voltage 735 has not risen to the predetermined threshold (e.g., V10_HV_OFF), the signal 1571 is at a first logic level (e.g., a logic low level). As an example, if the voltage 735 has risen to the predetermined threshold (e.g., V10_HV_OFF), the signal 1571 is at a second logic level (e.g., a logic high level). In certain examples, if the signal 1571 (e.g., Char_en) indicates that the voltage 735 has risen to the predetermined threshold (e.g., V10_HV_OFF), the charging controller 1560 generates the signal 1561 (e.g., Char_en) to turn off the transistor 1576 (e.g., a transistor M6). For example, if the transistor 1576 (e.g., a transistor M6) is turned off, the charging circuit 1510 does not charge the capacitor 718 (e.g., a capacitor C5). As an example, during the normal operation, under certain dynamic-load and/or no-load conditions, the charging circuit 1510 does not charge the capacitor 718 (e.g., a capacitor C5) in order to reduce power consumption of the PWM controller 730 (e.g., an IC chip).

As shown in FIG. 15, the charging controller 1560 receives the signals 1521 and 1571 and generates the signal 1561 (e.g., Char_en) to turn on or turn off the transistor 1576 (e.g., a transistor M6) according to some embodiments. For example, if the signal 1521 indicates that the voltage 749 drops to the lower predetermined threshold (e.g., VDD_HV_ON), the charging controller 1560 generates the signal 1561 (e.g., Char_en) to turn on the transistor 1576 (e.g., a transistor M6) for generating the charging current 1594 to charge the capacitor 718 (e.g., a capacitor C5) and raise the voltage 735. As an example, if the signal 1521 indicates that the voltage 749 rises to the higher predetermined threshold (e.g., VDD_HV_OFF), the charging controller 1560 generates the signal 1561 (e.g., Char_en) to turn off the transistor 1576 (e.g., a transistor M6). For example, if the signal 1571 indicates that the voltage 735 has risen to the predetermined threshold (e.g., V10_HV_OFF), the charging controller 1560 generates the signal 1561 (e.g., Char_en) to turn off the transistor 1576 (e.g., a transistor M6).

As discussed above and further emphasized here, FIG. 15 is merely an example, which should not unduly limit the scope of the claims. One of ordinary skill in the art would recognize many variations, alternatives, and modifications. In some examples, the PWM controller 730 also includes a reference-current and reference-voltage generator that receives a signal from the voltage detection circuit 1570 and is connected to the internal control circuit 1590. In certain examples, the voltage detection circuit 1570 outputs a signal for overvoltage protection. In certain examples, the diode 1582 (e.g., a Schottky diode) is replaced by a parasitic body diode of a PMOS transistor and/or by a PMOS switch. In some examples, the PWM controller 730 also includes a timer that, after being triggered, during a predetermined duration, prevents the signal 1571 from causing the charging controller 1560 to turn off the transistor 1576 (e.g., a transistor M6).

Figure 16:
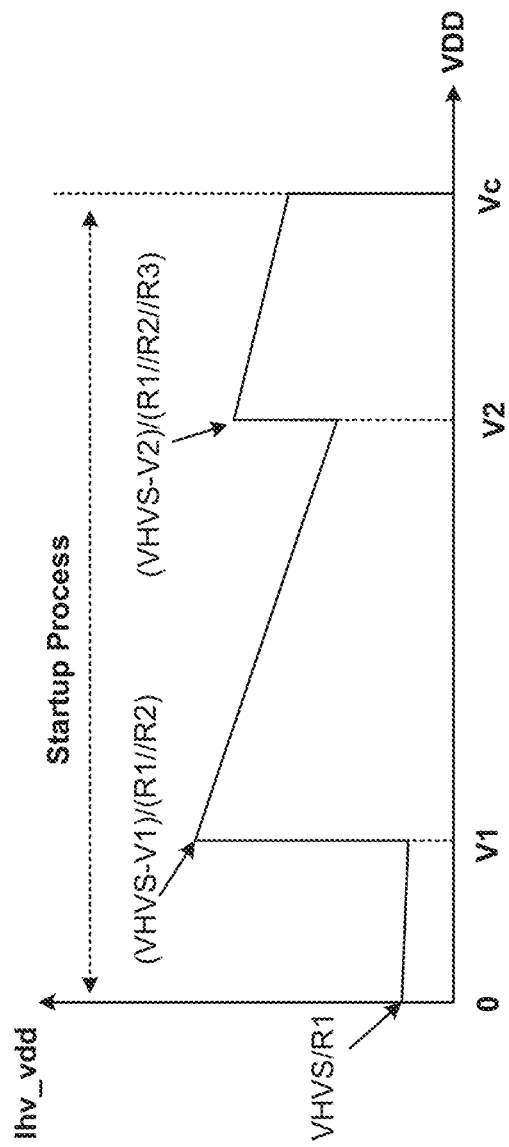
FIG. 16 shows a simplified diagram showing certain charging current as a function of certain voltage for the power converter that includes the PWM controller as shown in FIG. 7 and FIG. 15 according to some embodiments of the present invention.

FIG. 16 shows a simplified diagram showing the charging current 1592 as a function of the voltage 749 for the power converter 700 that includes the PWM controller 730 as shown in FIG. 7 and FIG. 15 according to some embodiments of the present invention. This diagram is merely an example, which should not unduly limit the scope of the claims. One of ordinary skill in the art would recognize many variations, alternatives, and modifications. As shown in FIG. 16, $I_{hv\_vdd}$ represents the charging current 1592, and $V_{DD}$ represents the voltage 749 according to certain embodiments. In some examples, $V_1$ represents the first reference voltage, and $V_2$ represents the second reference voltage. In certain examples, $V_c$ represents a voltage magnitude of the voltage 749, at which the startup process of the PWM controller 730 (e.g., an IC chip) ends. For example, $V_c$ represents the voltage magnitude of the voltage 749, at which the voltage detection circuit 1570 determines that the voltage 735 has risen above the startup threshold (e.g., V10_UVLO). As an example, $V_{HVS}$ represents the voltage 741, $R_1$ represents the resistance of the resistor 2510, $R_2$ represents the resistance of the resistor 2520, and $R_3$ represents the resistance of the resistor 2530.

In certain embodiments, according to Equation 5, if $V_{DD}$ is equal to zero, $I_{hv\_vdd}$ is equal to $$\frac{V_{HVS}}{R_1},$$

and when $V_{DD}$ increases from zero to $V_1$, $I_{hv\_vdd}$ decreases with the increasing $V_{DD}$. In some embodiments, according to Equation 5, if $V_{DD}$ reaches $V_1$, $I_{hv\_vdd}$ rises to $$\frac{V_{HVS} - V_1}{R_1 // R_2},$$

and when $V_{DD}$ increases from $V_1$ to $V_2$, $I_{hv\_vdd}$ decreases with the increasing $V_{DD}$. In certain embodiments, according to Equation 5, if $V_{DD}$ reaches $V_2$, $I_{hv\_vdd}$ rises to $$\frac{V_{HVS} - V_2}{R_1 // R_2 // R_3},$$

and when $V_{DD}$ increases from $V_2$ to $V_c$, $I_{hv\_vdd}$ decreases with the increasing $V_{DD}$. In some embodiments, if $V_{DD}$ reaches $V_c$, the startup process of the PWM controller 730 (e.g., an IC chip) ends and $I_{hv\_vdd}$ drops to zero.

FIG. 17 is a simplified diagram showing certain components of the PWM controller 730 of the power converter 700 as shown in FIG. 7 according to some embodiments of the present invention. This diagram is merely an example, which should not unduly limit the scope of the claims. One of ordinary skill in the art would recognize many variations, alternatives, and modifications. The PWM controller 730 includes a charging circuit 1710, voltage detection circuits 1720 and 1770, a charging controller 1730, a circuit 1780 for undervoltage-lockout (UVLO), an internal control circuit 1790, a DC-DC controller 1750, a transistor 1752, resistors 1754 and 1756. Additionally, the PWM controller 730 (e.g., an IC chip) includes the terminal 732 (e.g., a SW pin), the terminal 734 (e.g., a V10 pin), the terminal 738 (e.g., a GND pin), the terminal 740 (e.g., a HV pin), and the terminal 748 (e.g., a VDD pin). In certain examples, the charging circuit 1710 includes a transistor 1702 (e.g., a junction field-effect transistor), a transistor 1706 (e.g., a metal-oxide-semiconductor field-effect transistor), a diode 1782 (e.g., a Schottky diode), a resistor 2710 (e.g., a resistor R1), a resistor 2720 (e.g., a resistor R2), a resistor 2730 (e.g., a resistor R3), a switch 2712 (e.g., a switch S1), a switch 2722 (e.g., a switch S2), and a switch 2732 (e.g., a switch S3). As an example, the inductor 716 of the power converter 700 (e.g., an AC-DC power supply) is not part of the PWM controller 730 (e.g., an IC chip). For example, a DC-DC converter includes the inductor 716, the capacitor 768 (e.g., the capacitor C3), the capacitor 718 (e.g., a capacitor C5), the DC-DC controller 1750, the transistor 1752 (e.g., a transistor M4), the resistor 1754 (e.g., a resistor R4), the resistor 1756 (e.g., a resistor R5), and the diode 1782.

According to certain embodiments, a drain terminal of the transistor 1702 (e.g., JFET) is connected to the terminal 740 (e.g., a HV pin), the gate terminal of the transistor 1702 (e.g., JFET) is biased to the ground voltage on the primary side of the power converter 700, and a source terminal of the transistor 1702 (e.g., JFET) is connected to one terminal of the resistor 2710 (e.g., a resistor R1), one terminal of the resistor 2720 (e.g., a resistor R2), and one terminal of the resistor 2730 (e.g., a resistor R3). For example, another terminal of the resistor 2710 (e.g., a resistor R1) is connected to one terminal of the switch 2712 (e.g., a switch S1), another terminal of the resistor 2720 (e.g., a resistor R2) is connected to one terminal of the switch 2722 (e.g., a switch S2), and another terminal of the resistor 2730 (e.g., a resistor R3) is connected to one terminal of the switch 2732 (e.g., a switch S3). As an example, another terminal of the switch 2712 (e.g., a switch S1), another terminal of the switch 2722 (e.g., a switch S2), and another terminal of the switch 2732 (e.g., a switch S3) are all connected to a source terminal of the transistor 1706 (e.g., a transistor M3). For example, the transistor 1706 (e.g., a transistor M3) is a PMOS transistor (e.g., a high-voltage PMOS transistor).

In some examples, the switch 2712 (e.g., a switch S1) receives a signal 2714 that is used to close (e.g., turn on) or open (e.g., turn off) the switch 2712 (e.g., a switch S1), the switch 2722 (e.g., a switch S2) receives a signal 2724 that is used to close (e.g., turn on) or open (e.g., turn off) the switch 2722 (e.g., a switch S1), and the switch 2732 (e.g., a switch S3) receives a signal 2734 that is used to close (e.g., turn on) or open (e.g., turn off) the switch 2732 (e.g., a switch S1). In certain examples, a gate terminal of the transistor 1706 (e.g., a transistor M3) receives a signal 1732 from the charging controller 1730. For example, a drain terminal of the transistor 1706 (e.g., a transistor M3) is connected to the terminal 748 (e.g., a VDD pin) and is also connected to one terminal of the inductor 716 through the terminal 748 (e.g., a VDD pin).

In some embodiments, another terminal of the inductor 716 is connected to the terminal 732 (e.g., a SW pin) and is also connected to an anode of the diode 1782 (e.g., a diode D1) through the terminal 732 (e.g., a SW pin). For example, a cathode of the diode 1782 (e.g., a diode D1) is connected to the terminal 734 (e.g., a V10 pin) and one terminal of the resistor 1754 (e.g., a resistor R4). As an example, another terminal of the resistor 1754 (e.g., a resistor R4) is connected to an input terminal of the DC-DC controller 1750 and one terminal of the resistor 1756 (e.g., a resistor R5). For example, another terminal of the resistor 1756 (e.g., a resistor R5) is connected to the terminal 738 (e.g., a GND pin), which is biased to the ground voltage on the primary side of the power converter 700. In certain examples, an output terminal of the DC-DC controller 1750 is connected to a gate terminal of the transistor 1752 (e.g., a transistor M4). For example, a source terminal of the transistor 1752 (e.g., a transistor M4) is biased to the ground voltage on the primary side of the power converter 700. As an example, a drain terminal of the transistor 1752 (e.g., a transistor M4) is connected to the anode of the diode 1782 and the terminal 732 (e.g., a SW pin). For example, the transistor 1752 (e.g., a transistor M4) is an NMOS transistor.

According to some embodiments, an input terminal of the voltage detection circuit 1720 is connected to the terminal 748 (e.g., a VDD pin). For example, the output terminal of the voltage detection circuit 1720 sends a signal 1721 to the charging controller 1730. In some examples, an input terminal of the voltage detection circuit 1770 is connected to the terminal 734 (e.g., a V10 pin). For example, the voltage detection circuit 1770 generates signals 1722, 1771, 1773, 2714, 2724, and 2734. As an example, the voltage detection circuit 1770 sends the signals 1722 and 1771 to the charging controller 1730 and sends the signal 1773 to the circuit 1780 for undervoltage-lockout (UVLO). In certain examples, an output terminal of the circuit 1780 for undervoltage-lockout (UVLO) is connected to an input terminal of the internal control circuit 1790. As an example, the internal control circuit 1790 includes various control circuits, and the internal control circuit 1790 does not include the charging controller 1730. For example, the internal control circuit 1790 includes one or more control circuits for one or more oscillators, one or more control circuits for one or more timers, one or more drivers, one or more logic control circuits, and/or one or more protection circuits.

As shown in FIG. 7, after the EMI filter 722 receives the AC voltage 750, the PWM controller 730 (e.g., an IC chip) undergoes a startup process according to certain embodiments. According to some embodiments, during the startup process, if the voltage detection circuit 1770 determines that the voltage 735 has not reached a startup threshold (e.g., V10_UVLO), the voltage detection circuit 1770 generates the signal 1722, so that the charging controller 1730 generates the signal 1732 to turn on the transistor 1706 (e.g., a transistor M3). In certain examples, if the voltage detection circuit 1770 determines that the voltage 735 is smaller than a first reference voltage (e.g., Vx), the voltage detection circuit 1770 generates the signal 2714 to close (e.g., turn on) the switch 2712, generates the signal 2724 to open (e.g., turn off) the switch 2722, and generates the signal 2734 to open (e.g., turn off) the switch 2732. In some examples, if the voltage detection circuit 1770 determines that the voltage 735 is larger than the first reference voltage (e.g., Vx) but smaller than a second reference voltage (e.g., Vy), the voltage detection circuit 1770 generates the signal 2714 to close (e.g., turn on) the switch 2712, generates the signal 2724 to close (e.g., turn on) the switch 2722, and generates the signal 2734 to open (e.g., turn off) the switch 2732. For example, the first reference voltage (e.g., Vx) is smaller than the second reference voltage (e.g., Vy), and the second reference voltage (e.g., Vy) is smaller than the startup threshold (e.g., V10_UVLO). In certain examples, if the voltage detection circuit 1720 determines that the voltage 735 is larger than both the first reference voltage (e.g., Vx) and the second reference voltage (e.g., Vy), the voltage detection circuit 1720 generates the signal 2714 to close (e.g., turn on) the switch 2712, generates the signal 2724 to close (e.g., turn on) the switch 2722, and generates the signal 2734 to close (e.g., turn on) the switch 2732.

In certain embodiments, during the startup process, if the voltage 735 has not reached the startup threshold (e.g., V10_UVLO), the charging circuit 1710 generates a charging current 1792 to charge the capacitor 718 (e.g., the capacitor C5) and raise the voltage 735 at the terminal 734 (e.g., a V10 pin). For example, the charging current 1792 is determined as follows:

$$I_{hv\_v10} = \begin{cases} \dfrac{V_{HVS} - V_{10}}{R_1} & V_{10} < V_x \\ \dfrac{V_{HVS} - V_{10}}{R_1//R_2} & V_x < V_{10} < V_y \\ \dfrac{V_{HVS} - V_{10}}{R_1//R_2//R_3} & V_y < V_{10} < V_{10\_UVLO} \end{cases} \quad \text{(Equation 7)}$$

where $I_{hv\_v10}$ represents the charging current 1792. Additionally, $V_{HVS}$ represents the voltage 741, and $V_{10}$ represents the voltage 735. Moreover, $R_1$ represents the resistance of the resistor 2710, $R_2$ represents the resistance of the resistor 2720, and $R_3$ represents the resistance of the resistor 2730. Also, $R_1/R_2$ represents the resistance of a combination of the resistors 2710 and 2720, which are connected in parallel, and $R_1/R_2/R_3$ represents the resistance of a combination of the resistors 2710, 2720 and 2730, which are connected in parallel. Additionally, $V_x$ represents the first reference voltage, $V_y$ represents the second reference voltage, and V10_UVLO represents the startup threshold.

In some embodiments, if the voltage 735 is smaller than the first reference voltage (e.g., Vx), the charging current 1792 flows through the transistor 1702 (e.g., FET), the resistor 2710 (e.g., a resistor R1), and the transistor 1706 (e.g., a transistor M3). For example, if the voltage 735 is larger than the first reference voltage (e.g., Vx) but smaller than the second reference voltage (e.g., Vy), the charging current 1792 flows through the transistor 1702 (e.g., FET), the resistor 2710 (e.g., a resistor R1), the resistor 2720 (e.g., a resistor R2), and the transistor 1706 (e.g., a transistor M3). As an example, if the voltage 735 is larger than both the first reference voltage (e.g., Vx) and the second reference voltage (e.g., Vy) but smaller than the startup threshold (e.g., V10_UVLO), the charging current 1792 flows through the transistor 1702 (e.g., FET), the resistor 2710 (e.g., a resistor R1), the resistor 2720 (e.g., a resistor R2), the resistor 2730 (e.g., a resistor R3), and the transistor 1706 (e.g., a transistor M5).

According to certain embodiments, before the voltage 735 reaches the startup threshold (e.g., V10_UVLO), the voltage detection circuit 1770 generates the signal 1773, so that the circuit 1780 for undervoltage-lockout (UVLO) does not generate the signal 1791 that indicates the end of the startup process and causes the internal control circuit 1790 to power on other components of the PWM controller 730 (e.g., an IC chip). For example, during the startup process, other components of the PWM controller 730 (e.g., an IC chip) remain powered off. As an example, during the startup process, the DC-DC converter does not operate.

According to some embodiments, if the voltage detection circuit 1770 determines that the voltage 735 has risen above the startup threshold (e.g., V10_UVLO), the voltage detection circuit 1770 generates the signal 1722, so that the charging controller 1730 generates the signal 1732 to turn off the transistor 1706 (e.g., a transistor M3) and the charging circuit 1710 does not charge the capacitor 718 (e.g., a capacitor C5). In some examples, after the voltage detection circuit 1770 determines that the voltage 735 has risen above the startup threshold (e.g., V10_UVLO), the startup process of the PWM controller 730 (e.g., an IC chip) ends and the normal operation for the power converter 700 starts. For example, at the beginning of the normal operation, the voltage detection circuit 1770 generates the signal 1773, so that the circuit 1780 for undervoltage-lockout (UVLO) generates the signal 1791 that indicates the end of the startup process and causes the internal control circuit 1790 to power on other components of the PWM controller 730 (e.g., an IC chip). As an example, during the normal operation, other components of the PWM controller 730 (e.g., an IC chip) remain powered on. In certain examples, during the startup process, the voltage detection circuit 1770 determines whether the voltage 735 is smaller than the first reference voltage (e.g., Vx), whether the voltage 735 is larger than the first reference voltage (e.g., Vx) but smaller than the second reference voltage (e.g., Vy), and/or whether the voltage 735 is larger than both the first reference voltage (e.g., Vx) and the second reference voltage (e.g., Vy) but smaller than the startup threshold (e.g., V10_UVLO). In some examples, during the normal operation, the voltage detection circuit 1770 determines whether the voltage detection circuit 1770 determines whether the voltage 735 is smaller than the first reference voltage (e.g., Vx), whether the voltage 735 is larger than the first reference voltage (e.g., Vx) but smaller than the second reference voltage (e.g., Vy), and/or whether the voltage 735 is larger than both the first reference voltage (e.g., Vx) and the second reference voltage (e.g., Vy), and also determines whether the voltage 735 rises to a predetermined threshold (e.g., V10_HV_OFF).

In certain embodiments, during the normal operation, when the voltage 749 (e.g., $V_{DD}$) is higher than a reference voltage (e.g., $V_{reg}$), the DC-DC converter is idle, and the auxiliary winding 706 charges the capacitor 768 (e.g., a capacitor C3) to support the voltage 749 (e.g., $V_{DD}$), which is used to charge the capacitor 718 (e.g., a capacitor C5) and support the voltage 735 so that the voltage 735 at the terminal 734 (e.g., a V10 pin) is equal to the voltage 749 (e.g., $V_{DD}$) minus the forward bias voltage of the diode 1582. In some examples, during the normal operation, when the voltage 749 (e.g., $V_{DD}$) is smaller than the reference voltage (e.g., $V_{reg}$) but is not smaller than a lower predetermined threshold (e.g., VDD_HV_ON), the voltage 735 at the terminal 734 (e.g., a V10 pin) is generated by the DC-DC converter using the voltage 749 (e.g., $V_{DD}$), and the generated voltage 735 is larger than the voltage 749 (e.g., $V_{DD}$) and is equal to the reference voltage (e.g., $V_{reg}$).

According to some embodiments, during the normal operation, if the voltage detection circuit 1720 determines that the voltage 749 drops to the lower predetermined threshold (e.g., VDD_HV_ON), the voltage detection circuit 1720 generates the signal 1721, so that the charging controller 1730 generates the signal 1732 to turn on the transistor 1706 (e.g., a transistor M3). In some examples, if the transistor 1706 (e.g., a transistor M3) is turned on, the charging circuit 1710 generates the charging current 1792 to charge the capacitor 718 (e.g., a capacitor C5) and raise the voltage 735. For example, during the normal operation, when the transistor 1706 (e.g., a transistor M3) is turned on, if the voltage detection circuit 1770 determines the voltage 735 is smaller than the first reference voltage (e.g., Vx), the switch 2512 is closed but the switches 2522 and 2532 are open. As an example, during the normal operation, when the transistor 1706 (e.g., a transistor M3) is turned on, if the voltage 735 is larger than the first reference voltage (e.g., Vx) but smaller than the second reference voltage (e.g., Vy), the switches 2512 and 2522 are closed but the switch 2532 is open. For example, during the normal operation, when the transistor 1706 (e.g., a transistor M3) is turned on, if the voltage 735 is larger than both the first reference voltage (e.g., Vx) and the second reference voltage (e.g., Vy), the switches 2512, 2522, and 2532 are closed. In certain examples, during the normal operation, under certain dynamic-load and/or no-load conditions, the charging circuit 1710 generates the charging current 1792 to flow through the terminal 734 (e.g., a V10 pin) and to charge the capacitor 718 (e.g., a capacitor C5) and raise the voltage 735, in order to prevent insufficient power supply to the PWM controller 730 (e.g., an IC chip).

In certain embodiments, during the normal operation, if the voltage detection circuit 1720 determines that the voltage 749 rises to a higher predetermined threshold (e.g., VDD_HV_OFF), the voltage detection circuit 1720 generates the signal 1721, so that the charging controller 1730 generates the signal 1732 to turn off the transistor 1706 (e.g., a transistor M3). For example, if the transistor 1706 (e.g., a transistor M3) is turned off, the charging circuit 1710 does not charge the capacitor 718 (e.g., a capacitor C5). As an example, during the normal operation, under certain dynamic-load and/or no-load conditions, the charging circuit 1710 does not charge the capacitor 718 (e.g., a capacitor C5) in order to reduce power consumption of the PWM controller 730 (e.g., an IC chip).

In some embodiments, during the normal operation, the voltage detection circuit 1770 determines whether the voltage 735 rises to the predetermined threshold (e.g., V10_HV_OFF) and generates the signal 1771. For example, if the voltage 735 has not risen to the predetermined threshold (e.g., V10_HV_OFF), the signal 1771 is at a first logic level (e.g., a logic low level). As an example, if the voltage 735 has risen to the predetermined threshold (e.g., V10_HV_OFF), the signal 1771 is at a second logic level (e.g., a logic high level). In certain examples, if the signal 1771 indicates that the voltage 735 has risen to the predetermined threshold (e.g., V10_HV_OFF), the charging controller 1730 generates the signal 1732 to turn off the transistor 1706 (e.g., a transistor M3). For example, if the transistor 1706 (e.g., a transistor M3) is turned off, the charging circuit 1710 does not charge the capacitor 718 (e.g., a capacitor C5). As an example, during the normal operation, under certain dynamic-load and/or no-load conditions, the charging circuit 1710 does not charge the capacitor 718 (e.g., a capacitor C5) in order to reduce power consumption of the PWM controller 730 (e.g., an IC chip).

As shown in FIG. 17, during the normal operation, the charging controller 1730 receives the signals 1721 and 1771 and generates the signal 1732 to turn on or turn off the transistor 1706 according to some embodiments. For example, if the signal 1721 indicates that the voltage 749 drops to the lower predetermined threshold (e.g., VDD_HV_ON), the charging controller 1730 generates the signal 1732 to turn on the transistor 1706 (e.g., a transistor M3) for generating the charging current 1792 to charge the capacitor 718 (e.g., a capacitor C5) and raise the voltage 735. As an example, if the signal 1721 indicates that the voltage 749 rises to the higher predetermined threshold (e.g., VDD_HV_OFF), the charging controller 1730 generates the signal 1732 to turn off the transistor 1706 (e.g., a transistor M3). For example, if the signal 1771 indicates that the voltage 735 has risen to the predetermined threshold (e.g., V10_HV_OFF), the charging controller 1730 generates the signal 1732 to turn off the transistor 1706 (e.g., a transistor M3).

As discussed above and further emphasized here, FIG. 17 is merely an example, which should not unduly limit the scope of the claims. One of ordinary skill in the art would recognize many variations, alternatives, and modifications. In some examples, the PWM controller 730 also includes a reference-current and reference-voltage generator that receives a signal from the voltage detection circuit 1770 and is connected to the internal control circuit 1790. In certain examples, the voltage detection circuit 1770 outputs a signal for overvoltage protection. In certain examples, the diode 1782 (e.g., a Schottky diode) is replaced by a parasitic body diode of a PMOS transistor and/or by a PMOS switch. In some examples, the PWM controller 730 also includes a timer that, after being triggered, during a predetermined duration, prevents the signal 1771 from causing the charging controller 1730 to turn off the transistor 1706 (e.g., a transistor M3).

According to some embodiments, a controller for a power converter includes: a first terminal configured to receive a first voltage; a second terminal connected to a capacitor and biased to a second voltage; a voltage detector configured to receive the second voltage from the second terminal and generate a detection signal based at least in part on the second voltage; a charging controller configured to receive the detection signal and generate a first control signal based at least in part on the detection signal; and a charging current generator configured to receive the first voltage from the first terminal and receive the first control signal from the charging controller; wherein the voltage detector is further configured to: detect that the second voltage has decreased to a first predetermined threshold; and generate the detection signal indicating that the second voltage has decreased to the first predetermined threshold; wherein the charging controller is further configured to: in response to the detection signal indicating that the second voltage has decreased to the first predetermined threshold, generate the first control signal indicating that a charging current is to be generated; wherein the charging current generator is further configured to: in response to the first control signal indicating that the charging current is to be generated, generate the charging current that flows through the second terminal to charge the capacitor associated with the second voltage. For example, the controller is implemented according to at least FIG. 9.

As an example, the voltage detector is further configured to: detect that the second voltage has increased to a second predetermined threshold; and generate the detection signal indicating that the second voltage has increased to the second predetermined threshold; wherein the second predetermined threshold is larger than the first predetermined threshold. For example, the charging controller is further configured to: in response to the detection signal indicating that the second voltage has increased to the second predetermined threshold, generate the first control signal indicating that the charging current is not to be generated; wherein the charging current generator is further configured to: in response to the first control signal indicating that the charging current is not to be generated, not generate the charging current that flows through the second terminal.

As an example, the second voltage decreases to the first predetermined threshold during normal operation after a startup process; and the second voltage increases to the second predetermined threshold during the normal operation. For example, during the startup process: the voltage detector is further configured to: detect that the second voltage has not risen above a third predetermined threshold; and generate the detection signal indicating that the second voltage has not risen above the third predetermined threshold; the charging controller is further configured to: in response to the detection signal indicating that the second voltage has not risen above the third predetermined threshold, generate the first control signal indicating that the charging current is to be generated; wherein the charging current generator is further configured to: in response to the first control signal indicating that the charging current is to be generated, generate the charging current that flows through the second terminal to charge the capacitor and raise the second voltage. As an example, during the startup process: the voltage detector is further configured to: detect that the second voltage has risen above the third predetermined threshold; and generate the detection signal indicating that the second voltage has risen above the third predetermined threshold; the charging controller is further configured to: in response to the detection signal indicating that the second voltage has risen above the third predetermined threshold, generate the first control signal indicating that the charging current is not to be generated; wherein the charging current generator is further configured to: in response to the first control signal indicating that the charging current is not to be generated, not generate the charging current that flows through the second terminal to charge the capacitor and raise the second voltage. For examples, the controller further includes: a circuit for undervoltage-lockout configured to: in response to the second voltage has risen above the third predetermined threshold, generating a second control signal indicating the startup process has ended; and an internal control circuit configured to: in response to the second control signal indicating the startup process has ended, power on one or more components of the controller to start the normal operation.

According to certain embodiments, a controller for a power converter includes: a first terminal configured to receive a first voltage; a second terminal connected to a first capacitor and biased to a second voltage; a third terminal connected to a second capacitor and biased to a third voltage; a first voltage detector configured to receive the second voltage from the second terminal and generate a first detection signal based at least in part on the second voltage; a first charging controller configured to receive the first detection signal and generate a first control signal based at least in part on the first detection signal; and a charging current generator configured to receive the first voltage from the first terminal, the charging current generator including a first current generator and a second current generator, the first current generator being configured to receive the first control signal from the first charging controller; wherein the first voltage detector is further configured to: detect that the second voltage has decreased to a first predetermined threshold; and generate the first detection signal indicating that the second voltage has decreased to the first predetermined threshold; wherein the first charging controller is further configured to: in response to the first detection signal indicating that the second voltage has decreased to the first predetermined threshold, generate the first control signal indicating that a first charging current is to be generated; wherein the first current generator is further configured to: in response to the first control signal indicating that the first charging current is to be generated, generate the first charging current that flows through the third terminal to charge the second capacitor associated with the third voltage. For example, the controller is implemented according to at least FIG. 13 and/or FIG. 15.

As an example, the first voltage detector is further configured to: detect that the second voltage has increased to a second predetermined threshold; and generate the first detection signal indicating that the second voltage has increased to the second predetermined threshold; wherein the second predetermined threshold is larger than the first predetermined threshold. For example, the controller further includes: a second voltage detector configured to receive the third voltage from the third terminal and generate a second detection signal based at least in part on the third voltage; wherein the second voltage detector is further configured to: detect that the third voltage has increased to a third predetermined threshold; and generate the second detection signal indicating that the third voltage has increased to the third predetermined threshold. As an example, the first charging controller is further configured to: in response to the first detection signal indicating that the second voltage has increased to the second predetermined threshold, generate the first control signal indicating that the first charging current is not to be generated; and in response to the second detection signal indicating that the third voltage has increased to the third predetermined threshold, generate the first control signal indicating that the first charging current is not to be generated; wherein the first current generator is further configured to: in response to the first control signal indicating that the first charging current is not to be generated, not generate the first charging current that flows through the third terminal.

For example, the second voltage decreases to the first predetermined threshold during normal operation after a startup process; the second voltage increases to the second predetermined threshold during the normal operation; and the third voltage increases to the third predetermined threshold during the normal operation. As an example, during the startup process: the second voltage detector is further configured to: detect that the third voltage has not risen above a fourth predetermined threshold; and generate a third detection signal indicating that the third voltage has not risen above the fourth predetermined threshold. For example, the controller further includes a second charging controller configured to receive the third detection signal and generate a second control signal based at least in part on the third detection signal. As an example, the second charging controller is further configured to: in response to the third detection signal indicating that the third voltage has not risen above the fourth predetermined threshold, generate the second control signal indicating that a second charging current is to be generated; wherein the second current generator is further configured to: receive the second control signal from the second charging controller; and in response to the second control signal indicating that the second charging current is to be generated, generate the second charging current that flows through the second terminal.

For example, the first voltage detector is further configured to: determine whether the second voltage is smaller than a first reference voltage, whether the second voltage is larger than the first reference voltage but smaller than a second reference voltage, and whether the second voltage is larger than the second reference voltage; generate a fourth detection signal indicating that the second voltage is smaller than the first reference voltage; generate a fifth detection signal indicating that the second voltage is larger than the first reference voltage but smaller than the second reference voltage; and generate a sixth detection signal indicating that the second voltage is larger than the second reference voltage. As an example, the second current generator is further configured to, in response to the second control signal indicating that the second charging current is to be generated: generate the second charging current that flows through a first resistor but not a second resistor and not a third resistor, if the second current generator receives the fourth detection signal indicating that the second voltage is smaller than the first reference voltage; generate the second charging current that flows through the first resistor and the second resistor but not the third resistor, if the second current generator receives the fifth detection signal indicating that the second voltage is larger than the first reference voltage but smaller than the second reference voltage; and generate the second charging current that flows through the first resistor, the second resistor and the third resistor, if the second current generator receives the sixth detection signal indicating that the second voltage is larger than the second reference voltage. For example, the controller further includes: a circuit for undervoltage-lockout configured to: in response to the third voltage has risen above the fourth predetermined threshold, generating a third control signal indicating the startup process has ended; and an internal control circuit configured to: in response to the third control signal indicating the startup process has ended, power on one or more components of the controller to start the normal operation.

According to some embodiments, a controller for a power converter includes: a first terminal configured to receive a first voltage; a second terminal connected to a first capacitor and biased to a second voltage; a third terminal connected to a second capacitor and biased to a third voltage; a first voltage detector configured to receive the second voltage from the second terminal and generate a first detection signal based at least in part on the second voltage; a charging controller configured to receive the first detection signal and generate a first control signal based at least in part on the first detection signal; and a charging current generator configured to receive the first voltage from the first terminal and configured to receive the first control signal from the charging controller; wherein the first voltage detector is further configured to: detect that the second voltage has decreased to a first predetermined threshold; and generate the first detection signal indicating that the second voltage has decreased to the first predetermined threshold; wherein the charging controller is further configured to: in response to the first detection signal indicating that the second voltage has decreased to the first predetermined threshold, generate the first control signal indicating that a charging current is to be generated; wherein the current generator is further configured to: in response to the first control signal indicating that the charging current is to be generated, generate the charging current that flows through the third terminal to charge the second capacitor associated with the third voltage. For example, the controller is implemented according to at least FIG. 17.

As an example, the first voltage detector is further configured to: detect that the second voltage has increased to a second predetermined threshold; and generate the first detection signal indicating that the second voltage has increased to the second predetermined threshold; wherein the second predetermined threshold is larger than the first predetermined threshold. For example, the controller further includes: a second voltage detector configured to receive the third voltage from the third terminal and generate a second detection signal based at least in part on the third voltage; wherein the second voltage detector is further configured to: detect that the third voltage has increased to a third predetermined threshold; and generate the second detection signal indicating that the third voltage has increased to the third predetermined threshold. As an example, the charging controller is further configured to: in response to the first detection signal indicating that the second voltage has increased to the second predetermined threshold, generate the first control signal indicating that the charging current is not to be generated; and in response to the second detection signal indicating that the third voltage has increased to the third predetermined threshold, generate the first control signal indicating that the charging current is not to be generated; wherein the charging current generator is further configured to: in response to the first control signal indicating that the charging current is not to be generated, not generate the charging current that flows through the third terminal.

For example, the second voltage decreases to the first predetermined threshold during normal operation after a startup process; the second voltage increases to the second predetermined threshold during the normal operation; and the third voltage increases to the third predetermined threshold during the normal operation. As an example, during the startup process: the second voltage detector is further configured to: detect that the third voltage has not risen above a fourth predetermined threshold; and generate a third detection signal indicating that the third voltage has not risen above the fourth predetermined threshold. For example, the charging controller is further configured to: in response to the third detection signal indicating that the third voltage has not risen above the fourth predetermined threshold, generate the first control signal indicating that the charging current is to be generated; wherein the current generator is further configured to: in response to the first control signal indicating that the charging current is to be generated, generate the charging current that flows through the third terminal to charge the second capacitor associated with the third voltage.

As an example, the second voltage detector is further configured to: determine whether the third voltage is smaller than a first reference voltage, whether the third voltage is larger than the first reference voltage but smaller than a second reference voltage, and whether the third voltage is larger than the second reference voltage; generate a fourth detection signal indicating that the third voltage is smaller than the first reference voltage; generate a fifth detection signal indicating that the third voltage is larger than the first reference voltage but smaller than the second reference voltage; and generate a sixth detection signal indicating that the third voltage is larger than the second reference voltage. For example, wherein the current generator is further configured to, in response to the first control signal indicating that the charging current is to be generated: generate the charging current that flows through a first resistor but not a second resistor and not a third resistor, if the current generator receives the fourth detection signal indicating that the third voltage is smaller than the first reference voltage; generate the charging current that flows through the first resistor and the second resistor but not the third resistor, if the current generator receives the fifth detection signal indicating that the third voltage is larger than the first reference voltage but smaller than the second reference voltage; and generate the charging current that flows through the first resistor, the second resistor and the third resistor, if the current generator receives the sixth detection signal indicating that the third voltage is larger than the second reference voltage. As an example, the controller further includes: a circuit for undervoltage-lockout configured to: in response to the third voltage has risen above the fourth predetermined threshold, generating a second control signal indicating the startup process has ended; and an internal control circuit configured to: in response to the second control signal indicating the startup process has ended, power on one or more components of the controller to start the normal operation.

According to certain embodiments, a method for a power converter includes: receiving a first voltage; receiving a second voltage associated with a capacitor; generating a detection signal based at least in part on the second voltage; receiving the detection signal; generating a first control signal based at least in part on the detection signal; receiving the first control signal; and processing the first control signal; wherein the generating a detection signal based at least in part on the second voltage includes: detecting that the second voltage has decreased to a first predetermined threshold; and generating the detection signal indicating that the second voltage has decreased to the first predetermined threshold; wherein the generating a first control signal based at least in part on the detection signal includes: in response to the detection signal indicating that the second voltage has decreased to the first predetermined threshold, generating the first control signal indicating that a charging current is to be generated; wherein the processing the first control signal includes: in response to the first control signal indicating that the charging current is to be generated, generating the charging current to charge the capacitor associated with the second voltage. For example, the method is implemented according to at least FIG. 9.

According to some embodiments, a method for a power converter includes: receiving a first voltage; receiving a second voltage associated with a first capacitor; receiving a third voltage associated with a second capacitor; generating a first detection signal based at least in part on the second voltage; receiving the first detection signal; generating a first control signal based at least in part on the first detection signal; receiving the first control signal; and processing the first control signal; wherein the generating a first detection signal based at least in part on the second voltage includes: detecting that the second voltage has decreased to a first predetermined threshold; and generating the first detection signal indicating that the second voltage has decreased to the first predetermined threshold; wherein the generating a first control signal based at least in part on the first detection signal includes: in response to the first detection signal indicating that the second voltage has decreased to the first predetermined threshold, generating the first control signal indicating that a first charging current is to be generated; wherein the processing the first control signal includes: in response to the first control signal indicating that the first charging current is to be generated, generating the first charging current to charge the second capacitor associated with the third voltage. For example, the method is implemented according to at least FIG. 13 and/or FIG. 15.

According to certain embodiments, a method for a power converter includes: receiving a first voltage; receiving a second voltage associated with a first capacitor; receiving a third voltage associated with a second capacitor; generating a first detection signal based at least in part on the second voltage; receiving the first detection signal; generating a first control signal based at least in part on the first detection signal; receiving the first control signal; and processing the first control signal; wherein the generating a first detection signal based at least in part on the second voltage includes: detecting that the second voltage has decreased to a first predetermined threshold; and generating the first detection signal indicating that the second voltage has decreased to the first predetermined threshold; wherein the generating a first control signal based at least in part on the first detection signal includes: in response to the first detection signal indicating that the second voltage has decreased to the first predetermined threshold, generating the first control signal indicating that a charging current is to be generated; wherein the processing the first control signal includes: in response to the first control signal indicating that the charging current is to be generated, generating the charging current to charge the second capacitor associated with the third voltage. For example, the method is implemented according to at least FIG. 17.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A converter controller for a power converter, the converter controller comprising:
 a voltage detector configured to receive a voltage and generate a detection signal based at least in part on the voltage; and
 a charging controller configured to receive the detection signal and generate a first control signal based at least in part on the detection signal;
 wherein the voltage detector is further configured to:
  detect that the voltage has decreased to a first predetermined threshold; and
  generate the detection signal indicating that the voltage has decreased to the first predetermined threshold;
 wherein the charging controller is further configured to:
  in response to the detection signal indicating that the voltage has decreased to the first predetermined threshold, generate the first control signal indicating that a charging current is to be generated for raising the voltage;
 wherein the voltage detector is further configured to:
  detect that the voltage has increased to a second predetermined threshold; and
  generate the detection signal indicating that the voltage has increased to the second predetermined threshold;
 wherein the second predetermined threshold is larger than the first predetermined threshold.

2. The converter controller of claim 1 wherein:
 the charging controller is further configured to:
  in response to the detection signal indicating that the voltage has increased to the second predetermined threshold, generate the first control signal indicating that the charging current is not to be generated.

3. The converter controller of claim 1 wherein:
 the voltage decreases to the first predetermined threshold during normal operation after a startup process; and
 the voltage increases to the second predetermined threshold during the normal operation.

4. The converter controller of claim 3 wherein, during the startup process:
 the voltage detector is further configured to:
  detect that the voltage has not reached a third predetermined threshold; and
  generate the detection signal indicating that the voltage has not reached the third predetermined threshold;
 the charging controller is further configured to:
  in response to the detection signal indicating that the voltage has not risen above the third predetermined threshold, generate the first control signal indicating that the charging current is to be generated for raising the voltage.

5. The converter controller of claim 4 wherein, during the startup process:
 the voltage detector is further configured to:
  detect that the voltage has risen above the third predetermined threshold; and
  generate the detection signal indicating that the voltage has risen above the third predetermined threshold;
 the charging controller is further configured to:
  in response to the detection signal indicating that the voltage has risen above the third predetermined threshold, generate the first control signal indicating that the charging current is not to be generated.

6. The converter controller of claim 5, and further comprising:
 a circuit for undervoltage-lockout configured to:
  in response to the voltage has risen above the third predetermined threshold, generating a second control signal indicating the startup process has ended; and
 an internal control circuit configured to:
 in response to the second control signal indicating the startup process has ended, power on one or more components of the converter controller to start the normal operation.

7. A converter controller for a power converter, the converter controller comprising:

a first voltage detector configured to receive a first voltage and generate a first detection signal based at least in part on the first voltage;
a second voltage detector configured to receive a second voltage and generate a second detection signal based at least in part on the second voltage; and
a first charging controller configured to receive the first detection signal and the second detection signal and generate a first control signal based at least in part on the first detection signal and the second detection signal;
wherein the first voltage detector is further configured to:
detect that the first voltage has decreased to a first predetermined threshold; and
generate the first detection signal indicating that the first voltage has decreased to the first predetermined threshold;
wherein the first charging controller is further configured to:
in response to the first detection signal indicating that the first voltage has decreased to the first predetermined threshold, generate the first control signal indicating that a first charging current is to be generated;
wherein the second voltage detector is further configured to:
detect that the second voltage has increased to a second predetermined threshold; and
generate the second detection signal indicating that the second voltage has increased to the second predetermined threshold;
wherein the first voltage and the second voltage are two different voltages.

8. The converter controller of claim 7 wherein the first charging controller is further configured to:
in response to the second detection signal indicating that the second voltage has increased to the second predetermined threshold, generate the first control signal indicating that the first charging current is not to be generated.

9. The converter controller of claim 8, and further comprising:
a first current generator configured to receive the first control signal from the first charging controller;
wherein the first current generator is further configured to:
in response to the first control signal indicating that the first charging current is to be generated, generate the first charging current for raising the second voltage; and
in response to the first control signal indicating that the first charging current is not to be generated, not generate the first charging current.

10. The converter controller of claim 7 wherein the first voltage detector is further configured to:
detect that the first voltage has increased to a third predetermined threshold; and
generate the first detection signal indicating that the first voltage has increased to the third predetermined threshold;
wherein the third predetermined threshold is larger than the first predetermined threshold.

11. The converter controller of claim 10 wherein the first charging controller is further configured to:
in response to the first detection signal indicating that the first voltage has increased to the third predetermined threshold, generate the first control signal indicating that the first charging current is not to be generated.

12. The converter controller of claim 10 wherein the first voltage decreases to the first predetermined threshold during normal operation after a startup process.

13. The converter controller of claim 12 wherein the second voltage increases to the second predetermined threshold during the normal operation.

14. The converter controller of claim 12 wherein the first voltage increases to the third predetermined threshold during the normal operation.

15. A converter controller for a power converter, the converter controller comprising:
a first voltage detector configured to receive a first voltage and generate a first detection signal based at least in part on the first voltage;
a second voltage detector configured to receive a second voltage and generate a second detection signal based at least in part on the second voltage;
a first charging controller configured to receive the first detection signal and generate a first control signal based at least in part on the first detection signal; and
a second charging controller configured to receive the second detection signal and generate a second control signal based at least in part on the second detection signal;
wherein, during a startup process before normal operation,
the second voltage detector is further configured to:
detect that the second voltage has not reached a first predetermined threshold; and
generate the second detection signal indicating that the second voltage has not reached the first predetermined threshold;
the second charging controller is further configured to:
in response to the second detection signal indicating that the second voltage has not reached the first predetermined threshold, generate the second control signal indicating that a first charging current is to be generated to raise the first voltage;
wherein, during the normal operation after the startup process,
the first voltage detector is further configured to:
detect that the first voltage has decreased to a second predetermined threshold; and
generate the first detection signal indicating that the first voltage has decreased to the second predetermined threshold;
the first charging controller is further configured to:
in response to the first detection signal indicating that the first voltage has decreased to the second predetermined threshold, generate the first control signal indicating that a second charging current is to be generated to raise the second voltage.

16. The converter controller of claim 15, and further comprising:
a first current generator, the first current generator being configured to:
receive the first control signal from the first charging controller; and
in response to the first control signal indicating that the second charging current is to be generated, generate the second charging current to raise the second voltage.

17. The converter controller of claim 16, and further comprising:
a second current generator, the second current generator being configured to:

receive the second control signal from the second charging controller; and in response to the second control signal indicating that the first charging current is to be generated, generate the first charging current to raise the first voltage.

18. The converter controller of claim 17 wherein, during the startup process:

the second voltage detector is further configured to:
   detect that the second voltage has risen above the first predetermined threshold; and
   generate the second detection signal indicating that the second voltage has risen above the first predetermined threshold.

19. The converter controller of claim 18 wherein the second charging controller is further configured to:

in response to the second detection signal indicating that the second voltage has risen above the first predetermined threshold, generate the second control signal indicating that the first charging current is not to be generated.

20. The converter controller of claim 19 wherein the second current generator is further configured to, in response to the second control signal indicating that the first charging current is not to be generated, not generate the first charging current.

21. The converter controller of claim 18, and further comprising:

a circuit for undervoltage-lockout configured to:
   in response to the second voltage has risen above the first predetermined threshold, generating a third control signal indicating that the startup process has ended; and an internal control circuit configured to:
   in response to the third control signal indicating that the startup process has ended, power on one or more components of the converter controller to start the normal operation.

22. A converter controller for a power converter, the converter controller comprising:

a first voltage detector configured to receive a first voltage and generate a first detection signal based at least in part on the first voltage;

a second voltage detector configured to receive a second voltage and generate a second detection signal based at least in part on the second voltage;

a charging controller configured to receive the first detection signal and the second detection signal and generate a control signal based at least in part on the second detection signal; and a current generator configured to receive the control signal from the charging controller;

wherein, during a startup process before normal operation, the second voltage detector is further configured to:
   detect that the second voltage has not reached a predetermined threshold; and
   generate the second detection signal indicating that the second voltage has not reached the predetermined threshold;

the charging controller is further configured to:
   in response to the second detection signal indicating that the second voltage has not reached the predetermined threshold, generate the control signal indicating that a charging current is to be generated to raise the first voltage;

the current generator is further configured to:
   in response to the control signal indicating that the charging current is to be generated, generate the charging current to raise the first voltage;

wherein, during the startup process before the normal operation, the first voltage detector is further configured to:
   determine that the first voltage is smaller than a first reference voltage, that the first voltage is larger than the first reference voltage but smaller than a second reference voltage, or that the first voltage is larger than the second reference voltage;
   generate a third detection signal indicating that the first voltage is smaller than the first reference voltage, that the first voltage is larger than the first reference voltage but smaller than the second reference voltage, or that the first voltage is larger than the second reference voltage;

wherein the second reference voltage is larger than the first reference voltage.

23. The converter controller of claim 22 wherein the current generator is further configured to receive the third detection signal indicating that the first voltage is smaller than the first reference voltage, that the first voltage is larger than the first reference voltage but smaller than the second reference voltage, or that the first voltage is larger than the second reference voltage.

24. The converter controller of claim 23 wherein the current generator is further configured to:

in response to the third detection signal indicating that the first voltage is smaller than the first reference voltage, generate the charging current that flows through a first resistor but not a second resistor and a third resistor;

in response to the third detection signal indicating that the first voltage is larger than the first reference voltage but smaller than the second reference voltage, generate the charging current that flows through the first resistor and the second resistor but not the third resistor; and in response to the third detection signal indicating that the first voltage is larger than the second reference voltage, generate the charging current that flows through the first resistor, the second resistor and the third resistor.

25. A converter controller for a power converter, the converter controller comprising:

a first voltage detector configured to receive a first voltage and generate a first detection signal based at least in part on the first voltage;

a second voltage detector configured to receive a second voltage and generate a second detection signal based at least in part on the second voltage; and a charging controller configured to receive the first detection signal and the second detection signal and generate a control signal based at least in part on the first detection signal and the second detection signal;

wherein, during a startup process before normal operation, the second voltage detector is further configured to:
   detect that the second voltage has not reached a first predetermined threshold; and
   generate the second detection signal indicating that the second voltage has not reached the first predetermined threshold;

the charging controller is further configured to:
   in response to the second detection signal indicating that the second voltage has not reached the first predetermined threshold, generate the control signal indicating that a charging current is to be generated to raise the second voltage;

wherein, during the normal operation after the startup process,
the first voltage detector is further configured to:
detect that the first voltage has decreased to a second predetermined threshold; and
generate the first detection signal indicating that the first voltage has decreased to the second predetermined threshold;
the charging controller is further configured to:
in response to the first detection signal indicating that the first voltage has decreased to the second predetermined threshold, generate the control signal indicating that the charging current is to be generated to raise the second voltage.

26. A converter controller for a power converter, the converter controller comprising:
a first voltage detector configured to receive a first voltage and generate a first detection signal based at least in part on the first voltage;
a second voltage detector configured to receive a second voltage and generate a second detection signal based at least in part on the second voltage;
a charging controller configured to receive the first detection signal and the second detection signal and generate a control signal based at least in part on the second detection signal; and
a current generator configured to receive the control signal from the charging controller;
wherein, during a startup process before normal operation,
the second voltage detector is further configured to:
detect that the second voltage has not reached a predetermined threshold; and
generate the second detection signal indicating that the second voltage has not reached the predetermined threshold;
the charging controller is further configured to:
in response to the second detection signal indicating that the second voltage has not reached the predetermined threshold, generate the control signal indicating that a charging current is to be generated to raise the second voltage;
the current generator is further configured to:
in response to the control signal indicating that the charging current is to be generated, generate the charging current to raise the second voltage;

wherein, during the startup process before the normal operation,
the second voltage detector is further configured to:
determine that the second voltage is smaller than a first reference voltage, that the second voltage is larger than the first reference voltage but smaller than a second reference voltage, or that the second voltage is larger than the second reference voltage but smaller than the predetermined threshold; and
generate a third detection signal indicating that the second voltage is smaller than the first reference voltage, that the second voltage is larger than the first reference voltage but smaller than the second reference voltage, or that the second voltage is larger than the second reference voltage but smaller than the predetermined threshold;
wherein:
the second reference voltage is larger than the first reference voltage; and
the predetermined threshold is larger than the second reference voltage.

27. The converter controller of claim 26 wherein the current generator is further configured to receive the third detection signal indicating that the second voltage is smaller than the first reference voltage, that the second voltage is larger than the first reference voltage but smaller than the second reference voltage, or that the second voltage is larger than the second reference voltage but smaller than the predetermined threshold.

28. The converter controller of claim 27 wherein the current generator is further configured to:
in response to the third detection signal indicating that the second voltage is smaller than the first reference voltage, generate the charging current that flows through a first resistor but not a second resistor and a third resistor;
in response to the third detection signal indicating that the second voltage is larger than the first reference voltage but smaller than the second reference voltage, generate the charging current that flows through the first resistor and the second resistor but not the third resistor; and
in response to the third detection signal indicating that the second voltage is larger than the second reference voltage but smaller than the predetermined threshold, generate the charging current that flows through the first resistor, the second resistor and the third resistor.

* * * * *